(12) United States Patent
Sridhar et al.

(10) Patent No.: US 7,045,237 B2
(45) Date of Patent: May 16, 2006

(54) TEXTURED ELECTROLYTE FOR A SOLID OXIDE FUEL CELL

(75) Inventors: K. R. Sridhar, Los Gatos, CA (US); Dien Nguyen, Sunnyvale, CA (US)

(73) Assignee: Ion America Corporation, Moffett Field, CA (US)

( * ) Notice: Subject to any disclaimer, the term of this patent is extended or adjusted under 35 U.S.C. 154(b) by 475 days.

(21) Appl. No.: 10/368,493

(22) Filed: Feb. 20, 2003

(65) Prior Publication Data

US 2005/0074650 A1    Apr. 7, 2005

Related U.S. Application Data

(60) Provisional application No. 60/357,636, filed on Feb. 20, 2002.

(51) Int. Cl.
*H01M 8/10* (2006.01)

(52) U.S. Cl. .......................................... 429/30; 429/33

(58) Field of Classification Search ................. 429/30, 429/33, 40; 264/618; 502/101; 205/666, 205/667, 662, 668
See application file for complete search history.

(56) References Cited

U.S. PATENT DOCUMENTS

| | | | | |
|---|---|---|---|---|
| 4,135,041 A | * | 1/1979 | Jung et al. | 429/225 |
| 4,913,982 A | | 4/1990 | Kotchick et al. | 429/12 |
| 5,162,167 A | | 11/1992 | Minh et al. | 429/30 |
| 5,213,910 A | | 5/1993 | Yamada | 429/32 |
| 5,215,946 A | | 6/1993 | Minh | 501/97 |
| 5,248,712 A | * | 9/1993 | Takeuchi et al. | 524/56 |
| 5,256,499 A | | 10/1993 | Minh et al. | 429/33 |
| 5,273,837 A | | 12/1993 | Aitken et al. | 429/30 |
| 5,290,642 A | | 3/1994 | Minh et al. | 429/33 |
| 5,342,705 A | | 8/1994 | Minh et al. | 429/32 |
| 5,368,667 A | | 11/1994 | Minh et al. | 156/89 |
| 5,382,315 A | * | 1/1995 | Kumar | 216/39 |
| 5,501,914 A | | 3/1996 | Satake et al. | 429/36 |
| 5,518,829 A | | 5/1996 | Satake et al. | 429/30 |
| 5,589,017 A | | 12/1996 | Minh | 156/87 |
| 5,641,585 A | | 6/1997 | Lessing et al. | 429/26 |
| 5,733,499 A | * | 3/1998 | Takeuchi et al. | 264/650 |
| 5,955,392 A | * | 9/1999 | Takeuchi et al. | 501/103 |
| 6,001,761 A | * | 12/1999 | Hata et al. | 501/103 |
| 6,361,892 B1 | | 3/2002 | Ruhl et al. | 429/30 |
| 6,582,845 B1 | | 6/2003 | Helfinstine et al. | 429/33 |
| 6,835,488 B1 | * | 12/2004 | Sasahara et al. | 429/39 |
| 2002/0012825 A1 | | 1/2002 | Sasahara et al. | 429/30 |
| 2002/0132156 A1 | | 9/2002 | Ruhl et al. | 429/40 |

FOREIGN PATENT DOCUMENTS

| | | | |
|---|---|---|---|
| EP | 0615299 | * | 3/1994 |
| JP | 06-215778 | | 8/1994 |
| JP | 9-199143 | | 7/1997 |
| JP | 09223506 | * | 8/1997 |
| JP | 09245810 | * | 9/1997 |
| JP | 09245811 | * | 9/1997 |
| JP | 09277226 | * | 10/1997 |

* cited by examiner

*Primary Examiner*—Patrick Joseph Ryan
*Assistant Examiner*—Thomas H. Parsons
(74) *Attorney, Agent, or Firm*—Foley & Lardner LLP

(57) ABSTRACT

A ceramic electrolyte for a solid oxide fuel cell includes at least one non-uniform surface portion. Preferably, the electrolyte surface is textured.

33 Claims, 46 Drawing Sheets

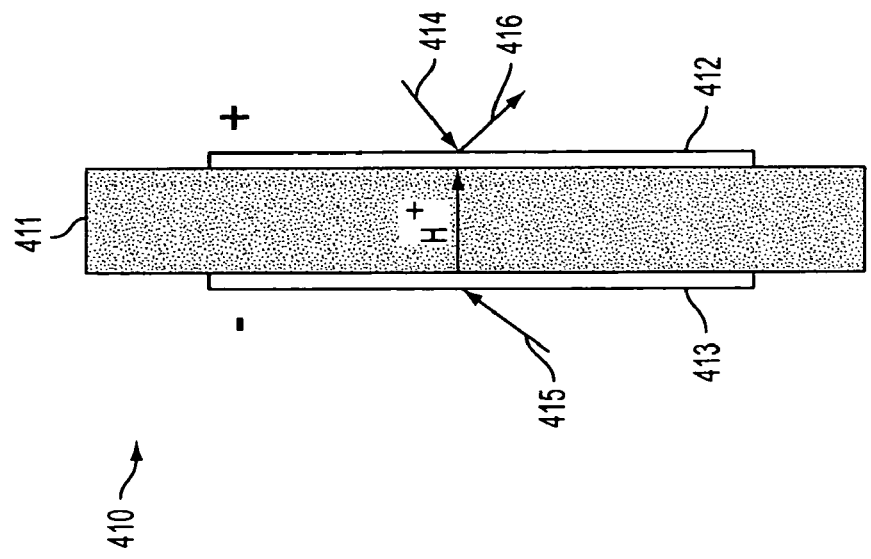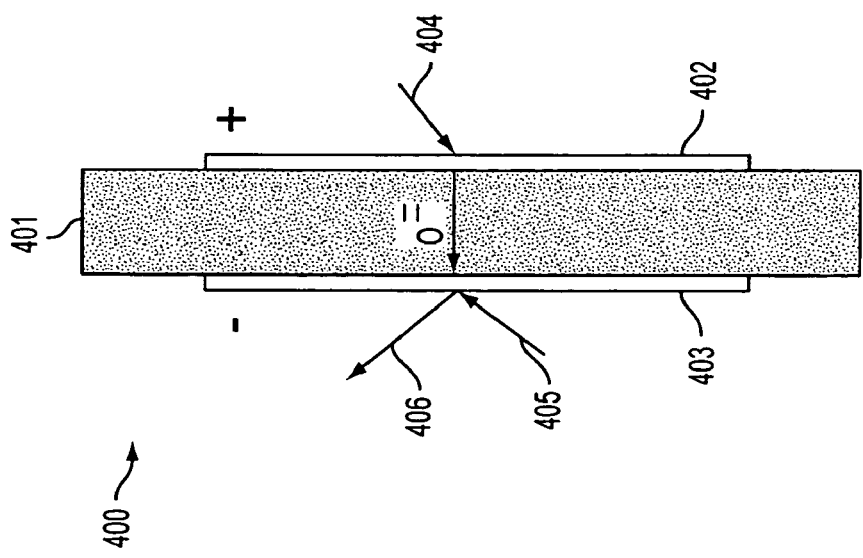
FIG. 25

US 7,045,237 B2

TEXTURED ELECTROLYTE FOR A SOLID OXIDE FUEL CELL

FIELD OF THE INVENTION

This application claims benefit of priority of U.S. provisional application 60/357,636 filed on Feb. 20, 2002, which is incorporated by reference in its entirety. The present invention is directed generally to fuel cells and more particularly to ceramic electrolytes for solid oxide fuel cells.

BACKGROUND OF THE INVENTION

Fuel cells generate electricity from hydrogen or various hydrocarbon fuels. In some fuel cells, an oxygen containing gas, such as air, is provided onto the cathode side of the electrolyte, while hydrogen or a hydrocarbon fuel is provided onto the anode side of the electrolyte. The fuel cell generates electricity through an electrochemical reaction. For example, in a solid oxide fuel cell, oxygen containing air is provided onto the cathode side of a solid ceramic electrolyte, while a hydrocarbon fuel is provided onto the anode side of the electrolyte.

Fuel cells operate more efficiently when the oxygen content of the inlet air is higher, primarily because the Nernst potential of the cell increases when the partial pressure of oxygen is higher. Therefore, the oxygen content of air being provided into the fuel cell is sometimes increased or enriched using various processes, including pressure swing adsorption (e.g., QuestAir Inc.'s Pulsar technology), oxygen-selective membranes (e.g., Boyer et al., J. Appl. Electrochem., p. 1095, 1999), or magnetic separation devices (e.g., Nitta et al., U.S. Pat. No. 6,106,963, incorporated herein by reference in the entirety). However, these methods are generally inefficient because they require the use of power (i.e., electricity), thus decreasing the efficiency of the fuel cell and the power generation system.

BRIEF SUMMARY OF THE INVENTION

A preferred embodiment of the present invention provides a ceramic electrolyte for a solid oxide fuel cell, comprising at least one non-uniform surface portion. Another preferred embodiment of the present invention provides a method of making a ceramic electrolyte for a solid oxide fuel cell, comprising providing a green sheet, patterning at least a portion of at least one surface of the green sheet to form at least a non-uniform portion of the at least one surface, and calcining the green sheet to form the ceramic electrolyte. Another preferred embodiment of the present invention provides a method of making a ceramic electrolyte for a solid oxide fuel cell, comprising providing a ceramic electrolyte, and texturing at least a portion of one surface of the ceramic electrolyte.

BRIEF DESCRIPTION OF THE DRAWINGS

FIGS. 25–26 are schematic side cross sectional views of fuel cells according to the fourth preferred embodiment.

FIGS. 36–45 are cross-sectional, exploded views and FIGS. 46–48 are three dimensional cut away views.

DETAILED DESCRIPTION OF THE PREFERRED EMBODIMENTS

I. The First Preferred Embodiment

In a first preferred embodiment of the present invention, the inventors have realized that the oxygen content of air being provided into the fuel cell can be increased using a temperature sensitive adsorption cycle. Preferably, the temperature sensitive adsorption cycle utilizes the heat generated by the fuel cell during power generation. The use of heat generated by a fuel cell for increasing the oxygen content of the inlet air stream in a cyclical adsorption separation process increases the efficiency of power generation. However, heat generated by means other than the fuel cell may be used instead.

In the temperature sensitive adsorption process, an air stream (a mixture of nitrogen and oxygen) is passed through a cool adsorbent medium that selectively removes a fraction of the nitrogen, resulting in a gas stream that has a higher oxygen content than the original stream. When the adsorbent is saturated with nitrogen under the process conditions, heat generated from the fuel cell operation or from another source is transferred to the adsorbent medium, and the nitrogen is driven out of the adsorbent medium through a vent. Thus, a separation is effected.

Figure 1:
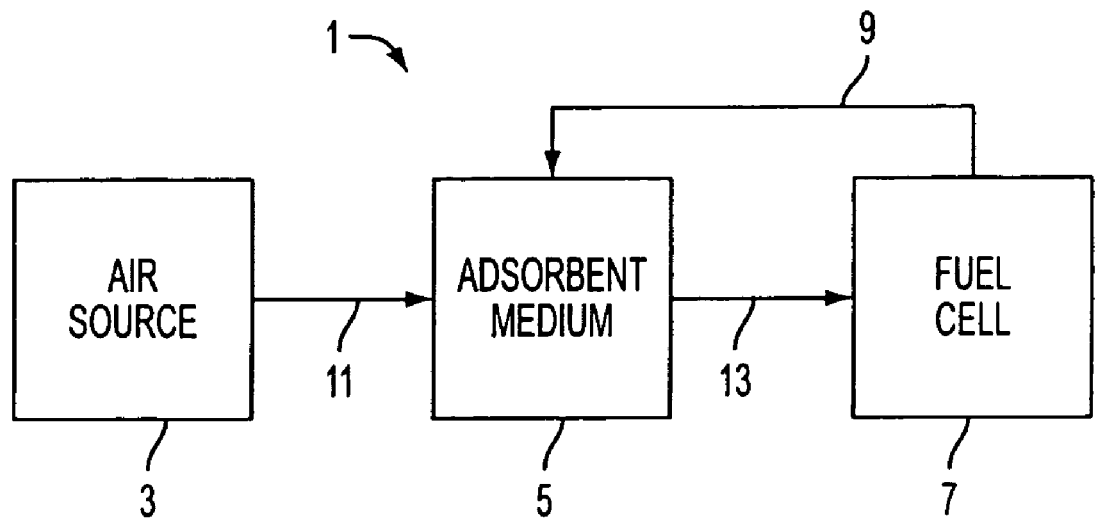
FIGS. 1–5 are schematic representations of oxygen enrichment systems according to the first preferred embodiment.

FIG. 1 schematically illustrates the temperature sensitive oxygen enrichment system 1. The system includes an air source 3, an adsorbent medium 5 and a fuel cell 7. The air source 3 may be an air blower, an air inlet conduit and/or any other device which provides air into the adsorbent medium 5. The adsorbent medium 5 may be any medium which selectively adsorbs nitrogen compared to oxygen. Preferably, the adsorbent medium 5 is a bed containing a nitrogen adsorbing material, such as a zeolite or a mixture of zeolites. For example, silver X, sodium X or calcium A zeolites may be used. The fuel cell 7 may be any fuel cell into which air is provided. Preferably, the fuel cell 7 is a solid oxide fuel cell. However, other fuel cells, such as PEM, direct methanol, molten carbonate, phosphoric acid or alkaline fuel cells may be used.

The system 1 also preferably contains a heat transfer conduit 9 located between the fuel cell 7 and the adsorbent medium 5. The conduit 9 transfers heat from the fuel cell 7 to the adsorbent medium 5. The conduit 9 may comprise any device than may transfer heat from one location to another.

For example, the conduit 9 may comprise a pipe, a duct, a space between walls or even a solid heat transfer material. Preferably the conduit 9 is a pipe which transfers a heat transfer fluid through the system 1.

An air inlet 11 is located in the adsorbent medium 5 housing. The inlet provides air from the air source 3 into the adsorbent medium 5. An oxygen enriched air conduit 13 is located between the adsorbent medium 5 and the fuel cell 7. The conduit 13 may be pipe, duct or open space which provides oxygen enriched air from the adsorbent medium 5 to the fuel cell 7.

Figure 2:
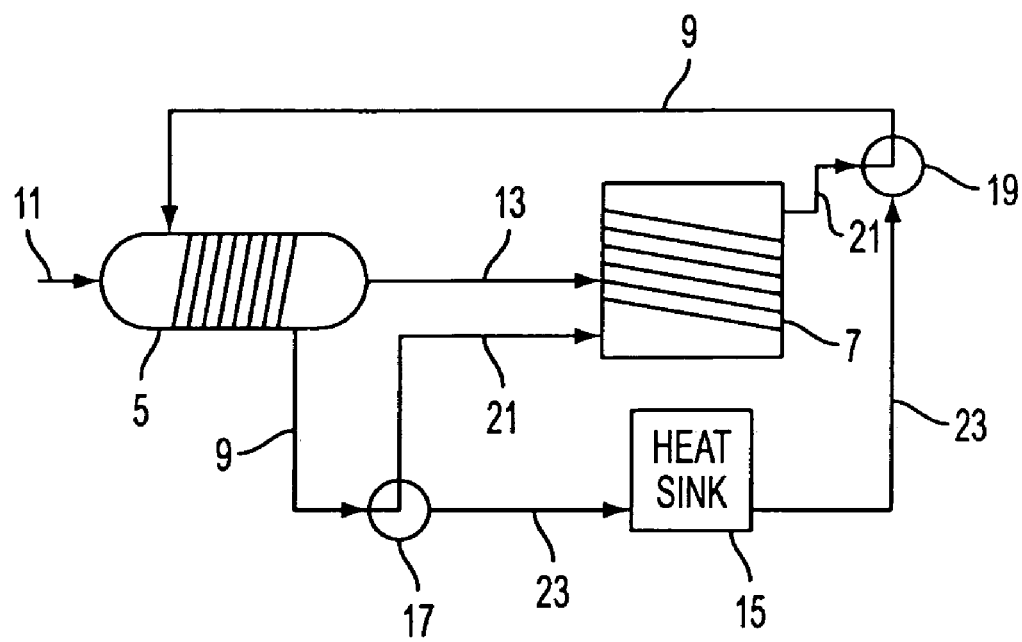

In one preferred aspect of the first embodiment, the heat transfer conduit 9 comprises a pipe which is located adjacent to the fuel cell 7, adjacent to a heat sink 15 and adjacent to the adsorbent medium 5. For example, as shown in FIG. 2, the conduit 9 is wrapped around the housing of the adsorbent medium 5 and around the fuel cell 7. The conduit 9 also passes through the heat sink 15. The heat transfer conduit 9 transfers a heated heat transfer liquid, such as water, from adjacent to the fuel cell 7 to the adsorbent medium 5. The heated heat transfer liquid heats the adsorbent medium 5 to desorb nitrogen from the adsorbent medium 5. The heat transfer conduit 9 also transfers a cooled heat transfer liquid, such as water, from adjacent to the heat sink 15 to the adsorbent medium 5. The cooled heat transfer liquid cools the adsorbent medium 5, which allows the adsorbent medium 5 to adsorb nitrogen from air that is being provided from inlet 11.

The operation of the heat transfer conduit 9 illustrated in FIG. 2 will now be described in more detail. The conduit 9 is filled with a heat transfer liquid. This liquid may be any liquid which is capable of transferring heat. Preferably, this liquid is water. However, other liquids, such as mineral oil, etc., or even heat transfer gases may be used. The liquid is provided through conduit 9 and through at least one valve. Preferably, the conduit 9 contains an outlet valve 17 and an inlet valve 19. However, only one of these two valves may be used. The outlet valve 17 is preferably a three way valve which directs the liquid either through a first segment 21 of the conduit 9, through a second segment 23 of the conduit 9, or prevents liquid flow through the conduit 9. If liquid is provided through the first segment 21 which is located adjacent to the fuel cell 7, then the liquid is heated by the heat generated in the fuel cell 7. For example, "located adjacent" means that the first segment 21 of the conduit 9 is wrapped around the fuel cell 7 or a stack of fuel cells if more than one fuel cell is used. However, "located adjacent" also includes any other configuration of segment 21 which allows the fuel cell 7 to heat the liquid in the segment 21. For example, the segment 21 may be located in contact with one or more surfaces of the fuel cell 7 or segment 21 may be located near the fuel cell, rather than being wrapped around the fuel cell.

The heated heat transfer liquid is then provided from the first segment 21 through the inlet valve 19 into the portion of conduit 9 that is located adjacent to the adsorbent medium 5. For example, "located adjacent" means that the conduit 9 is wrapped around the housing of the adsorbent medium 5. However, "located adjacent" also includes any other configuration of conduit 9 which allows the heat transfer liquid to heat the adsorbent medium 5. For example, the conduit 9 may be located in contact with one or more surfaces of the adsorbent medium 5 or conduit 9 may be located near the adsorbent medium 5, rather than being wrapped around it. The heated heat transfer liquid heats the adsorbent medium 5 and desorbs the nitrogen adsorbed in the adsorbent medium 5.

When it is desired to cool the adsorbent medium 5, then the valves 17 and 19 are switched to provide the heat transfer fluid through a second segment 23 of the conduit 9. The second segment 23 is located adjacent to a heat sink 15. The heat sink 15 may comprise any thing which can cool the liquid in the second segment 23 of the conduit 9. For example, the heat sink 15 may be a cooling tower, a heat exchanger, a radiator with cool air, a cold air blower or even a portion of segment 23 which runs through the cool ground or wall. The segment 23 may pass through the heat sink 15 or be placed in contact with or adjacent to the heat sink 15, depending on what type of heat sink is used.

The cooled heat transfer liquid is then provided from the second segment 23 through the inlet valve 19 into the portion of conduit 9 that is located adjacent to the adsorbent medium 5. The cooled heat transfer fluid cools the adsorbent medium 5 while air from inlet 11 is passing through the adsorbent medium 5 to desorb nitrogen from the air.

As shown in FIG. 2, the heat transfer liquid is provided through the conduit 9 in a closed control loop. The system 1 of FIG. 2 operates in a batch or non-continuous mode. Thus, when air is provided from the air source 3 through the adsorbent medium 5 into the fuel cell 7, the heat transfer liquid is passed through the second segment 23 adjacent to the heat sink 15. The cooled heat transfer liquid cools the adsorbent medium 5 to adsorb the nitrogen from the air. When no air is provided from the air source 3 through the adsorbent medium 5 into the fuel cell 7, the heat transfer liquid is passed through the first segment 21 adjacent to the fuel cell 7. The heated heat transfer liquid heats the adsorbent medium 5 to desorb the nitrogen.

Figure 3:
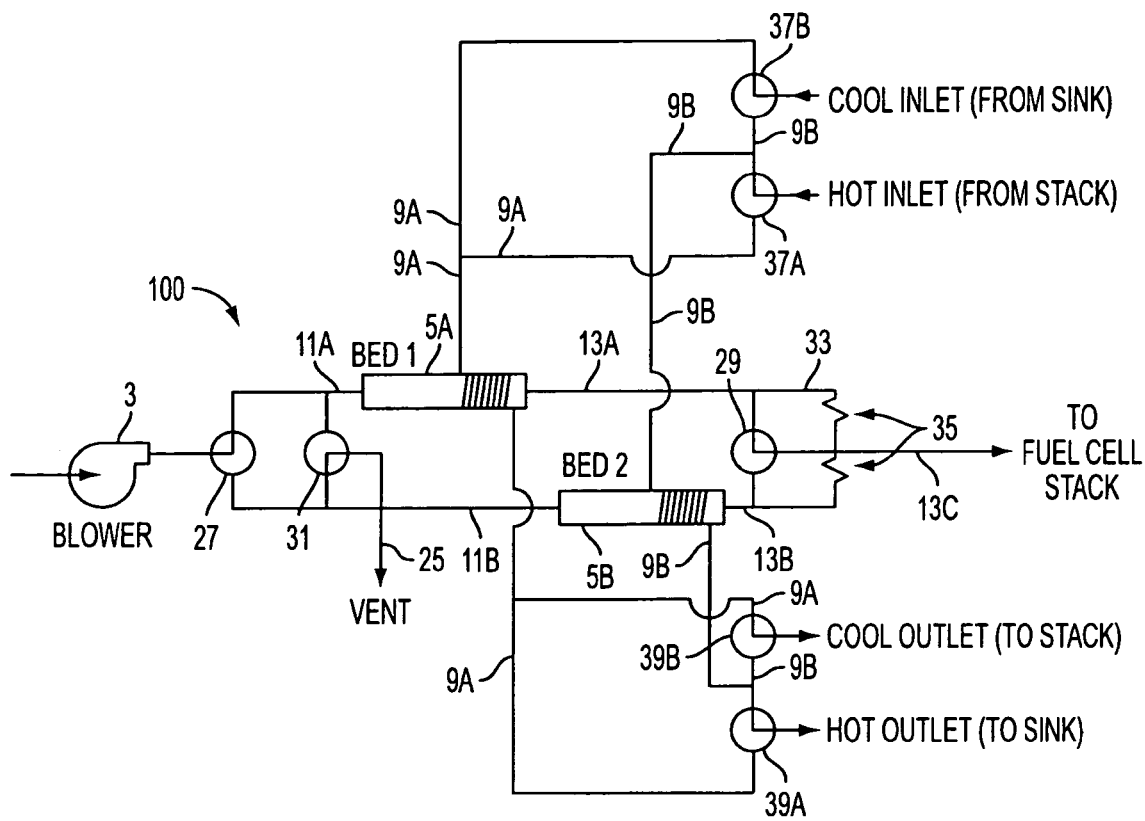

However, in a second preferred aspect of the first embodiment, the system 1 operates in a continuous mode. To operate in a continuous mode, the system 100 contains two or more adsorbent mediums 5A, 5B, as shown in FIG. 3. In FIG. 3, elements with like numbers to elements in FIGS. 1–2 are presumed to be the same. In the preferred aspect of FIG. 3, while one adsorbent medium 5A is used to adsorb nitrogen to oxygen enrich the air being provided into the fuel cell, the other adsorbent medium 5B is heated by the heat from the fuel cell to desorb the nitrogen from the adsorbent medium 5B.

The system 100 shown in FIG. 3 contains the following elements. The system 100 contains one or more air sources 3, such as blowers, and a plurality of adsorbent mediums 5A, 5B which selectively adsorb nitrogen compared to oxygen. While only two mediums are shown in FIG. 3, there may be more than two mediums if desired. The system 100 also contains a plurality of heat transfer conduits 9A, 9B which transfer heat from the fuel cell (not shown in FIG. 3 for clarity) to the plurality of adsorbent mediums 5A, 5B. The conduits 9A, 9B are located between the fuel cell and the plurality of adsorbent mediums 5A, 5B.

There are also a plurality of air inlets 11A, 11B into the plurality of adsorbent mediums 5A, 5B, and a plurality of outlets 13A, 13B (i.e., a plurality of oxygen enriched air conduits) which provide oxygen enriched air from the plurality of adsorbent mediums 5A, 5B to the fuel cell. The conduits 13A, 13B are located between the plurality of adsorbent mediums 5A, 5B and the fuel cell.

Preferably, the system 100 contains seven three way valves, as will be described in more detail below. However, more or less than seven valves may be used as desired. The system 100 contains least one inlet selector valve 27 located between the air source 3 and the plurality of adsorbent mediums 5A, 5B. The inlet selector valve 27 directs air from the air source 3 into either a first adsorbent medium 5A or into a second adsorbent medium 5B.

The system 100 also contains at least one outlet selector valve 29 located between the plurality of adsorbent mediums 5A, 5B and the fuel cell. The outlet selector valve 29 directs oxygen enriched air into the fuel cell through oxygen enriched air conduits 13A, 13B, 13C from either the first adsorbent medium 5A or from the second adsorbent medium 5B.

The system 100 contains at least one venting selector valve 31 located between the air source 3 and the plurality of adsorbent mediums 5A, 5B. The venting selector valve 31 directs desorbed nitrogen to be vented through vent 25 from either the second adsorbent medium 5B or from the first adsorbent medium 5A.

At least one connecting conduit 33 is provided such that it connects a plurality of oxygen enriched air conduits 13A, 13B. The connecting conduit 33 directs purging air from one of the first or the second adsorbent medium to the other one of the first or the second adsorbent medium to purge the nitrogen from the receiving medium. Preferably, the conduit 33 contains one or more flow restrictors 35. The restrictors 35 restrict the flow of oxygen enriched air, such that the majority of the oxygen enriched air exiting an adsorbent medium is directed to the fuel cell through conduit 13C, rather than through the connecting conduit 33.

The system 100 contains at least one heat transfer fluid inlet valve 37A, 37B located in the heat transfer fluid conduits 9A, 9B. Preferably there are two such valves as shown in FIG. 3. Valve 37A directs heated heat transfer fluid to the one of the adsorbent mediums 5A, 5B from the fuel cell stack, while valve 37B directs cooled heat transfer fluid to another one of the adsorbent mediums 5A, 5B from the heat sink.

Furthermore, the system 100 contains at least one heat transfer fluid outlet valve 39A, 39B located in the heat transfer fluid conduits 9A, 9B. Preferably there are two such valves as shown in FIG. 3. Valve 39A directs heated heat transfer fluid from the adsorbent mediums to the heat sink, while valve 39B directs cooled heat transfer fluid from the adsorbent mediums to the fuel cell.

Thus, the conduits 9A, 9B actually comprise two segments of one common conduit 9. For example, the output of conduit 9A is provided through valve 39B, the fuel cell stack and valve 37A to input of conduit 9B, while the output of conduit 9B is provided through valve 39A, the heat sink and valve 37B to input of conduit 9A. However, the valves 37A, 37B and 39A, 39B may be set such that the conduits 9A and 9B remain separate, as will be discussed in more detail below.

The method of operating system 100 will now be described with respect to FIGS. 3 and 4. As shown in FIG. 3, the valves are set to allow the first adsorbent medium 5A to provide oxygen enriched air into the fuel cell, while the nitrogen is desorbed from the second adsorbent medium 5B. The first adsorbent medium 5A is cooled by a cool heat transfer fluid in conduit 9A, while the second adsorbent medium 5B is heated by a hot heat transfer fluid in conduit 9B.

Figure 4:
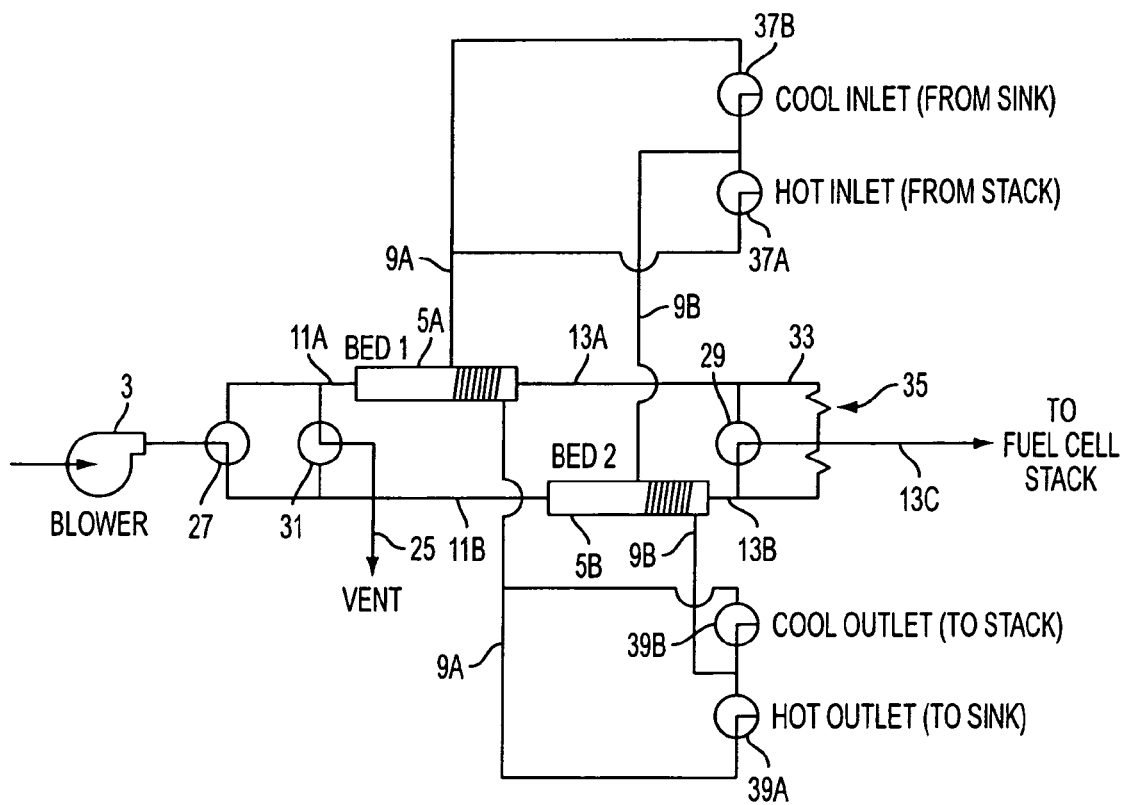

Then, after some time, the valve positions are switched as shown in FIG. 4. As shown in FIG. 4, the valves are set to allow the second adsorbent medium 5B to provide oxygen enriched air into the fuel cell, while the nitrogen is desorbed from the first adsorbent medium 5A. The second adsorbent medium 5B is cooled by a cool heat transfer fluid in conduit 9B, while the first adsorbent medium 5A is heated by a hot heat transfer fluid in conduit 9A. Thus, the system 100 can operate in a continuous rather than in a batch mode. At least one adsorbent medium may be used to provide oxygen enriched air into the fuel cell, while another adsorbent medium may be heated and purged to desorb nitrogen adsorbed therein.

The operation of the system 100 as shown in FIG. 3 will now be described in detail. Air from the air source 3 is directed to the inlet selector valve 27, which directs air into at least one of plurality of adsorbent mediums. For example the valve 27 directs the air into the first adsorbent medium 5A but not into the second adsorbent medium 5B. The first adsorbent medium 5A is cooled by the heat transfer fluid in the first heat transfer conduit 9A, and first adsorbent medium 5A selectively adsorbs nitrogen from the air. The oxygen enriched air exits the first adsorbent medium 5A and is selectively directed to the fuel cell through the oxygen enriched air conduits 13A, 13C and the outlet selector valve 29. The inlet selector valve 27 prevents air from flowing from the air source 3 into the second adsorbent medium 5B. Furthermore, the outlet selector valve 29 prevents flow from the second adsorbent medium 5B to the fuel cell. Thus, no oxygen enriched air flows from the second adsorbent medium 5B into the fuel cell.

A portion of the oxygen enriched air flows from the first adsorbent medium 5A through conduit 13A, the connecting conduit 33 and the conduit 13B into the second adsorbent medium 5B. The flow restrictor(s) 35 in the connecting conduit 33 ensure that only a small portion of the oxygen enriched air flows into the second adsorbent medium 5B. This oxygen enriched air from the first adsorbent medium 5A is used as purging air for the second adsorbent medium 5B to purge the nitrogen from the second adsorbent medium 5B. The second adsorbent medium 5B is heated by the heated heat transfer fluid in the conduit 9B to desorb the nitrogen in the second adsorbent medium 5B while the purging air is passing through the second adsorbent medium 5B. The desorbed nitrogen is selectively directed to be vented from the second adsorbent medium but not from the first adsorbent medium by the venting selector valve 31.

The heat transfer fluid is directed in the system 100 shown in FIG. 3 as follows. The heat transfer fluid is passed through a heat sink to cool the heat transfer fluid. The cooled heat transfer fluid is selectively directed to the first adsorbent medium 5A through the "cool inlet" in the heat transfer fluid inlet valve 37B and through conduit 9A.

Then, the cooled heat transfer fluid from the first adsorbent medium 5A is selectively directed through conduit 9A and through the "cool outlet" in the heat transfer fluid outlet valve 39B to the fuel cell. The heat transfer fluid from valve 39B is passed adjacent to the fuel cell to heat the heat transfer fluid.

The heated heat transfer fluid is then selectively directed to the second adsorbent medium 5B through the "hot inlet" in the heat transfer fluid inlet valve 37A and through conduit 9B. Then, the heated heat transfer fluid from the second adsorbent medium 5B is selectively directed through conduit 9B and through the "hot outlet" in the heat transfer fluid outlet valve 39A to the heat sink.

The operation of the system 100 as shown in FIG. 4 will now be described in detail. All of the valves in FIG. 4 are set to provide flow in the opposite direction from FIG. 3. Air from the air source 3 is directed to the inlet selector valve 27 which directs the air into the second adsorbent medium 5B but not into the first adsorbent medium 5A. The second adsorbent medium 5B is cooled by the heat transfer fluid in the second heat transfer conduit 9B, and the second adsorbent medium 5B selectively adsorbs nitrogen from the air.

The oxygen enriched air exits the second adsorbent medium 5B and is selectively directed to the fuel cell through the oxygen enriched air conduits 13B, 13C and the outlet selector valve 29. The inlet selector valve 27 prevents air from flowing from the air source 3 into the first adsorbent medium 5A. Furthermore, the outlet selector valve 29 prevents flow from the first adsorbent medium 5A to the fuel cell. Thus, no oxygen enriched air flows from the first adsorbent medium 5A into the fuel cell.

A portion of the oxygen enriched air flows from the second adsorbent medium 5B through conduit 13B, the connecting conduit 33 and the conduit 13A into the first adsorbent medium 5A. The flow restrictor(s) 35 in the connecting conduit ensure that only a small portion of the oxygen enriched air flows into the first adsorbent medium 5A. This oxygen enriched air from the second adsorbent medium 5B is used as purging air for the first adsorbent medium 5A to purge the nitrogen from the first adsorbent medium 5A. The first adsorbent medium 5A is heated by the heated heat transfer fluid in the conduit 9A to desorb the nitrogen in the first adsorbent medium 5A while the purging air is passing through the first adsorbent medium 5A. The desorbed nitrogen is selectively directed to be vented from the first adsorbent medium but not from the second adsorbent medium by the venting selector valve 31.

The heat transfer fluid is directed in the system 100 shown in FIG. 4 as follows. The heat transfer fluid is passed through a heat sink to cool the heat transfer fluid. The cooled heat transfer fluid is selectively directed to the second adsorbent medium 5B through the heat transfer fluid inlet valve 37B and conduit 9B.

Then, the cooled heat transfer fluid from the second adsorbent medium 5B is selectively directed through conduit 9B and the heat transfer fluid outlet valve 39B to the fuel cell. The heat transfer fluid from valve 39B is passed adjacent to the fuel cell to heat the heat transfer fluid.

The heated heat transfer fluid is then selectively directed to the first adsorbent medium 5A through the heat transfer fluid inlet valve 37A and conduit 9A. Then, the heated heat transfer fluid from the second adsorbent medium 5A is selectively directed through conduit 9A and the heat transfer fluid outlet valve 39A to the heat sink.

Therefore, conduits 9A and 9B comprise segments of the same conduit because the heat transfer fluid makes a complete loop through the system 100. However, if desired, the valves 37A, 37B, 39A and 39B may be set such that the heated heat transfer fluid returns to the fuel cell after heating one adsorbent medium, while the cooled heat transfer fluid returns to the heat sink after cooling the other adsorbent medium.

It should be noted that the present invention is not limited to the system 100 illustrated in FIGS. 3 and 4. Several adsorbent mediums (i.e., beds containing adsorbent medium) can be connected in various different ways to achieve the desired oxygen enrichment continuously.

Figure 5:
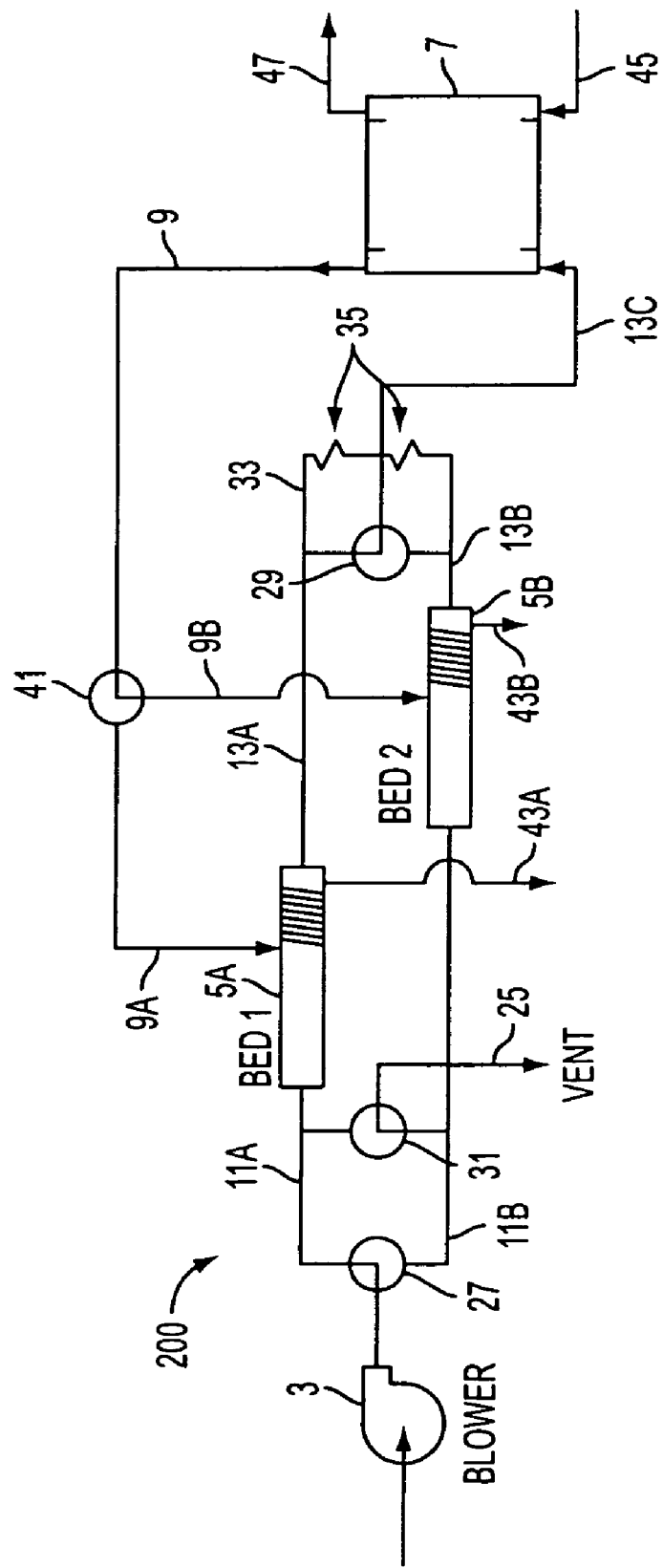

FIG. 5 illustrates another system 200 according to a third preferred aspect of the first embodiment. The system 200 of FIG. 5 is similar to the system 100 of FIGS. 3 and 4, except that the adsorbent mediums 5A, 5B are heated by the hot air emitted by the fuel cell 7, rather than by a heat transfer liquid.

As shown in FIG. 5, the air is provided from inlet 11A into the first adsorbent medium 5A. In the adsorbent medium 5A, nitrogen is adsorbed, and oxygen enriched air is provided through conduits 13A, 13C and valve 29 into the cathode side input of the fuel cell 7. No air is provided into the second adsorbent medium 5B from inlet 11B due to the position of valve 27 in FIG. 5, similar to that of the system 100 illustrated in FIG. 3.

The heat transfer conduit 9 is connected to the cathode side output of the fuel cell 7. The hot air exits the cathode side output of the fuel cell 7 and enters the conduit 9. The hot air then reaches a hot air selector valve 41 which directs the hot air into a first segment 9A or a second segment 9B of the conduit 9. As shown in FIG. 5, the valve 41 is set to direct the hot air into the second segment 9B.

Since the second segment 9B is located adjacent to the second adsorbent medium 5B, the heated air from the fuel cell 7 heats the second adsorbent medium 5B to desorb nitrogen from the adsorbent medium. After the hot air passes through conduit 9B, the air is either vented through vent 43B or reused for some other purpose.

When the second adsorbent medium 5B is used to provide oxygen enriched air into the fuel cell 7, then the position of the valves 27, 31, 29 and 41 is reversed (similar to that shown in FIG. 4), and the first adsorbent medium 5A is heated by the hot air from the fuel cell 7 to desorb the nitrogen from the first adsorbent medium 5A. The hot air is then vented through vent 43A or put to some other use.

In FIG. 5, the fuel cell 7 also contains a fuel input 45 on the anode side and a fuel output 47 on the anode side. In use, the adsorbent mediums 5A, 5B may be cooled by external air or by another heat transfer conduit (not shown in FIG. 5) to adsorb the nitrogen from the air passing from inlets 11A, 11B through the adsorbent mediums 5A, 5B into conduits 13A, 13B. Thus, the heat transfer gas (i.e., hot air) is provided in an open loop in FIG. 5 and the system 200 operates in a continuous mode.

In each of these embodiments, conditioning of the incoming air may be valuable. For example, the inlet air may be dried, heated, or cooled depending on its initial state.

It is desirable to select the adsorbent material to optimize both gas separation and rapid heat transfer. The pressure drop through the bed should be minimized in order to reduce the capital and operating costs of the blower. Thus, the particle size, bed geometry, and overall system layout and design may be optimized to minimize the pressure drop. The adsorbent material in different beds may be the same or different depending on the system requirements.

For example, in one case an oxygen enrichment system may consist of three adsorbent beds operating in parallel, similar to the two beds shown in FIG. 2. Each bed will contain 1 kg of AgX zeolite pellets with a standard mesh size of 20×30. The beds will have a parallelipiped geometry and will contain a network of heat transfer surfaces, preferably made of metal foam.

It should be noted that the temperature sensitive adsorption process to enrich the oxygen content of air of the first embodiment is not limited to providing oxygen enriched air to a fuel cell. This process may be used to provide oxygen enriched air for any other suitable use. For example, the efficiency of a combustion process (such as a gas turbine) may increase if the inlet air is oxygen-enriched, as inert nitrogen will not need to be heated.

II. The Second Preferred Embodiment

High powered electrical appliances pose challenges for thermal management. Large electrical power consumers such as co-located computers or fabrication machinery dissipate most of the electrical energy provided as heat. In order to maintain appropriate operating conditions this heat needs to be removed. In conventional arrangements, where electrical power is supplied through the grid, electrical power is required to drive the appliances and to operate a cooling mechanism. Certain distributed power systems offer new perspectives. Power generators such as solid oxide fuel cells provide electrical power and high quality waste heat. This heat can be utilized to drive a cooling device, thereby reducing the electrical power requirement. The inventors have realized that appropriate choice of the equipment involved can provide a system where electrical power requirements and cooling requirements can be ideally matched.

In a second preferred embodiment of the present invention, the inventors have realized that a power generator, which includes a fuel cell, such as a solid oxide fuel cell, a heat pump, and an electrical power consuming appliance, such as a computer, form an ideally matched system with respect to electrical power requirements and cooling requirements.

Solid oxide fuel cells typically generate approximately the same amount of heat as electrical power. This heat is available at elevated temperatures, usually in the range of 250° C. to 1000° C., and is suitable to drive a heat driven heat pump.

There are heat driven heat pumps, which have an efficiency of approximately unity. An efficiency of unity implies that the heat pump can remove the same amount of heat which is supplied to drive the heat pump. It is important to note that the heat streams involved are of different temperature. The heat stream from the fuel cell to the heat driven heat pump is provided at a higher temperature than the heat stream from the cooling load (in this case an electrical appliance) into the heat driven heat pump.

The electrical power supplied by the fuel cell is consumed by an appliance. Part of the electrical power supplied to an appliance is dissipated as heat. A close look at this part of the system reveals that all of the electrical power supplied to the appliance, which is not stored in the appliance or transmitted from the appliance beyond the system boundaries is dissipated. For most appliances, such as computers or machinery, only a small fraction of the power supplied is transmitted beyond system boundaries and most of the electrical energy supplied is dissipated as heat. The dissipated heat needs to be removed in order to avoid excessive temperatures within the appliance.

The inventors have realized that the system described above has the extremely convenient feature of matching cooling loads with electrical loads. The combination of the heat driven heat pump with the solid oxide fuel cell provides electrical supply and cooling capacity matching the requirements of many electrical appliances. Such a system is convenient, because it requires neither additional cooling devices, nor additional electrical power of significance (i.e., over 10% of the total power) to be incorporated. Careful selection of the power generator and the heat driven heat pump can provide matched cooling and heating for a variety of applications. The power generator can also be a combination of a solid oxide fuel cell and a gas turbine, such as a bottoming cycle gas turbine.

Additionally, the amount of cooling and electrical power provided can be adjusted by selecting the appropriate operating conditions for the fuel cell. If for example the fuel cell is supplied with an excess of fuel, more high temperature heat can be created and thereby more cooling power. This adjustment can be especially important in situations where additional heat loads need to be removed. One example for an additional heat load is heating of the conditioned appliance due to high ambient air temperatures (i.e. hot climate zones).

Another preferred option is heating of appliances or thermally conditioned space with the heat pump. For example in cold climate zones heating can be crucial to the operation of appliances or for the personnel operating the appliances. A heat driven heat pump can extremely efficiently provide heating.

A variety of fuels can be used in the power generator. Examples for gaseous fuel are hydrogen, biologically produced gas, natural gas, compressed natural gas, liquefied natural gas, and propane. Liquid fuels can also be used. The system can also be adapted to solid fuels.

Figure 6:
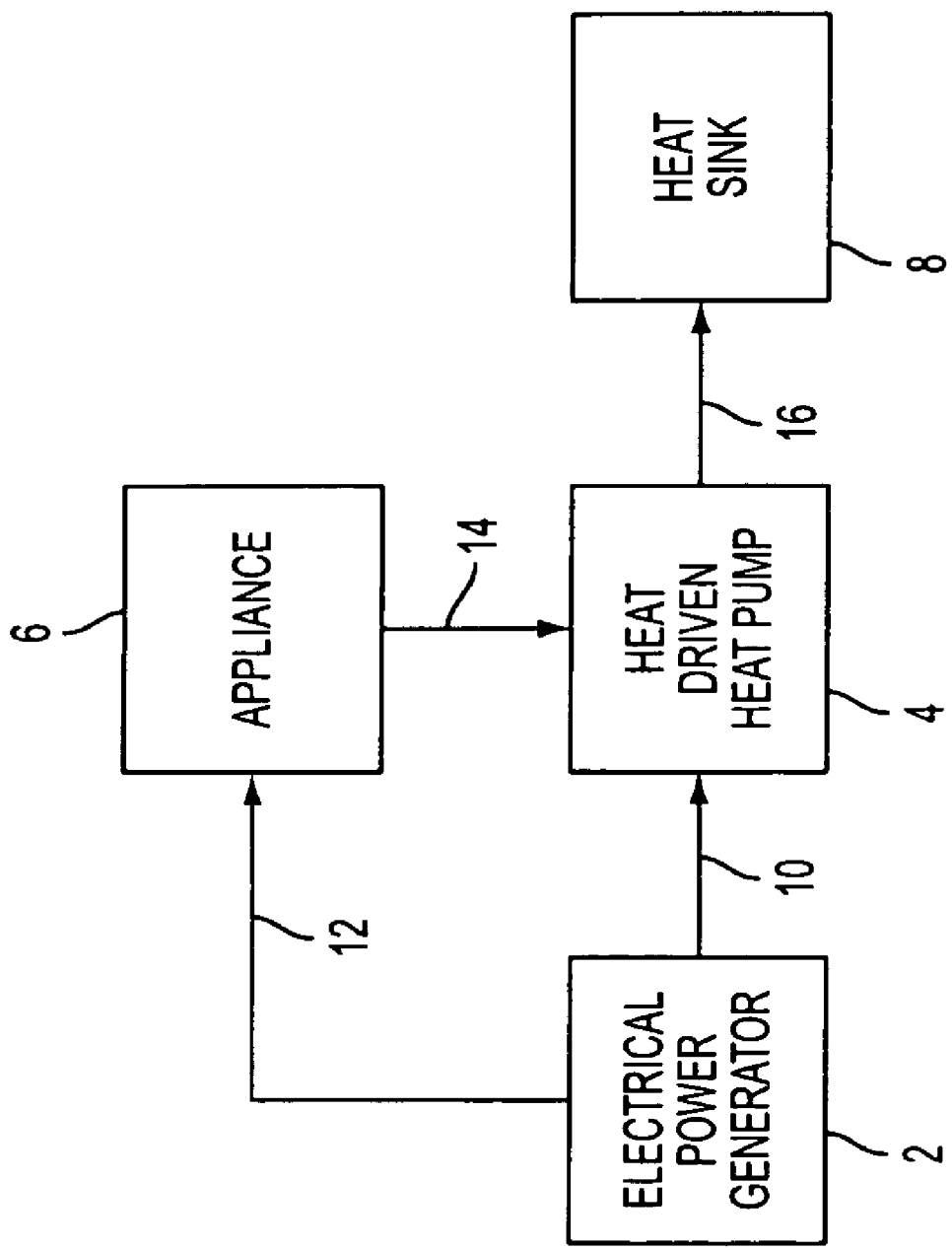
FIGS. 6–10D are schematic representations of a combined electrical power generation and cooling system according to the second preferred embodiment.

FIG. 6 schematically illustrates the system of the second preferred embodiment. The system contains an electrical power generator 2, a heat driven heat pump 4, an appliance 6, and a heat sink 8. The electrical power generator 2 can be a solid oxide fuel cell. It can also be a solid oxide fuel cell combined with a gas turbine. Other power generators, such as molten-carbonate fuel cells, which also provide high temperature heat in addition to electrical power, can also be used. The heat driven heat pump 4 can be an absorbtion chiller, such as a LiBr-Water or an ammonia-water heat pump. Heat driven heat pumps use high temperature heat to provide cooling (i.e. absorb heat at a low temperature), and reject heat at an intermediate temperature. Compared to conventional Rankine-cycle cooling devices, they require only a small amount of electrical or mechanical power. A description of heat driven heat pumps can be found in Bernard D. Woods, "Applications of Thermodynamics", Waveland Press, Inc., Prospect Heights, Ill., Second Edition, 1991, incorporated herein by reference.

Another class of heat driven heat pumps suitable for this embodiment is adsorption heat pumps. In an adsorption heat pump the refrigerant, which is usually a gas, interacts with a solid. Adsorption and desorption of the refrigerant on/from the solid provide pressurization of the refrigerant. High pressure desorption of the refrigerant is accomplished using high temperature heat. In the high-pressure portion of the refrigerant loop, heat is rejected and in the low pressure portion heat is absorbed. Adsorption heat pumps can be realized as solid state devices without the need to handle liquids. This can be advantageous for example in environments where handling of the liquids commonly involved in absorption heat pumps is too hazardous. Environmentally friendly gases/vapors can be used in the adsorption heat pump.

The appliance 6 is a device that consumes electrical power for any purpose and generates heat (appliance cooling load), mostly as a parasitic loss, which needs to be removed. One preferred example for this appliance is a computer or a cluster of computers co-located in a data center.

A heat sink 8 for the system can be a large body of solid, liquid or gas. For example the heat sink can comprise, a cooling tower, ambient atmospheric air, soil, or a stream of water.

Also shown in FIG. 6 are the energies exchanged between the subsystems. The electrical power 12 provided by the electrical power generator 2 to the appliance 6 can be transferred using electrical wire, but other electrical power transfer mechanisms can also be used. The high temperature heat 10 is generated by the electrical power generator 2 and consumed by the heat driven heat pump 4. The high temperature heat 10 can be transported with a pumped fluid loop, such as a liquid loop, in which the fluid absorbs heat in or near the electrical power generator 2 and releases heat to the heat driven heat pump 4. Generally, this heat transfer can be accomplished by any heat transfer mechanism (i.e. conduction, convection, radiation, or any combination thereof). The cooling loop can also consist of gas or vapor coolant and/or solid beds. The appliance cooling load 14 is the amount of heat generated by the appliance 6, which needs to be removed by the heat pump 4. Heat is absorbed at or near the appliance 6 and transported to the heat driven heat pump 4. A liquid pumped loop or a stream of gas can be used to absorb the cooling load 14 from the appliance 6 and transport it to the heat driven heat pump 4. The moderate temperature heat 16 is the heat transferred from the heat driven heat pump 4 to the heat sink 8. Here again, convection, conduction, radiation, or any combination of these heat transfer mechanisms can be used to transport this heat. One possible implementation is atmospheric air blown through a heat exchanger inside the heat driven heat pump and released back to ambient. All three heat transfers (10, 14, 16) can be realized with a single or multiple heat streams. In the case of a LiBr-water heat driven heat pump, the moderate temperature heat 16 from the heat driven heat pump 4 to the heat sink 8 is commonly realized with two transport loops.

An example for the heat transfer loop from the heat driven heat pump 4 to the heat sink 8 is a pumped loop with tubes wrapped around the part of the heat driven heat pump 4 that requires cooling and coils of tubes buried in the soil. Another example is a blower sucking in ambient air, blowing it over the surface that needs to be cooled and a conduit releasing the warm air back to ambient.

Figure 7:
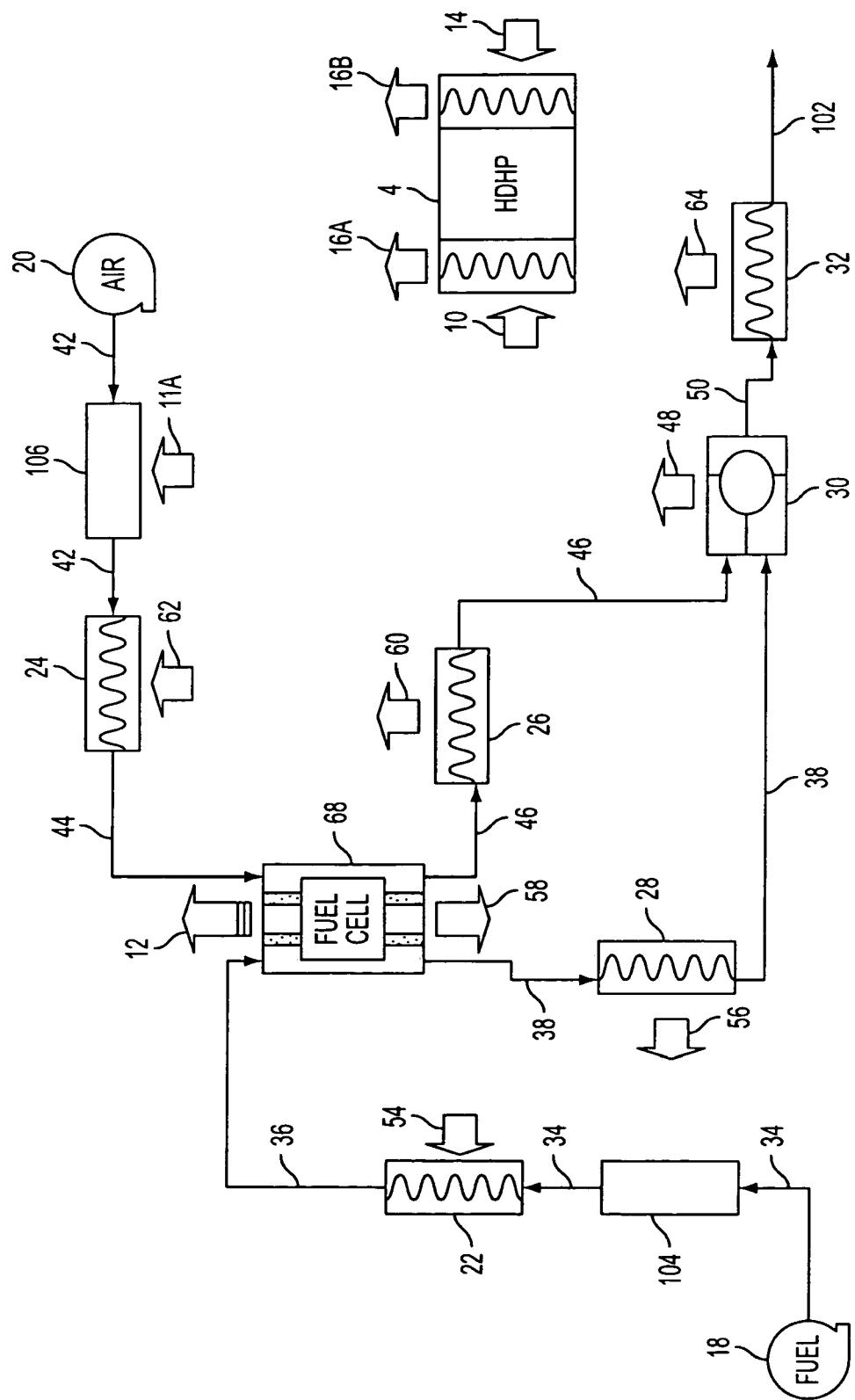

The subsystem formed by the electrical power generator 2 and the heat driven heat pump 4 is illustrated in FIG. 7 for the case where a high temperature fuel cell is used as the electrical power generator 2. The fuel cell 68 is preferably a high temperature fuel cell, such as a solid oxide fuel cell.

Fuel is delivered to the fuel cell with the help of a fuel blower 18, which can also be a compressor. For liquid fuels, the blower 18 is replaced by a pump. An optional fuel preconditioner 104 preprocesses the fuel. For example this device can remove contaminants detrimental to the function of the power generator, such as sulfur. Another possible function for the fuel preconditioner 104 is prereformation and/or reformation.

The fuel preheater 22 brings the fuel to fuel cell operating temperature. This preheater can be external to or an integral part of the fuel cell 68. It can be contained in one single or multiple devices. For a liquid fuel, the fuel preheater 22 evaporates the liquid fuel. For a gaseous fuel, the fuel preheater 22 can be a finned heat exchanger. A fuel preconditioner 104 can also be implemented after the fuel preheater 22 or integrated with the fuel preheater 22, or integral to fuel cell 68.

The fuel preheat 54 is the heat required raise the temperature of the input fuel to the fuel cell operating temperature. The fuel intake conduit 34 provides a path for the fuel from the fuel blower 18 to the fuel preheater 22. It may or may not have an intermediate fuel preconditioner 104. The fuel delivery conduit 36 provides a path for the fuel from the fuel preheater 22 to the fuel cell 68.

The oxidizer blower 20 drives air or any other suitable oxidizer toward the fuel cell 68. The oxidizer intake conduit 42 provides a transport path for the oxidizer between the oxidizer blower 20 and the oxidizer preheater 24. An optional oxidizer preconditioner 106 preprocesses the oxidizer flow. Examples of the preconditioner 106 include filters, and oxygen enrichment devices. The preconditioner heat 11A is heat required to operate this optional device. One example for one component of the preconditioner 106 is an oxygen enrichment device utilizing temperature swing adsorption, as described in the first preferred embodiment. The oxidizer preconditioner 106 can also be installed upstream of the oxidizer blower 20. The oxidizer preheater 24 brings the input oxidizer to fuel cell operating temperature using the oxidizer preheat 62. The oxidizer preheater 24 can be contained in single or multiple devices. In one preferred embodiment, the oxidizer is partially preheated in oxidizer preheater 24 and picks up additional heat inside the fuel cell 68, thereby cooling the fuel cell 68. One example for the oxidizer preheater 24 is a finned heat exchanger. The oxidizer delivery conduit 44 transports the oxidizer from the oxidizer preheater 24 to the fuel cell 68.

In the fuel cell 68, the fuel and the oxidizer are electrochemically reacted. This reaction produces electrical energy 12 and high temperature heat. The fuel cell high temperature heat 58 represents the part of the heat generated by the fuel cell which is harnessed for further use and not removed by the exhaust or the depleted oxidizer. Not all of the heat generated by the fuel cell can be harnessed and transported to other devices.

The fuel cell high temperature heat 58 can be utilized for various purposes. This heat can be used for the fuel preheat 54, the oxidizer preheat 62, preconditioner heat 11A, or the heat driven heat pump high temperature input heat 10. The fuel cell high temperature heat 58 can be directed to any combination of these heat consumers (10, 54, 62, 11A). One possibility for harnessing the fuel cell high temperature heat 58 is a gas cooling loop, separate from the oxidizer flow loop to the fuel cell.

The fuel cell outlet conduits 38 and 46 transport the electrochemical reaction products. If the fuel cell 68 is a solid oxide fuel cell, then the exhaust conduit 38 transports reacted fuel and the outlet oxidizer conduit 46 transports oxygen depleted oxidizer. The fuel outlet cooler 28 extracts the exhaust cooling heat 56 from the exhaust stream. The fuel outlet cooler 28 can be one or multiple devices and can be partly or fully integrated with the fuel cell 68. One example for the fuel outlet cooler 28 is a finned heat exchanger. The exhaust cooling heat 56 can be used for the fuel preheat 54, the oxidizer preheat 62, preconditioner heat 11A, or the heat driven heat pump high temperature input heat 10. The exhaust cooling heat 56 can be directed to any combination of these heat consumers (10, 54, 62, 11A).

The oxidizer outlet cooler 26 extracts the oxidizer cooling heat 60 from the outlet oxidizer stream. The oxidizer outlet cooler 26 can be one or multiple devices and can be partly or fully integrated with the fuel cell 68. One example for the oxidizer outlet cooler is a finned heat exchanger. The oxidizer cooling heat 60 can be used for the fuel preheat 54, the oxidizer preheat 62, preconditioner heat 11A, or the heat driven heat pump high temperature input heat 10. The oxidizer cooling heat 60 can be directed to any combination of these heat consumers (10, 54, 62, 11A).

The fuel outlet (i.e., exhaust) conduit 38 and the oxidizer outlet (i.e., exhaust) conduit 46 deliver fuel exhaust and oxygen depleted oxidizer to the optional burner 30. In the burner 30, these two gas streams are chemically reacted, generating the burner high temperature heat 48. The chemical reaction can be initiated by an optional catalyst material.

The burner high temperature heat 48 can be provided to the fuel preheat 54, the oxidizer preheat 62, preconditioner heat 11A, or the heat driven heat pump high temperature input heat 10. The burner high temperature heat 48 can be directed to any combination of these heat consumers (10, 54, 62, 11A). One preferred example of transport of the burner high temperature heat 48 is direct integration of the burner with the consumer (i.e. heat transfer by conduction to the consumer). Another preferred example for this heat transport is a pumped fluid loop.

The burner exhaust conduit 50 transports the reaction products from the burner 30 to the optional burner exhaust heat exchanger 32. In the burner exhaust heat exchanger 32 the burner exhaust heat 64 is extracted from the burner reaction products. One example for the burner exhaust heat exchanger 32 is a finned heat exchanger.

The burner exhaust heat 64 can be provided to the fuel preheat 54, the oxidizer preheat 62, preconditioner heat 11A, or the heat driven heat pump high temperature input heat 10. The burner exhaust heat 64 can be directed to any combination of these heat consumers (10, 54, 62, 11A). The burner heat exchanger exhaust conduit 102 transports the burner exhaust out of the system (preferably vented to ambient or into an exhaust post-processor).

The heat driven heat pump 4 is driven by the high temperature heat 10. After using heat from the high temperature heat 10 the heat driven heat pump 4 vents one heat stream in the heat pump low-temperature outflow 16A. The appliance cooling load 14 from appliance 6 is removed by the cooling stream 16B. The high temperature heat 10 can be provided by the fuel cell high temperature heat 58, the exhaust cooling heat 56, the oxidizer cooling heat 60, the burner high temperature heat 48, or the burner exhaust heat 64. The high temperature heat 10 can also be provided by any combination of these heat sources (48, 56, 58, 60, 64).

One preferred implementation for the appliance cooling load 14 and the heat 16B is ambient air driven by a blower into the heat driven heat pump 4, cooled below ambient temperature in the heat driven heat pump, and then directed to the appliance that requires cooling. At the appliance the cool air picks up the cooling load 14 and is heated. The heated air is vented back to ambient.

Figure 8A:
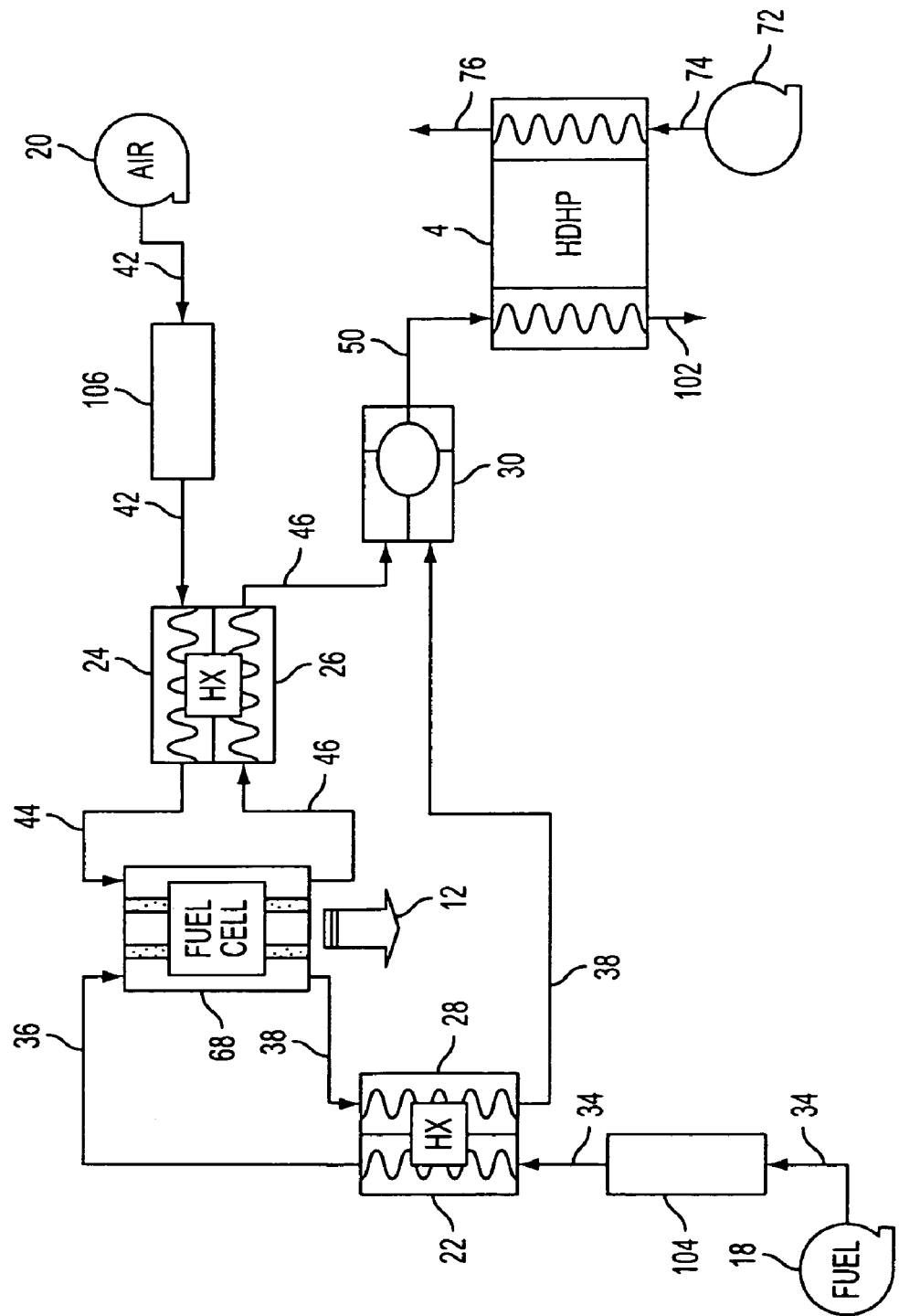

One preferred embodiment of the system shown in FIG. 7 is presented in FIG. 8A. The system shown in FIG. 8A follows the same outline presented for FIG. 7. FIG. 8A includes one preferred routing of the heat streams shown in FIG. 7. The fuel preheat 54 is provided by the fuel exhaust cooling heat 56. Optionally, the fuel can pick up additional heat in the fuel cell. The heat transfer from exhaust cooling heat 56 to fuel preheat 54 can be realized in a heat exchanger, for example a finned heat exchanger. One example of this configuration is to combine heat exchangers 22 and 28 as a single component. Depending on the choice of fuel, water vapor can be transferred from the exhaust to the input fuel. This water transport can be integrated into a heat exchanger or it can be realized with a separate device.

The oxidizer preheat 62 is provided partly by the oxidizer exhaust cooling heat 60. The remainder of the heat needed to bring the oxidizer to fuel cell operating temperature is absorbed in the fuel cell, thereby removing all of the high temperature heat from the fuel cell without an additional heat transfer loop. The heat transfer from oxidizer exhaust cooling heat 60 to oxidizer preheat 62 can be realized in a heat exchanger, for example a finned heat exchanger. One example of this configuration is to combine heat exchangers 24 and 26 as a single component. The burner high temperature heat 48 is not immediately extracted. Instead, it is extracted together with burner exhaust heat 64. The burner exhaust heat 64 is directed to the high temperature heat 10, which provides the necessary heat to actuate the heat driven heat pump 4. The heat transfer from the burner exhaust heat 64 to the heat driven heat pump 4 can be realized with a heat exchanger incorporated in the heat driven heat pump 4. Thus the burner exhaust heat exchanger 32 is combined with the heat exchanger in the heat pump 4 to form a single component. This heat exchanger can be a finned heat exchanger. The cooling load 14 can be extracted from the appliance 6 by a cool air stream provided by the heat driven heat pump 4, which is driven with a cooling air blower 72 through cooling air inlet duct 74 directed to the appliance with a cooling air conduit 76.

Table 1 presents an energy balance for a 100 kW electrical power system based on FIG. 8A. The naming convention, where applicable, is consistent with FIG. 8A.

TABLE 1

| Item | typical range low | typical range high | example layout | units |
|---|---|---|---|---|
| DC electrical power output 12 | 0.005 | 100 | 0.1 | [MW] |
| Fuel cell electrical efficiency (fraction of higher heating value of fuel supplied, which is available as DC electrical power) | 35% | 75% | 50% | |
| Fuel cell fuel conversion efficiency (fraction of fuel supplied, which is oxidized in fuel cell) | 50% | 90% | 80% | |
| Heat leakage fuel cell (fraction of heat generated in fuel cell which is not harnessed) | 5% | 50% | 20% | |
| Coefficient of performance heat driven heat pump (fraction of high temperature heat 10, which is available as cooling power 14) | 0.6 | 1.5 | 1.2 | |
| Fuel cell efficiency (fraction of heat of fuel oxidized in fuel cell, which is available as DC electrical power) | | | 62.5% | |
| High temperature heat generated by fuel cell | | | 0.060 | [MW] |
| Heat leakage from fuel cell (heat not harnessed) | | | 0.012 | [MW] |
| Burner high temperature heat 60 | | | 0.040 | [MW] |
| High temperature input heat 10 | | | 0.088 | [MW] |
| Cooling power available from heat driven heat pump | | | 0.106 | [MW] |

Figure 8B:
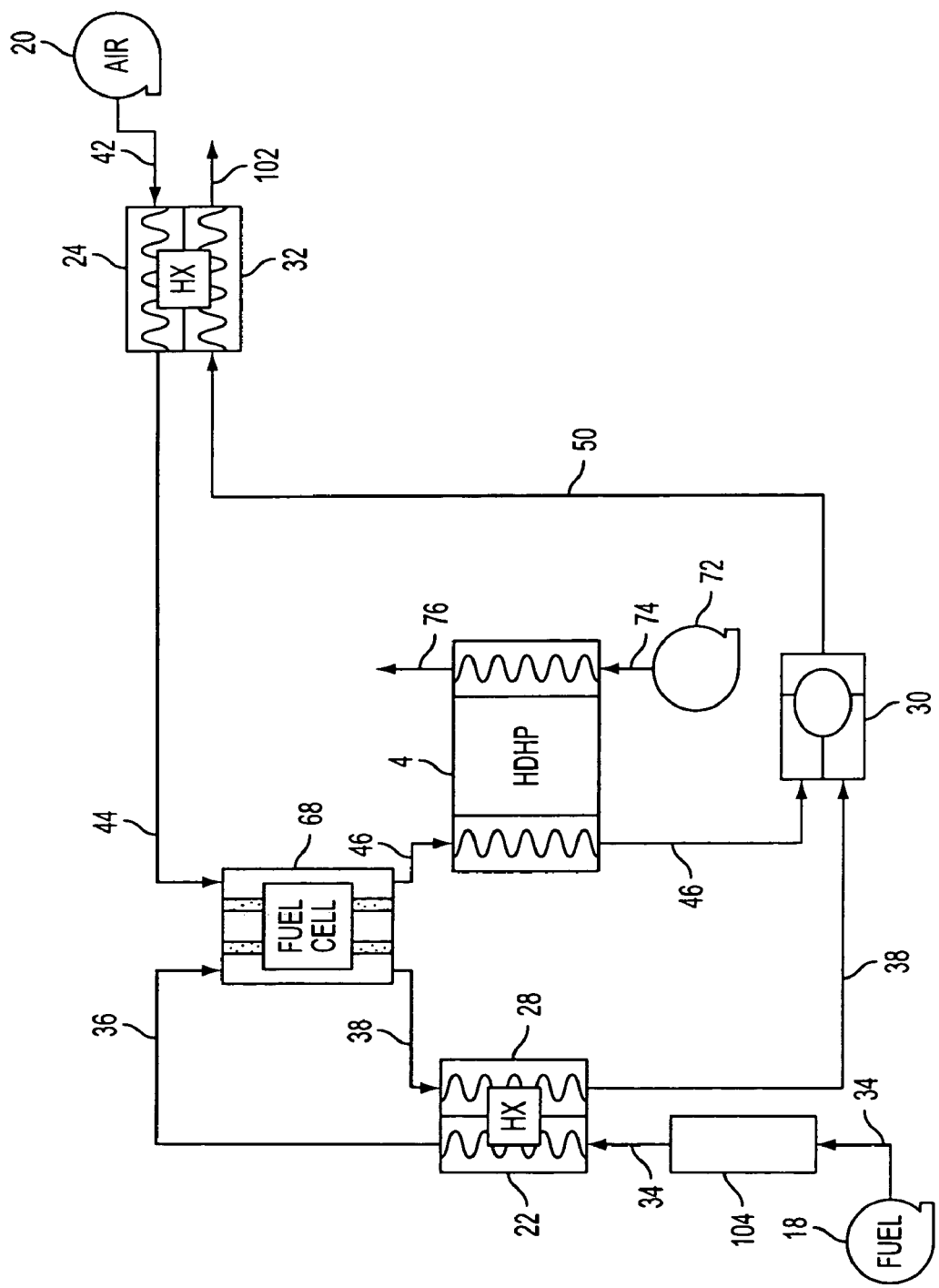

FIG. 8B illustrates another preferred aspect of the second embodiment of this invention. The system illustrated in FIG. 8B shows an alternative preferred routing of the heat streams shown in FIG. 7. The system depicted in FIG. 8B is similar to the system depicted in FIG. 8A, with the exception that the oxidizer cooling heat 60 is provided to the heat exchanger 4 as the high temperature heat 10, and the burner exhaust heat 64 is provided to the oxidizer preheater 24 as oxidizer preheat 62. Thus, the oxidizer outlet conduit 46 is provided into the heat exchanger of the heat pump 4 and then into the burner 30, while the burner exhaust conduit 50 is provided into the burner exhaust heat exchanger 32. Both the heat transfer from the oxidizer cooling heat 60 to the high temperature heat 10 and the burner exhaust heat 64 to the oxidizer preheat 62 can be realized with heat exchangers. Thus, the oxidizer preheater 24 and the burner exhaust heat exchanger 32 are combined as a single component and comprise portions of the same heat exchanger 24/32. Likewise, the outlet oxidizer cooler 26 and the heat exchanger portion of the heat pump 4 are combined as a single component and comprise a portion of the same heat exchanger.

Figure 8C:
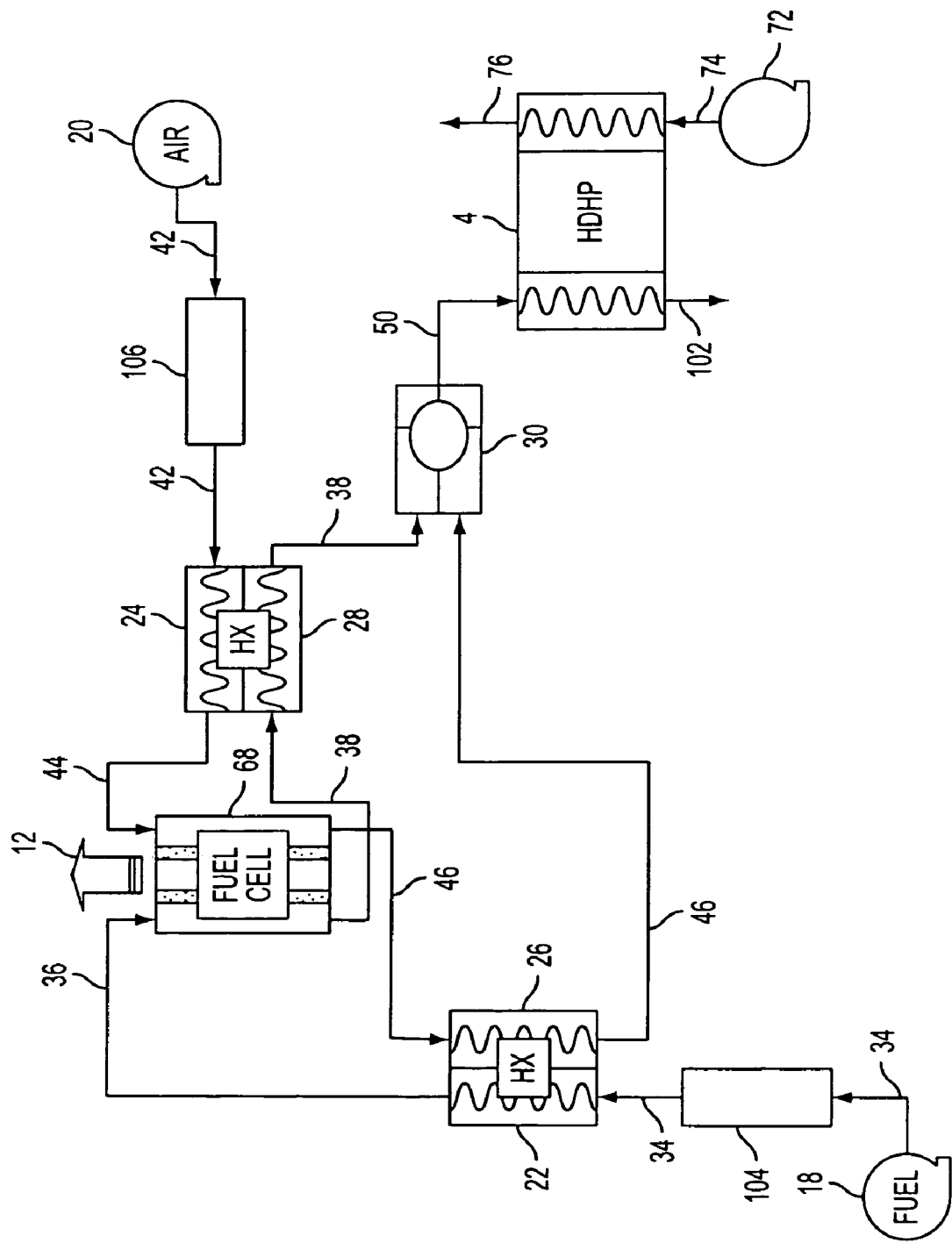

FIG. 8C illustrates another preferred aspect of the second embodiment of this invention. The system illustrated in FIG. 8C shows an alternative preferred routing of the heat streams shown in FIG. 7. The system depicted in FIG. 8C is similar to the system depicted in FIG. 8A, but differs by a cross-over of the exhaust fuel and oxidizer paths. In FIG. 8C, the fuel outlet conduit 38 is provided into the oxidizer outlet cooler 28, while the oxidizer outlet conduit 46 is provided into the fuel outlet cooler 26. Thus, the exhaust cooling heat 56 is provided as oxidizer preheat 62 and oxidizer cooling heat 60 is provided as fuel preheat 54. Both heat transfers can be realized with heat exchangers. Thus, the oxidizer preheater 24 and the fuel outlet cooler 28 are combined as a single component and comprise portions of the same heat exchanger 24/28. Likewise, the outlet oxidizer cooler 26 and the fuel preheater 22 are combined as a single component and comprise a portion of the same heat exchanger 22/26.

Figure 9:
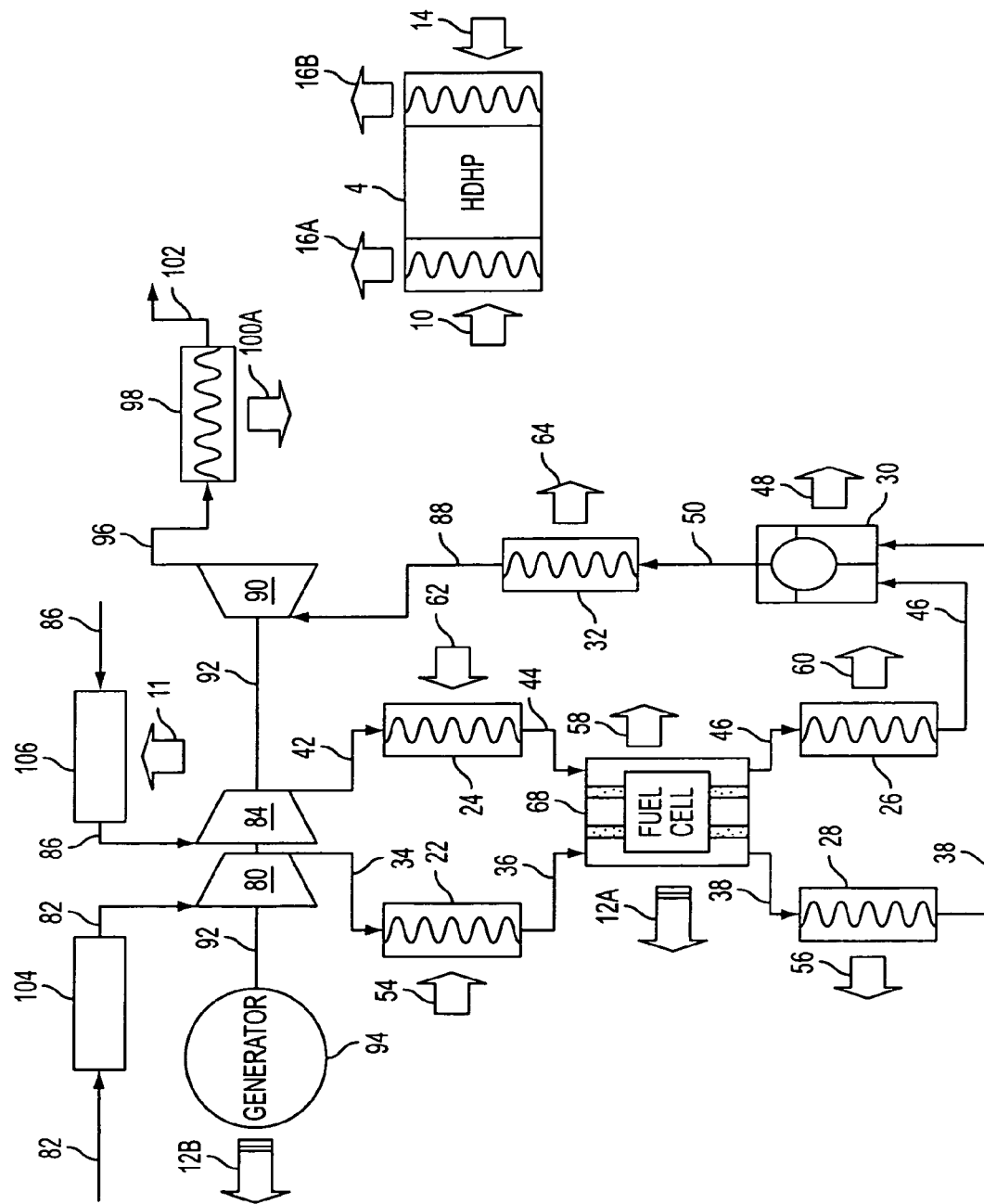

FIG. 9 shows another preferred embodiment of the system depicted in FIG. 6. The main difference between FIG. 7 and FIG. 9 is the addition of a gas turbine driven electrical power generator. The gas turbine can utilize the high temperature heat from the fuel cell to generate additional electrical energy and thereby further increase the electrical efficiency of the electrical power generator. High temperature waste heat is still available to drive a heat driven heat pump and thereby form a complementary system, which can provide matched electrical power and cooling. The increase of efficiency of the power generator implies that less high temperature heat per electrical power generated is available. Such an embodiment is used preferentially when the electrical load requirements are greater than the cooling load requirements and there are no environmental and permitting issues against the use of gas turbines. This embodiment can also be used with a heat driven heat pump of higher efficiency such as to complete the balance between the electrical and thermal loads in the system described above.

In FIG. 9 the fuel is compressed and transported into the system by the fuel compressor 80. A fuel compressor inlet conduit 82 delivers the fuel to the fuel compressor 80. For a liquid fuel, a fuel pump can be used instead of the fuel compressor 80. An optional fuel preconditioner 104 preprocesses the fuel. For example this device can remove contaminants detrimental to the function of the power generator, such as sulfur. Another possible function for the fuel preconditioner 104 is prereformation or reformation.

The fuel preheater 22 brings the fuel to fuel cell operating temperature. If the fuel is provided as a liquid, the fuel is evaporated in the fuel preheater 22. This preheater can be external to or an integral part of the fuel cell 68. It can be contained in one single or multiple devices. The fuel preheat 54 is the heat required to bring the fuel to fuel cell operating temperature. The fuel intake conduit 34 provides a path for the fuel from the fuel compressor 80 to the fuel preheater 22. The fuel delivery conduit 36 provides a path for the fuel from the fuel preheater 22 to the fuel cell 68.

The oxidizer compressor 84 drives air or any other suitable oxidizer to the fuel cell 68. The oxidizer compressor inlet conduit 86 delivers the oxidizer to the oxidizer compressor 84. An optional oxidizer preconditioner 106 preprocesses the oxidizer flow. Examples of the preconditioner 106 include filters, and oxygen enrichment devices. The preconditioner heat 11A is heat required to operate this optional device. One example for one component of the preconditioner 106 is an oxygen enrichment device utilizing temperature swing adsorption. The oxidizer preconditioner 106 can also be installed downstream of the oxidizer compressor 84. The oxidizer intake conduit 42 provides a transport path for the oxidizer between the oxidizer compressor 84 and the oxidizer preheater 24. The oxidizer preheater 24 brings the input oxidizer to fuel cell operating temperature using the oxidizer preheat 62. The oxidizer preheater 24 can be contained in a single or multiple devices. In one preferred embodiment, the oxidizer is partially preheated in oxidizer preheater 24 and picks up additional heat inside the fuel cell 68, thereby cooling the fuel cell 68. The oxidizer delivery conduit 44 transports the oxidizer from the oxidizer preheater 24 to the fuel cell 68.

In the fuel cell 68, the fuel and the oxidizer are electrochemically reacted. This reaction produces electrical energy 12A high temperature heat 58.

The oxidizer outlet cooler 26 extracts the oxidizer cooling heat 60 from the outlet oxidizer stream. The outlet oxidizer cooler 26 can be one or multiple devices and can be partly or fully integrated with the fuel cell 68. The fuel outlet cooler 28 extracts the exhaust cooling heat 56 from the exhaust stream. The fuel outlet cooler 28 can be one or multiple devices and can be partly or fully integrated with the fuel cell 68. One example for the coolers 26, 28 is a finned heat exchanger.

The fuel exhaust conduit 38 and the oxidizer outlet conduit 46 deliver fuel exhaust and oxygen depleted oxidizer to the optional burner 30. In the burner 30 these two gas streams are chemically reacted, generating the burner high temperature heat 48.

The burner high temperature heat 48 can be provided to the fuel preheat 54, the oxidizer preheat 62, the preconditioner heat 11A, or the high temperature heat 10. The burner high temperature heat 48 can be directed to any combination of these heat consumers (10, 11A, 54, 62).

The burner exhaust conduit 50 transports the reaction products from the burner 30 to the optional burner exhaust heat exchanger 32. In the burner exhaust heat exchanger the burner exhaust heat 64 is extracted from the burner reaction products.

The burner exhaust heat 64 can be provided to the fuel preheat 54, the oxidizer preheat 62, the preconditioner heat 11A, or the high temperature heat 10. The burner exhaust heat 64 can be directed to any combination of these heat consumers (10, 11A, 54, 62).

The turbine inlet conduit 88 transports the burner exhaust to the turbine 90. A mechanical coupling 92 transmits mechanical energy from the turbine 90 to the oxidizer compressor 84, the fuel compressor 80, and/or the electrical generator 94. If desired, the compressors may be actuated by another source of mechanical energy and/or electrical power. The electrical generator 94 generates additional electrical power 12B.

The turbine outlet conduit 96 transports the turbine exhaust to the optional turbine exhaust heat exchanger 98. In the turbine exhaust heat exchanger the turbine exhaust heat 100A is extracted from the gas flow. The turbine exhaust heat 100A can be provided to the fuel preheat 54, the oxidizer preheat 62, the preconditioner heat 11A, or the high temperature heat 10. The turbine exhaust heat 100A can be directed to any combination of these heat consumers (10, 11A, 54, 62). The exhaust conduit 102 transports the exhaust gases out of the system (preferably vented to ambient or into an exhaust post-processor).

The heat driven heat pump 4 is driven by the high temperature heat 10. After utilizing heat from the high temperature heat 10, the heat driven heat pump 4 vents one heat stream in the moderate temperature heat 16A. The appliance cooling load 14 from appliance 6 is removed by the cooling stream 16B. The high temperature heat 10 can be provided by the fuel cell high temperature heat 58, the exhaust cooling heat 56, the oxidizer cooling heat 60, the burner high temperature heat 48, the burner exhaust heat 64, or the turbine exhaust heat 100A. The high temperature heat 10 can also be provided by any combination of these heat sources (46, 56, 58, 60, 64, 100A).

Figure 10A:
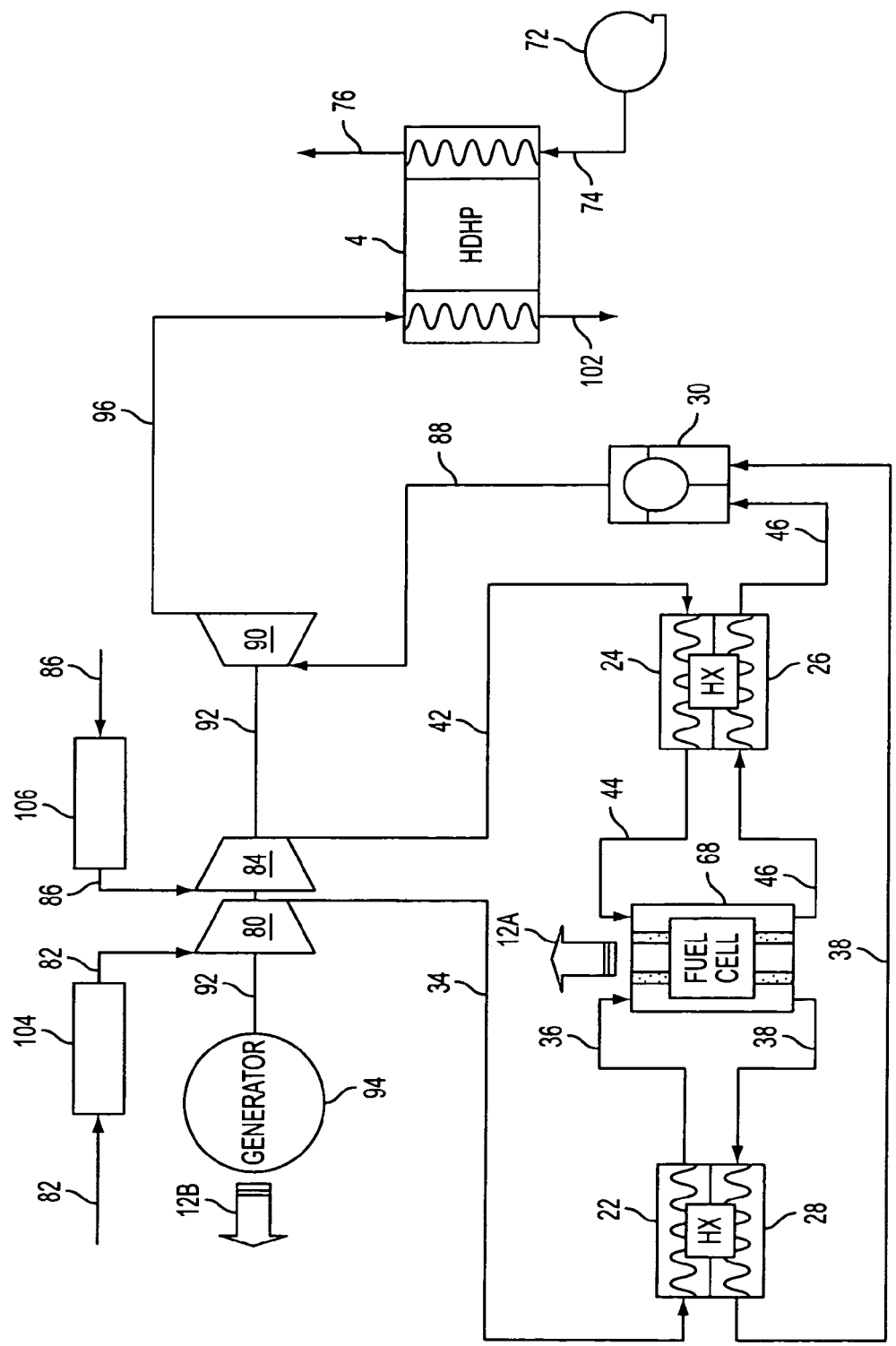

One preferred embodiment of the system shown in FIG. 9 is presented in FIG. 10A. The system shown in FIG. 10A follows the same outline presented for FIG. 9. FIG. 10A includes one preferred routing of the heat streams involved. The fuel preheat 54 is provided by the exhaust cooling heat 56. Optionally, the fuel can pick up additional heat in the fuel cell. The heat transfer from exhaust cooling heat 56 to fuel preheat 54 can be realized in a heat exchanger, for example a finned heat exchanger 22/28. Depending on the choice of fuel, water vapor can be transferred from the exhaust to the input fuel. This water transport can be integrated into a heat exchanger or it can be realized with a separate device. The oxidizer preheat 62 is provided partly by the oxidizer cooling heat 60. The remainder of the heat needed to bring the oxidizer to fuel cell operating temperature is absorbed in the fuel cell, thereby removing all of the high temperature heat from the fuel cell without an additional heat transfer loop. The heat transfer from oxidizer cooling heat 60 to oxidizer preheat 62 can be realized in a heat exchanger, for example a finned heat exchanger 24/26.

The burner high temperature heat 48 together with the high temperature heat from the fuel cell carried by the burner exhaust gas 64 is first used to drive the turbine 90. The remaining heat after the turbine is used as high temperature heat 10 to drive the heat driven heat pump 4.

The heat transfer from the turbine exhaust heat 100A to the heat driven heat pump 4 can be realized with a heat exchanger incorporated in the heat driven heat pump 4. Thus the turbine exhaust heat exchanger 98 and the heat exchanger portion of the heat pump 4 are combined as a single heat exchanger. This heat exchanger can be a finned heat exchanger. The cooling load 14 can be absorbed from the appliance 6 by a cool air stream provided by the heat driven heat pump 4, which is driven with a cooling air blower 72 through cooling air inlet duct 74 directed to the appliance with a cooling air conduit 76.

Figure 10B:
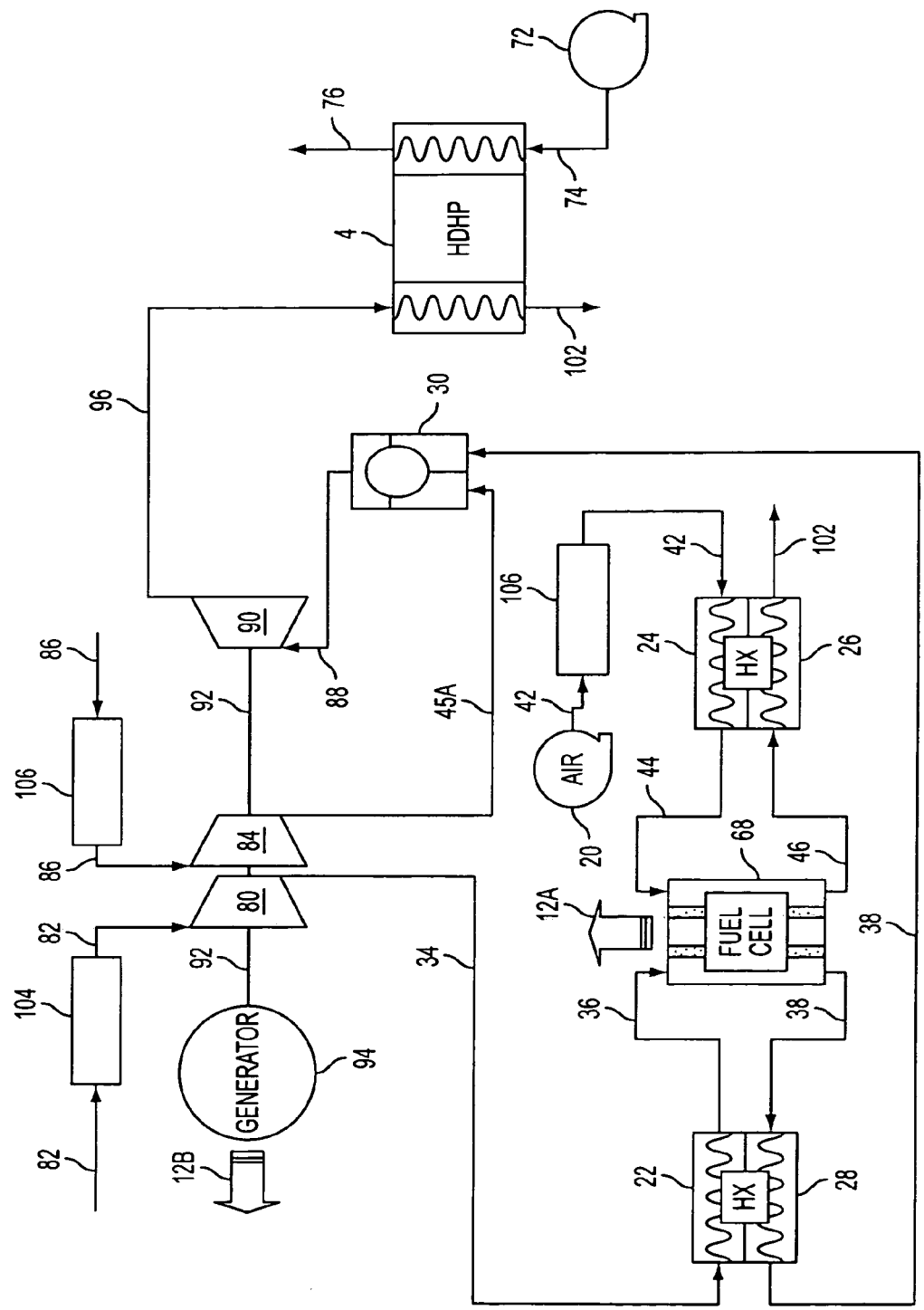

FIG. 10B illustrates another preferred aspect of the second embodiment of this invention. The system illustrated in FIG. 10B shows an alternative preferred routing of the oxidizer stream shown in FIGS. 9 and 10A. The system depicted in FIG. 10B is similar to the system depicted in FIG. 10A, with the exception of the oxidizer routing. In the system of FIG. 10B, the gas turbine 90 and the fuel cell 68 are fed with separate oxidizer streams. An oxidizer blower 20 is used for the oxidizer supply for the fuel cell. This blower can also be a compressor. The compressor 84 delivers oxidizer to the burner 30 via conduit 45A. The unreacted fuel from the fuel cell is combusted in the burner. The burner exhaust drives the turbine 90. The advantage of this system is that a higher oxygen content oxidizer is supplied to the burner. This improves the combustion process in the burner and subsequently improves the turbine operation.

Figure 10C:
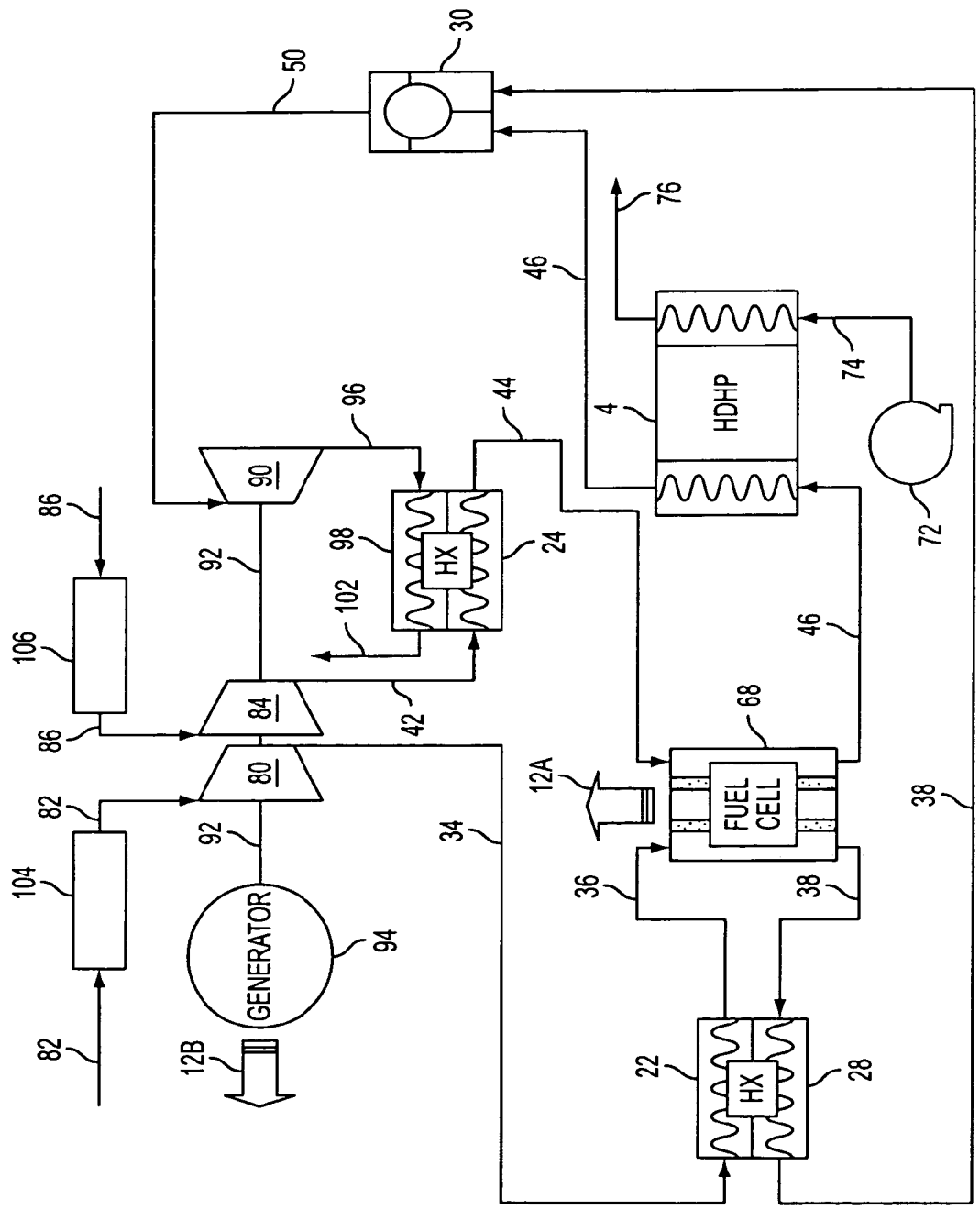

FIG. 10C illustrates another preferred aspect of the second embodiment of this invention. The system illustrated in FIG. 10C shows an alternative preferred routing of the heat streams shown in FIG. 9. The system in FIG. 10C is differs from the system in FIG. 10A by the sequence of heat usage from the oxidizer. In FIG. 10C the oxidizer leaving the fuel cell 68 first delivers the oxidizer cooling heat 60 to the high temperature input heat 10 in the heat pump 4, and then enters the burner 30. The oxidizer preheat 62 is provided by the turbine exhaust heat 100A. Thus, the oxidizer preheater 24 and the turbine exhaust heat exchanger 98 are combined as a single component and comprise portions of the same heat exchanger 24/98. Likewise, the outlet oxidizer cooler 26 and the heat exchanger portion of the heat pump 4 are combined as a single component and comprise a portion of the same heat exchanger.

The system in FIG. 10C relates similarly to FIG. 10A as the system in FIG. 8B relates to the system in FIG. 8A. The system in FIG. 10C can also incorporate the use of separate oxidizers for the fuel cell and the burner 30, as shown in FIG. 10B. It may be advantageous to provide separate oxidizer streams for the fuel cell 68 and the turbine 90.

Figure 10D:
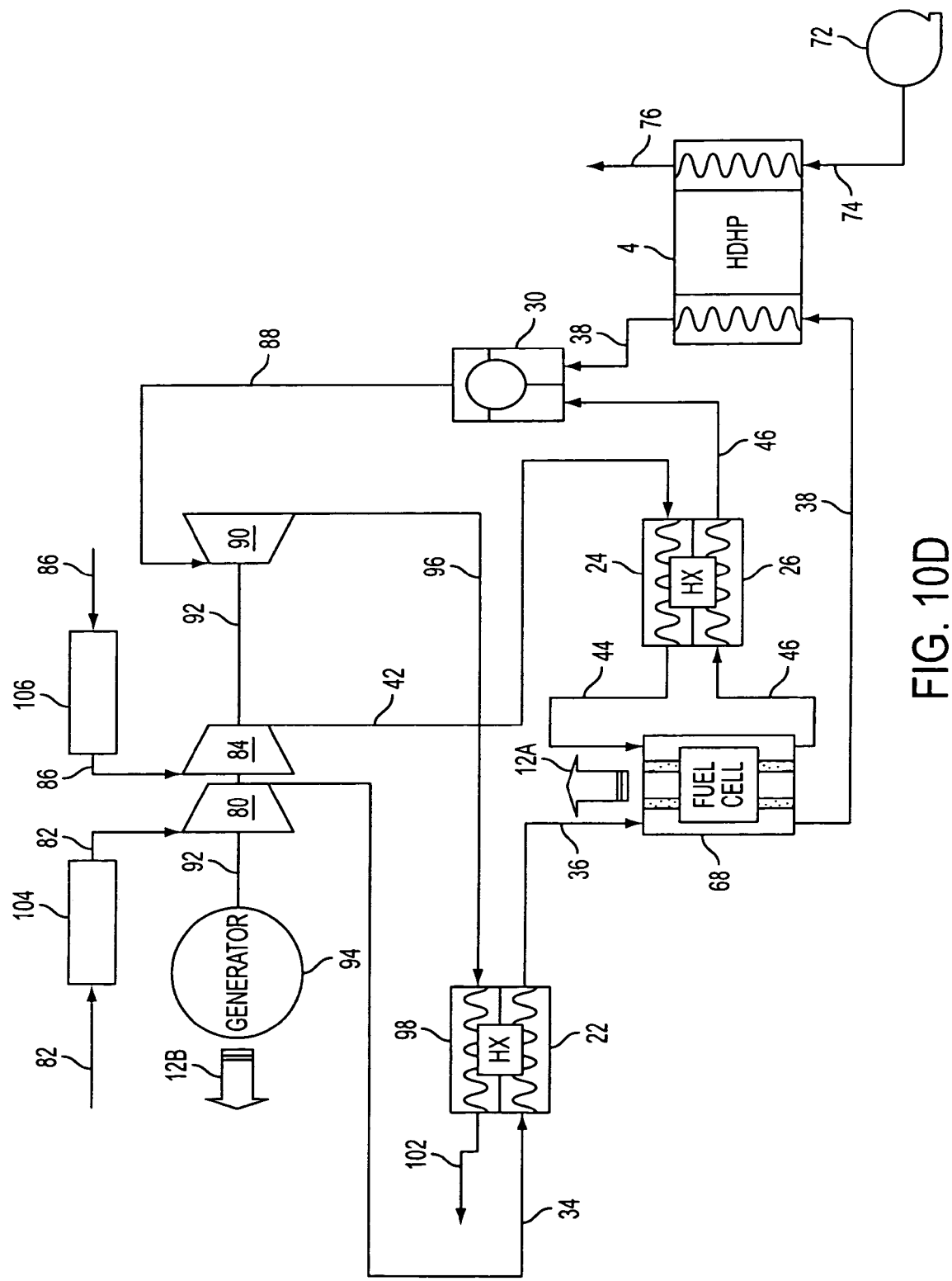

FIG. 10D illustrates another preferred aspect of the second embodiment of this invention. The system illustrated in FIG. 10D shows an alternative preferred routing of the heat streams shown in FIG. 9. The system depicted in FIG. 10D is similar to the system depicted in FIG. 10A, but differs by the routing of the heat fluxes. In FIG. 10D, the fuel preheat 54 is provided by the turbine exhaust heat 100A, while the high temperature heat 10 is provided by the fuel exhaust cooling heat 56. Thus, the turbine outlet conduit 96 is provided into the turbine exhaust heat exchanger 98, while the fuel cell fuel outlet conduit 38 is provided into the heat exchanger portion of the heat pump 4. Thus, the turbine exhaust heat exchanger 98 and the fuel preheater 22 are combined as a single component and comprise portions of the same heat exchanger 22/98. Likewise, the outlet fuel cooler 28 and the heat exchanger portion of the heat pump 4 are combined as a single component and comprise a portion of the same heat exchanger. This routing can be applied to any of the systems of FIGS. 10A, 10B and 10C previously discussed.

FIGS. 6 to 10D present the basic layouts of the components of the systems of the preferred aspects of the second embodiment. These components can also be combined in a large number of other ways not shown in these Figures. Any component or combination of components shown in one figure may be used in a system shown in any other figure. For example, the cross over of the fuel cell fuel and oxidizer exhaust paths shown in FIG. 8C can be applied to the systems shown in FIGS. 8A, 8B, 10A, 10B, 10C, 10D, as well as combinations of these systems.

| Parts List | |
|---|---|
| electrical power generator | 2 |
| heat driven heat pump | 4 |
| appliance | 6 |
| heat sink | 8 |
| high temperature heat | 10 |
| preconditioner input heat | 11A |
| electrical power | 12 |
| appliance cooling load | 14 |
| moderate temperature heat | 16 |
| heat pump low-temperature outflow | 16A |
| low temperature outflow | 16B |
| fuel blower | 18 |
| oxidizer blower | 20 |
| fuel preheater | 22 |
| oxidizer preheater | 24 |
| oxidizer outlet cooler | 26 |
| fuel outlet cooler | 28 |
| burner | 30 |
| burner exhaust heat exchanger | 32 |
| fuel intake conduit | 34 |
| fuel delivery conduit | 36 |
| fuel cell fuel outlet conduit(s) | 38 |
| oxidizer intake conduit | 42 |
| oxidizer delivery conduit | 44 |
| conduit from oxidizer compressor to burner | 45A |
| fuel cell oxidizer outlet conduit(s) | 46 |
| burner high temperature heat | 48 |
| burner exhaust conduit | 50 |

-continued

Parts List

| | |
|---|---|
| fuel preheat | 54 |
| fuel exhaust cooling heat | 56 |
| fuel cell high temperature heat | 58 |
| oxidizer exhaust cooling heat | 60 |
| oxidizer preheat | 62 |
| burner exhaust heat | 64 |
| fuel cell | 68 |
| appliance cooling load | 70 |
| cooling air blower | 72 |
| cooling air conduit | 74 |
| cooling air outlet | 76 |
| burner exhaust cooler | 78 |
| fuel compressor | 80 |
| fuel compressor inlet conduit | 82 |
| oxidizer compressor | 84 |
| oxidizer compressor inlet conduit | 86 |
| turbine inlet conduit | 88 |
| turbine | 90 |
| mechanical coupling | 92 |
| electrical generator | 94 |
| turbine outlet conduit | 96 |
| turbine exhaust heat exchanger | 98 |
| turbine exhaust heat | 100A |
| exhaust conduit | 102 |
| fuel cell electrical power | 12A |
| generator electrical power output | 12B |
| fuel preconditioner | 104 |
| oxidizer preconditioner | 106 |

III. The Third Preferred Embodiment

Figure 11:
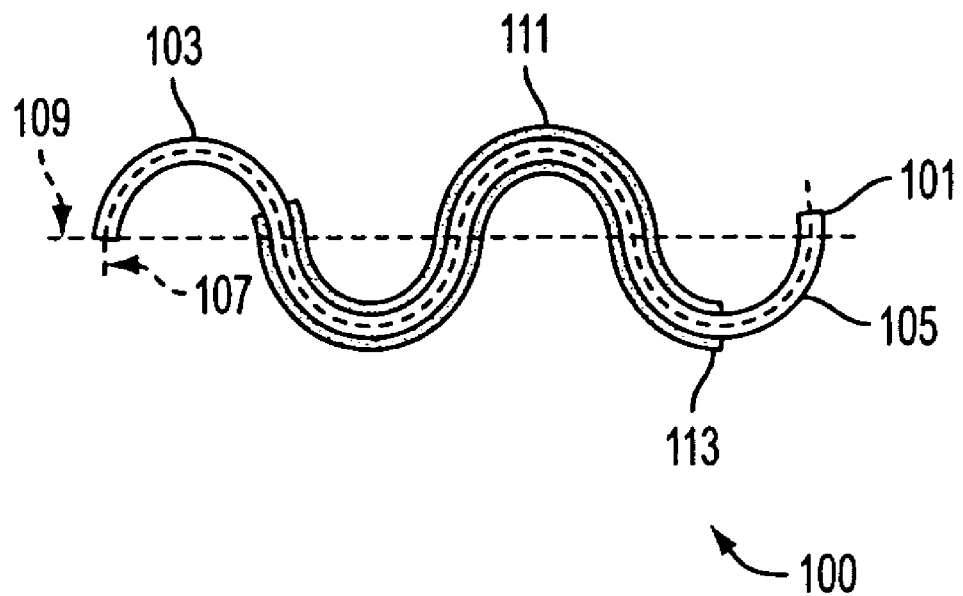
FIG. 11 is a schematic side cross sectional view of a prior art solid oxide fuel cell.

In one prior art solid oxide fuel cell 100, the ceramic electrolyte 101 is corrugated, as shown in FIG. 11. While the whole electrolyte 101 is bent or corrugated, its major surfaces 103, 105 are smooth or uniform. Thus, the electrolyte 101 has the same thickness along its length. However, the imaginary center line 107 running along the length of the electrolyte 101 significantly deviates from an imaginary straight line 109. The anode 111 and cathode 113 are formed on the uniform surfaces 103, 105 of the electrolyte 101. Such a corrugated electrolyte 101 is difficult to manufacture and even more difficult to properly integrate in a fuel cell stack containing a plurality of fuel cells.

Figure 12:
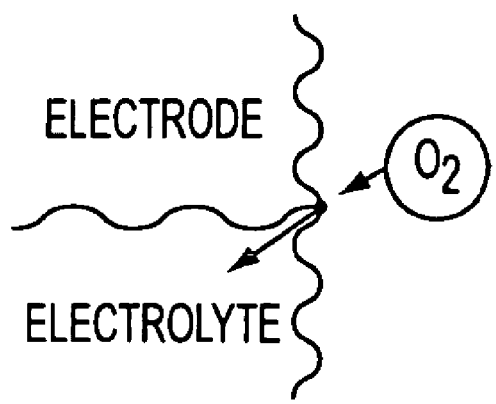
FIG. 12 is a schematic illustration of oxygen transport through the electrolyte.

The present inventors have realized that if at least a portion of at least one surface of the electrolyte is made non-uniform, then several advantages may be realized. The oxygen diffusion through an electrolyte in a solid oxide fuel cell proceeds between so-called "three phase boundaries." These three phase boundaries are electrolyte grain boundary regions at the boundary of an electrode (i.e., cathode or anode) and electrolyte, as shown in FIG. 12. Diffusing oxygen makes up the third "phase." If the active portions of one or both major surfaces of the electrolyte are made non-uniform, then the surface area between the electrolyte and the electrode contacting the non-uniform surface is increased. The "active portion" of the electrolyte is the area between the electrodes that generates the electric current. In contrast, the peripheral portion of the electrolyte is used for attaching the electrolyte to the fuel cell stack and may contain fuel and oxygen passages. The increased surface area results in more three phase boundary regions, which allows more oxygen to diffuse through the electrolyte. This increases the power density (i.e., watts per cm$^2$) of the fuel cell and decreases the cost per watt of the fuel cell. Furthermore, the non-uniform surface, such as a textured or roughened electrolyte surface provides better adhesion to the adjacent electrodes of the fuel cell due to improved mechanical interlocking.

Figure 13:
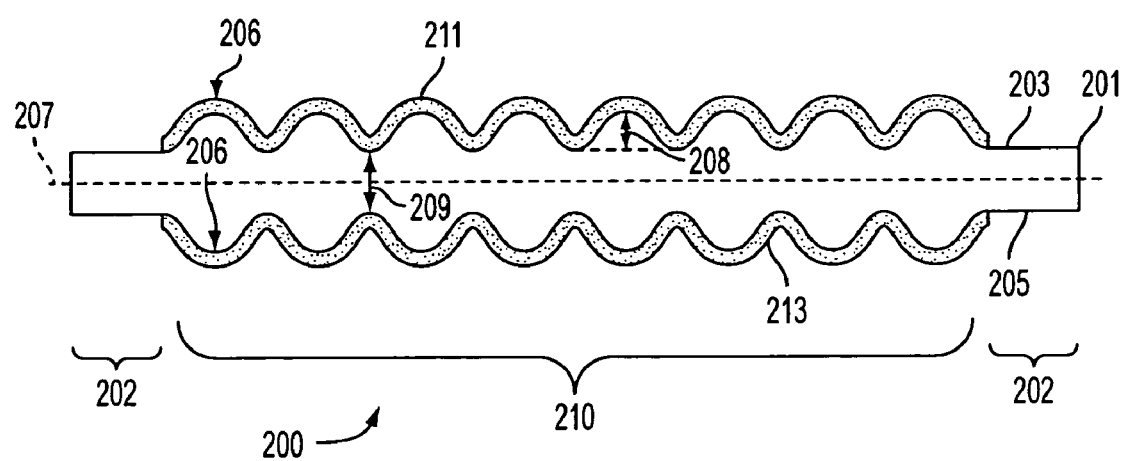
FIGS. 13, 15 and 16 are schematic side cross sectional views of solid oxide fuel cells according to the third preferred embodiment.

FIG. 13 illustrates a solid oxide fuel cell 200 containing a ceramic electrolyte 201 having at least one non-uniform surface portion, according to a first preferred aspect of the third embodiment. The at least one non-uniform surface in the first preferred aspect is a textured surface. Preferably, two opposing major surfaces 203, 205 are textured. A textured surface 203, 205 contains a plurality of protrusions (i.e., bumps, peaks, etc.) 206 having a height 208 that is 5% or less, preferably 1% or less of an average electrolyte thickness 209. In a preferred aspect of this embodiment, the electrolyte is textured to obtain an electrolyte having a surface roughness of 0.5 to 2.5 microns, preferably 1 to 2 microns. This surface roughness possesses good adhesion to common SOFC electrodes. The height and width of the protrusions 206 is exaggerated in FIG. 13 for clarity. The protrusions 206 may have any desired shape, such as rectangular, polygonal, triangular, pyramidal, semi-spherical or any irregular shape. Preferably, only the active portions 210 of the opposing major surfaces 203, 205 are textured, while the peripheral portions 202 of the surfaces 203, 205 are not textured. However, if desired, the entire major surfaces 203, 205 may be textured. For example, in adhesive or compression seals, where the integrity of the seal increases with the area of the contact surfaces, texturing the peripheral portions can increase the seal integrity and/or reduce the "non-active" peripheral area of the fuel cell.

In contrast to the corrugated electrolyte of FIG. 11, the electrolyte shown in FIG. 13 is substantially flat. The imaginary center line 207 running along the length of the electrolyte 201 does not significantly deviate from an imaginary straight line. While the whole electrolyte 201 is substantially flat, its major opposing surfaces 203, 205 are non-uniform and textured. The anode 211 and cathode 213 are formed on the textured surfaces 203, 205 of the electrolyte 201. The substantially flat electrolyte is advantageous because it is easier to manufacture, because it is easier to integrate into a fuel cell stack and because it is more durable than a corrugated electrolyte. However, if desired, the textured surface(s) may be located on a non-flat or corrugated electrolyte.

The electrolyte, anode and cathode may be made of any appropriate materials. Preferably, the electrolyte comprises a yttria stabilized zirconia (YSZ) ceramic. The cathode preferably comprises a Perovskite ceramic having a general formula ABO$_3$, such as LaSrMnO$_3$ ("LSM"). The anode preferably comprises a metal, such as Ni, or a metal containing cermet, such as a Ni-YSZ or Cu-YSZ cermet. Other suitable materials may be used if desired.

The non-uniform surface of the electrolyte may be formed by any suitable method. Preferably, the non-uniform surface is made by providing a ceramic green sheet and patterning at least a portion of at least one surface of the green sheet to form at least a non-uniform portion of the at least one surface. The green sheet may then be sintered (i.e., fired or annealed at a high temperature) to form the ceramic electrolyte. It should be noted that the term "green sheet" includes a green tape or a sheet of finite size. Preferably both sides of the green sheet are patterned to form two opposing non-uniform surface portions of the green sheet.

Figure 14:
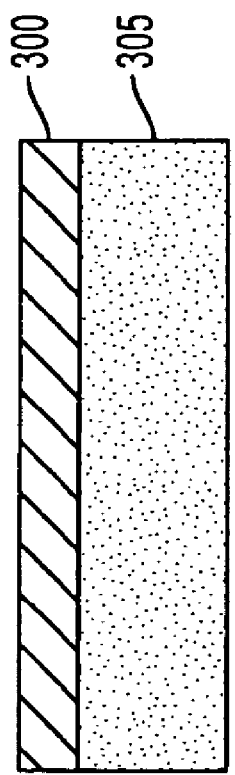
FIG. 14 is a schematic side cross sectional view of a prior art multi-layer solid oxide electrolyte.
Figure 15:
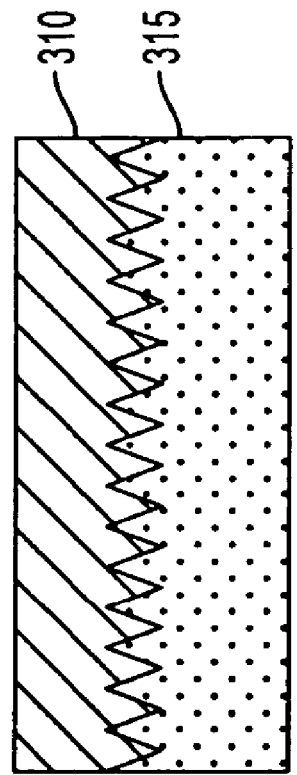
Figure 16:
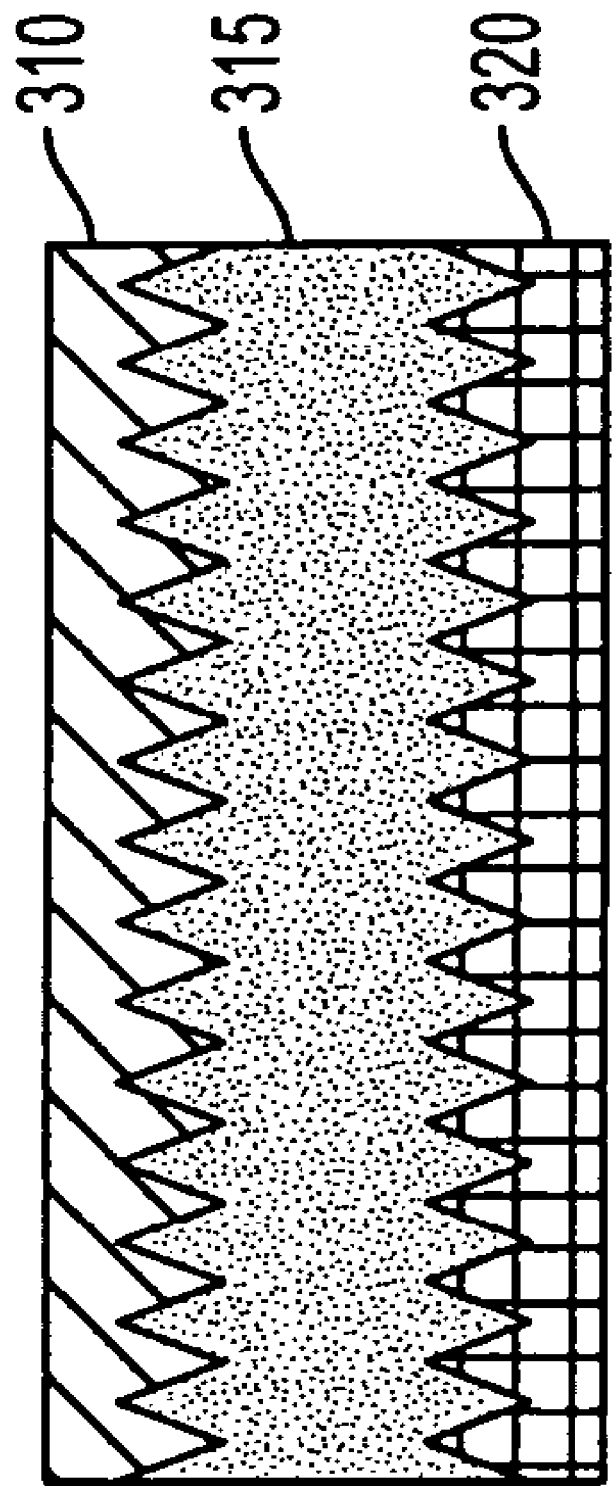

Another preferred aspect of the third embodiment of the present invention is directed to a composite electrolyte with a textured interface. FIG. 14 illustrates a prior art composite electrolyte, while FIGS. 15 and 16 illustrate a composite electrolyte with a textured interface according to the third preferred embodiement. It can be advantageous to fabricate the electrolyte not from one single material, which is typically yttria stabilized zirconia (YSZ), but to use several layers of materials. One example for composite electrolyte is a samaria-doped ceria (SDC) electrolyte coated with YSZ on one or both sides. SDC has the advantage over YSZ to provide higher ionic conductivity. However, the application of SDC is limited by its ability to withstand low oxygen partial pressures. At low oxygen partial pressures SDC can be reduced, lose its ionic conductivity in part or in whole and thereby cause a critical failure in a solid oxide fuel cell. YSZ has a lower ionic conductivity, which implies higher electrical losses within this material, but it can withstand lower oxygen partial pressures compared to SDC. Also, SDC displays electron conductivity at elevated temperatures, which is detrimental to the performance of a fuel cell. A layer of YSZ next to SDC can effectively suppress electron conduction, since YSZ is a very weak electron conductor.

FIG. 14 shows a prior art YSZ electrolyte 300, which is coated or laminated with a layer of SDC 305. One example is to use the SDC on the cathode side of the solid oxide fuel cell, which is not exposed to the reacting fuel, and thereby not exposed to low oxygen partial pressure, while the YSZ is used on the anode side.

The high oxygen ion conductivity in SDC can create a rate limiting step at the interface between SDC and YSZ. The losses at the interface between the two materials can be reduced by increasing the surface area of the interface. An increase in interface area can be accomplished by texturing the interface. FIG. 15 shows a cross section of a composite electrolyte with a textured internal interface. Here a textured layer of SDC 315 is attached to a layer of YSZ 310.

The combination of YSZ and SDC is one example where a textured interface can be used. Other material combination can also be used with textured interfaces. The composite electrolyte can consist of two layers as shown in FIG. 15 or of three or more layers 310, 315, 320 with at least one, and preferably more than one textured interface 303, 305 as shown in FIG. 16.

Textured interfaces can be formed by any, suitable method. One method is the lamination of two textured matching surfaces. Another method is the application of the second layer onto a textured surface of the first material, for example by tape casting or by screen printing. In a preferred example, the SDC is provided as a mechanically supporting substrate with a thickness of about 50 to 200 micrometers, preferably about 100 micrometers and the YSZ is deposited on the substrate as a thin protective layer of about 10 to 50 micrometers, preferably about 20 micrometers. In this case, the surface texture can have a thickness of about 10 micrometers. However, texturing on larger and smaller length scales is also possible.

The textured internal interfaces (i.e., interface surfaces) illustrated in FIGS. 15 and 16 can be formed on composite electrolytes also having textured outer surfaces 203, 205 (i.e., surfaces that contact the electrodes). One or both of the outer composite electrolyte surfaces can be textured.

Additional layers that offer superior mechanical, thermal, and/or electrical properties may be added to composite or single layer electrolytes to provide improved superior mechanical, thermal, and/or electrical properties compared to single layer electrolytes. Furthermore, multiple layers of functionally graded electrodes (anodes and/or cathodes) may be provided on single layer or composite electrolytes.

Figure 17:
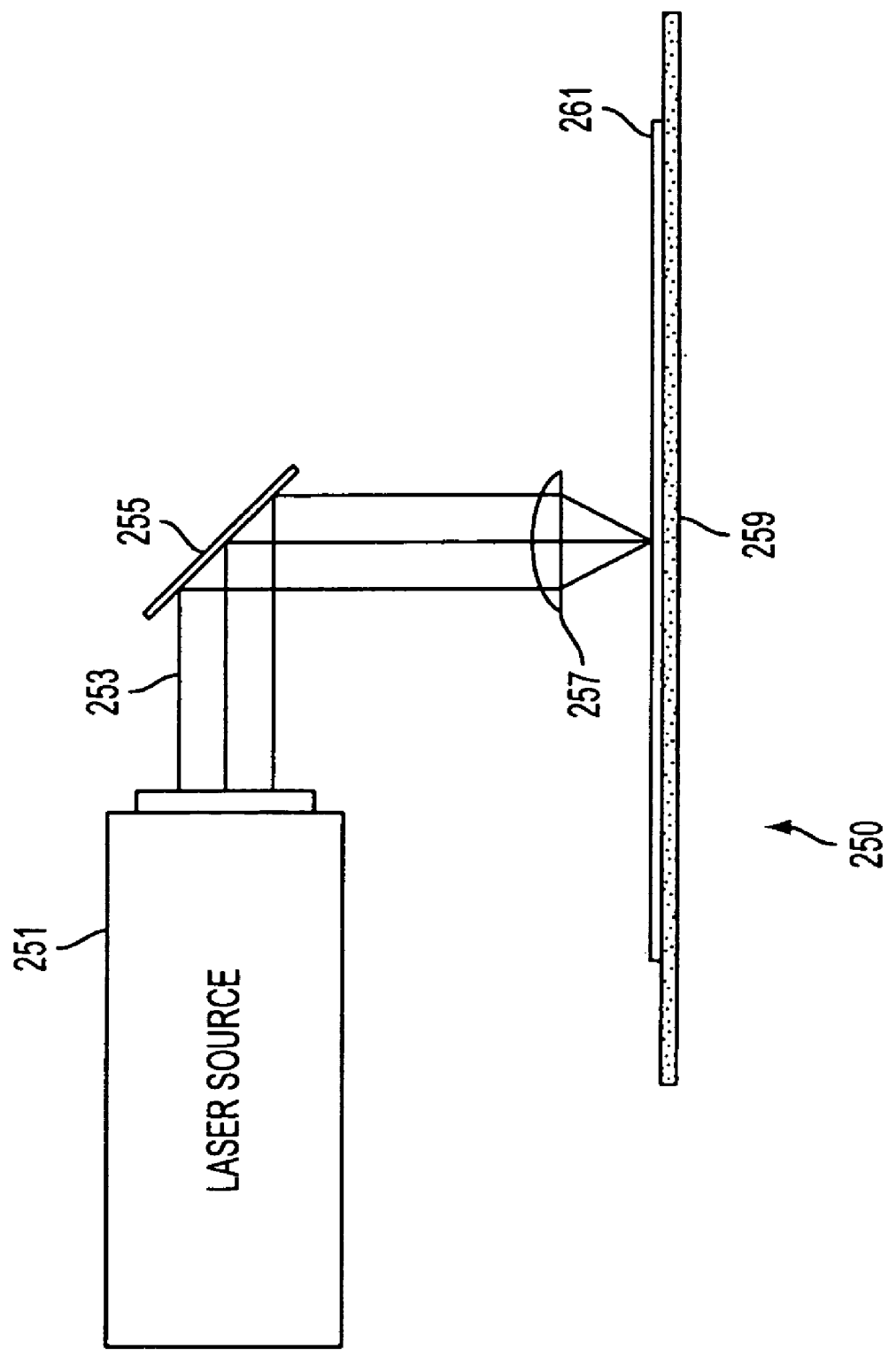
FIGS. 17–24 are schematic side cross sectional views of methods of making the electrolyte according to the third preferred embodiment.

The textured surface(s) 203, 205 illustrated in FIGS. 13 and 15 may be textured by several different methods. In one preferred aspect of the third embodiment, the textured surface is formed by laser ablating the green sheet, following by sintering the green sheet. Any suitable laser ablation method and apparatus may be used to texture the green sheet. A schematic illustration of a laser ablation apparatus 250 suitable for texturing the green sheet surface is shown in FIG. 17. A laser source 251 directs a laser beam 253 at a reflective mirror 255. The mirror 255 directs the beam 253 through a focusing lens 257 onto the green sheet (such as an unfired electrolyte tape) 261 located on the precision XYZ table 259. Any laser source 251 which has sufficient power to ablate the green sheet 261 may be used. For example, excimer or YAG lasers may be used as the laser source 251. The laser beam 253 is scanned over the surface of the green sheet 261 by moving the XYZ table and/or by moving the mirror 255. The laser beam power may be varied during the scanning to achieve a non-uniform textured green sheet surface. For example, the laser source 251 may be periodically turned on and off, or it may be attenuated by an attenuator (not shown) to vary the laser beam power. Alternatively, the XYZ table may be moved up and down during the scanning of the beam 253 to vary the beam power that impinges on the green sheet 261. The laser beam position and/or power and/or table movement may be controlled by a computer to create a desired pattern on the electrolyte. The laser beam 253 ablates (i.e., removes or roughens) a portion of a top surface of the green sheet 261 to leave a textured surface. The textured green sheet is then sintered or fired to form the ceramic electrolyte. Alternatively, the laser ablation may be conducted after the sintering step on the sintered electrolyte.

Figure 18:
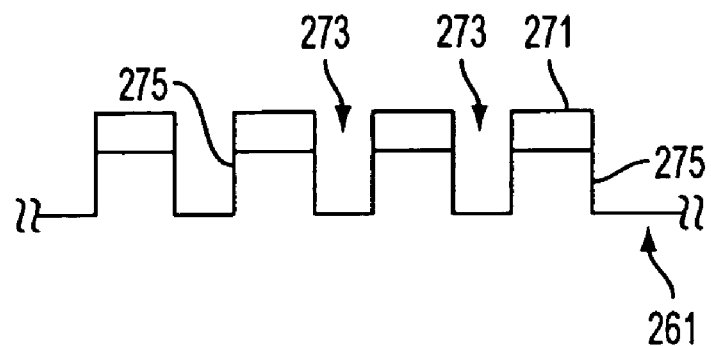

Alternatively, the textured surface of the green sheet may be formed by photolithography methods that are used in semiconductor manufacturing. For example, as shown in FIG. 18, an etching mask 271 is formed on the green sheet 261. The etching mask 271 may comprise a photoresist layer that has been exposed through an exposure mask and developed. The unmasked portions 273 of the green sheet are etched to form recesses in the top surface of the green sheet. The masked portions 275 of the green sheet are protected from etching by the mask 271, and remain as protrusions 275 between the recesses 273. The protrusions 275 and recesses 273 form a textured surface. The photoresist mask 271 is removed after etching by a conventional selective removal process, such as ashing. Any etching gas or liquid that preferentially etches the green sheet material to the mask material may be used. As shown in FIG. 18, an anisotropic etching medium was used to form recesses 273 with straight sidewalls. This results in rectangular protrusions 275 between the recesses. Alternatively, an isotropic etching medium may be used to form recesses 273 with outwardly sloped walls. This results is trapezoidal or pyramidal protrusions 275 between the recesses.

Figure 19:
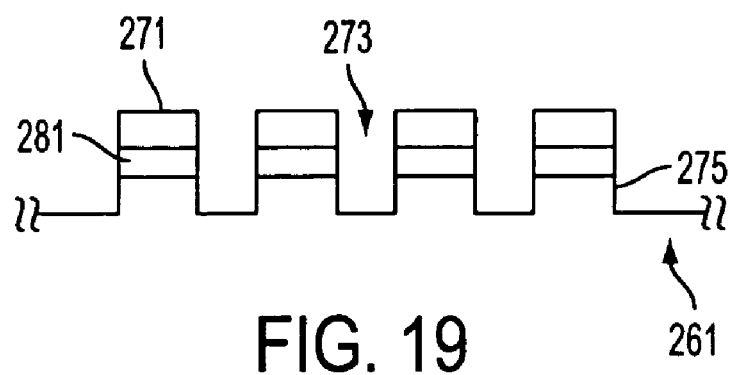

The mask may comprise materials other than photoresist. In one example, other photosensitive layers may be used. Alternatively, a so-called "hard mask" may be used as a mask to etch the green sheet. For example, as shown in FIG. 19, a hard mask layer 281 is deposited on the green sheet 261. The hard mask layer 281 may be any material which resists being etched by an etching medium to a higher degree than the green sheet 261. The hard mask layer may be any suitable metal, ceramic, semiconductor or insulator. A photoresist mask 271 is formed, exposed and developed over the hard mask layer 281. The hard mask layer 281 is then etched using the photoresist as a mask. Then, the green sheet 261 is etched to form a textured surface containing a plurality of recesses 273 and protrusions 275 using the hard mask 281 as a mask. The photoresist mask 271 may be removed before or after the green sheet is etched. The hard mask 281 is removed after the green sheet 261 is textured by a selective etching medium which removes the hard mask 281 but does not etch the green sheet 261.

Figure 20:
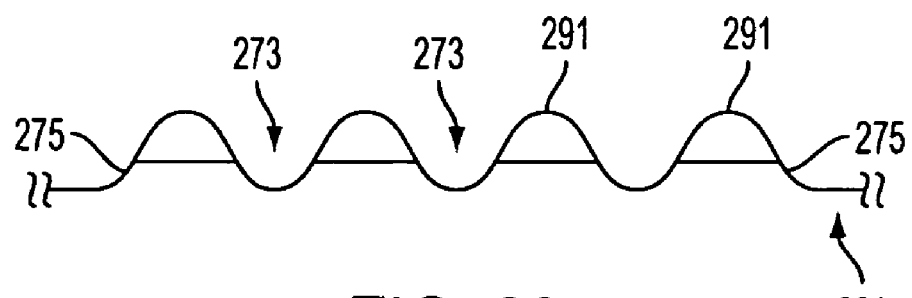

In another example, the mask may comprise a plurality of particles. As shown in FIG. 20, a plurality of discontinuous particles 291 are formed on the surface of the green sheet 261. The particles 291 may be any material which resists being etched by an etching medium to a higher degree than the green sheet 261. The particles may be any suitable metal, ceramic (such as titania or alumina), semiconductor (such as polysilicon or silicon carbide) or insulator. The particles may be formed by any particle deposition method, such as spray coating, dip coating, ink jet deposition, sputtering or chemical vapor deposition. The portions 273 of the green sheet 261 that are not covered by the particles 291 are etched to form recesses in the top surface of the green sheet. The covered portions 275 of the green sheet are protected from etching by the particles 291, and remain as protrusions between the recesses 273. The protrusions 275 and recesses 273 form a textured surface. The particles 291 are removed after the green sheet 261 is textured by a selective etching medium which removes the particles 291 but does not etch the green sheet 261.

Figure 21:
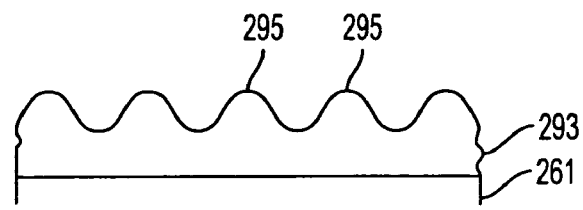
Figure 22:
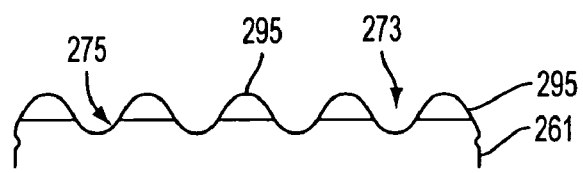

Alternatively, rather than depositing the particles 291 directly on the green sheet 261, the particles 291 may be formed by etching a textured layer 293 on the green sheet 261. For example, as shown in FIG. 21, a layer 293 with a rough or textured surface is deposited on the green sheet 261. The textured surface of layer 293 contains protrusions 295. This layer 293 may be any material with has a rough surface, such as hemispherical grain polysilicon, ceramic, insulator or metal. Layer 293 is then anisotropically etched until only the protrusions 295 remain on the surface of the green sheet 261, as shown in FIG. 22. The remaining protrusions 295 appear as a plurality of particles on the green sheet 261. The green sheet 261 is then etched using the protrusions 295 as a mask.

Figure 23:
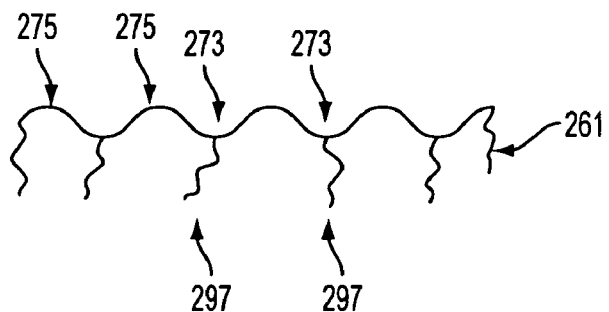

In other examples, the textured surface is formed without a mask. In one example, an etching medium, such as an etching liquid, which preferentially attacks the grain boundaries 297 of the green sheet 261 is applied to an upper surface of the green sheet. The etching medium selectively etches the grain boundaries 297 of the green sheet to form recesses 273. The regions of the green sheet 261 between the grain boundaries 297 are not etched or are etched to a lesser degree and remain as protrusions 275, as shown in FIG. 23. Thus, a textured surface comprising protrusions 275 and recesses 273 is formed without a mask.

Figure 24:
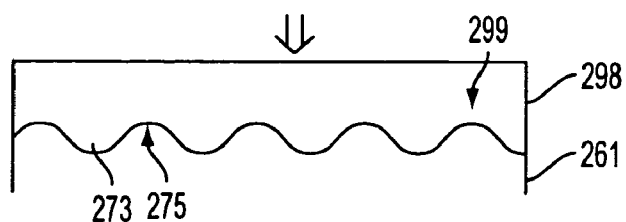

In another example, the textured surface is formed by embossing. A body 298 (i.e., a press, a mold etc.) having a textured or roughened lower surface 299 is pressed into or rolled against the top surface of the green sheet 261, as shown in FIG. 24. Alternatively, the green sheet is pressed into or rolled against surface 299. The lower surface 299 of body 298 has a higher hardness than the green sheet 261. The body 298 may be a ceramic, insulator or a metal body with a suitable hardness to emboss the green sheet. The embossing step leaves impressions or recesses in the green sheet 261 to form the textured surface in the green sheet. It should be noted that both sides of the green sheet 261 may be textured by the methods described above. If desired, heat may be applied to the process to soften the binder component of the green sheet to allow it to be textured easier.

In another example, the textured surface is formed by building the ridges on a flat green tape. This can be done using a cladding process or by a powder/slurry spray process, where the powder and/or slurry is made of the same material as the green tape. In another example, the roughening or texturing can be applied to the electrolyte by various mechanical and chemical-mechanical machining methods, such as lapping, grinding or polishing (such as chemical-mechanical polishing) using an abrasive. Preferred abrasives include diamond, boron carbide and silicon carbide. Preferably, the sintered electrolyte is placed onto a rotating lapping, grinding or polishing wheel containing the abrasive. The abrasive may be an abrasive powder or slurry, such as a diamond, boron carbide or silicon carbide powder or slurry. The size of the abrasive powder is preferably 5 to 45 microns, such as 15 to 30 microns. Alternatively, the upper surface of the wheel is made of the abrasive material. The wheel is rotated against the electrolyte causing the electrolyte surface in contact with the abrasive to be textured. The process can then be repeated for the other side of the electrolyte. In a preferred aspect of this embodiment, the electrolyte is textured to obtain a YSZ electrolyte having a surface roughness of 0.5 to 2.5 microns, preferably 1 to 2 microns. This surface roughness possesses good adhesion to common SOFC electrodes.

It is also possible to create the textured surface on a flat "sintered" sheet or tape as opposed to the green sheet or tape. While, in general, the green sheet or tape is more easily textured than the sintered ceramic product, etching agents that etch a sintered ceramic may be used to etch the sintered electrolyte.

In one aspect of this embodiment, the green tape is prepared by tape casting. In this fabrication procedure, a raw ceramic powder, for example YSZ, is mixed with solvents, binders, plastisizers, and defloculants to form a slurry. The slurry is applied to a mylar film ("carrier") and spread uniformly with a blade, which is dragged along the length of the carrier with a precisely adjusted gap between the blade and the carrier. In large scale fabrication, this process is run continuously by moving the carrier under a static blade and applying slurry to the carrier upstream of the blade. The thickness of the green tape can range between about 20 micrometer and 10,000 micrometers, preferably about 50 to 1,000 micrometers. The amplitude of the surface texture can vary between 5 micrometers and 1000 micrometers, preferably about 10 to 30 micrometers.

The surface texturing can also be applied to electrolytes formed by other methods, such as electrolytes formed by extrusion. The texturing is not limited to electrolytes with planar geometries, but can also be applied to electrolytes with non-planar geometries.

IV. The Fourth Preferred Embodiment

In the fourth preferred embodiment of the present invention, the inventors have realized that the quality, robustness and environmental endurance of the solid oxide fuel cell can be improved by using an environment tolerant anode catalyst. For example, when feeding a fuel contaminated with sulfur, a solid oxide fuel cell anode catalyst that is tolerant to sulfur may be used. When the fuel cell is subject to operation in a fuel starvation mode, a fuel cell anode catalyst that is tolerant to fuel starvation may be used.

In the prior art low temperature acid fuel cells, some minor improvement in sulfur tolerance has been observed when certain compounds are added to the fuel side anode catalyst. The compounds that have shown some positive tolerance include $MoWO_x$, $RuO_2$, $WO_x$ (such as $WO_{2.5}$), $MOS_2$, $WS_2$, and $PtS_x$. In the prior art molten carbonate fuel cells, some minor improvement in sulfur tolerance has been observed when certain compounds are added to the fuel side anode catalyst. The compounds that have shown some positive tolerance include $Cr_2O_3$, FeO, $Fe_2O_3$, $Fe_3O_4$, $Al_2O_3$, $LiAlO_2$, $LiCrO2$, $MO_2$, $MO_3$ and $WO_3$, as described in U.S. Pat. No. 4,925,745, incorporated herein by reference.

However, the low temperature acid fuel cell is fundamentally different than the solid oxide fuel cell. In the acid fuel cell, the ionized fuel must pass through the electrolyte to be reduced at the cathode by an oxidant. The fuel ion in this case is the hydrogen proton. When sulfur is present in the fuel, the ionization reaction at the anode is slowed. The mechanism for this occurrence is not well known, but it is believed to be related to the masking of the catalyst with the sulfur adsorbed onto the active catalytic material. In contrast, in the solid oxide fuel cell, it is the oxidant oxygen anion that must pass through the electrolyte to oxidize the fuel. The sulfur contamination of the fuel creates no hindrance for the ionization of the oxygen or its transport through the electrolyte.

The fundamental differences between the two types of fuel cells can best be shown in FIG. 25. FIG. 25 compares the functionality of the solid oxide fuel cell 400 and an acid fuel cell 410.

Referring to the acid fuel cell 410, the electrolyte 411 can be a membrane such as duPont's Nafion® or an inert matrix filled with phosphoric acid. Other acids may be used, but the Nafion® and matrix phosphoric acids are the more frequently used. The cathode electrode 412 is attached to or placed against the electrolyte 411 and usually contains platinum metal as the ionization catalyst for the air oxidant 414. The platinum is often a finely divided platinum black bonded with Teflon or platinum supported on carbon and bonded with Nafion® ionomer. The anode electrode 413 is also attached to or placed against the electrolyte 411 and is similar to the cathode electrode 412, except that ruthenium, rhodium, or other metals are frequently added to the platinum to make the anode electrode 413 more tolerant to CO gas in the hydrogen fuel 415. For many fuel cell applications, the source of hydrogen fuel 415 is a reformed hydrocarbon fuel. Usually the fuel source is scrubbed of sulfur down to the parts per billion (PPB) range. Otherwise, the anode electrode 413 functionality is significantly reduced. Additionally, the reformed fuel is processed to reduce the CO volume content in the hydrogen fuel 415 to less than 50 parts per million (PPM) to minimize the poisoning effect on the electrode. The hydrogen fuel 415 is ionized at anode electrode 413 producing hydrogen protons. The protons then pass through the membrane 411 by the gradient created by the combination with oxygen anions produced on the cathode electrode 412 from air oxidant 414 to produce product water 412.

Referring to solid oxide fuel cell 400, the electrolyte 401 is preferably yttria-stabilized zirconia (YSZ), although other ceramic oxides, such as ceria are sometimes used together with or instead of YSZ. A preferred cathode electrode 402 is made from a 50:50 mixture of YSZ and $La_{0.8}Sr_{0.2}MnO_3$ (LSM). Other materials may be used if desired. The cathode electrode 402 is attached to or placed against the electrolyte 401 and ionizes the oxygen in the air oxidant 404. The oxygen anions pass through the electrolyte 401 by the gradient created by the consumption of the anions by combination with fuel ions. In the prior art solid oxide fuel cells, the anode electrode 403 is a often a ceramic-metallic (cermet) of Ni and YSZ, while Cu is sometimes used instead of Ni. Hydrogen fuel 405 is ionized at the anode electrode 403 and combines with the oxygen anions to form water.

One of the significant advantages of the solid oxide fuel cell is the potential for direct hydrocarbon fuel feed to the operating cell anode. The prior art Ni/YSZ anode electrode performs very well with pure hydrogen fuel, but when attempting to internally reform a hydrocarbon fuel into a hydrogen rich fuel stream the Ni/YSZ anode electrode has shortcomings related to carbon formation and sulfur poisoning. To reduce carbon formation in the prior art solid oxide fuel cell, water (i.e., water vapor) is added to the hydrocarbon fuel to prevent carbon formation. Although the fuel cell product water is generated within the anode electrode, even more water must be added to the fuel to prevent the carbon formation. This extra water must be introduced with the incoming fuel, which complicates the operation of the fuel cell. Second, the prior art Ni/YSZ electrode cannot tolerate even the 10 ppm sulfur normally found in natural gas. Thus, expensive sulfur scrubbing equipment is often used to reduce the sulfur content of the fuel, which increases the cost of the electricity generation.

Thus, in a first preferred aspect of the fourth embodiment, sulfur tolerant compounds are used in combination with or instead of Ni in the anode cermet of a solid oxide fuel cell. The sulfur tolerant compounds include any compounds which increase the anode tolerance to sulfur in the fuel stream. While the inventors do not want to be bound by any theory of operation of the sulfur tolerant compounds, it is believed that the sulfur tolerant compounds prevent or reduce the formation of sulfur on the anode. The preferred sulfur tolerant compounds include $MoWO_x$, $RuO_2$, $WO_x$ such as $WO_{2.5}$, $MoS_2$, $WS_2$, and $PtS_x$. Some compounds, such as $WO_x$ are also CO tolerant. Less preferred compounds include sulfur tolerant catalysts usable in a molten carbonate fuel cell, such as $Cr_2O_3$, FeO, $Fe_2O_3$, $Fe_3O_4$, $Al_2O_3$, $LiAlO_2$, $LiCrO_2$, $MO_2$, $MO_3$ and $WO_3$, as described in U.S. Pat. No. 4,925,745, incorporated herein by reference. Preferably, the anode cermet comprises the ceramic, such as (YSZ), and a catalyst. The catalyst preferably comprises 10 to 90 weight % Ni or Cu and 10 to 90 weight percent of the sulfur tolerant compound. Most preferably, the catalyst comprises 30 to 70 weight % Ni or Cu and 30 to 70 weight percent of the sulfur tolerant compound. However, some sulfur tolerant compounds, such as $PtS_x$, may be used without Ni or Cu and comprise 100% of the catalyst.

These sulfur tolerant catalyst compounds in combination with or replacing the Ni in the anode electrode cermet provide an increased tolerance to sulfur in the fuel. The sulfur tolerant catalyst allows the solid oxide fuel cell to be used with a hydrogen fuel source containing contaminate levels of sulfur compounds, such as more than 10 ppb, for example more than 100 ppb. The three elements that combine in a non-obvious manner to achieve this tolerance include: weak tolerance of the Ni cermet to sulfur, uninhibited availability of an oxidant within the anode electrode, and elevated operational temperature.

In another preferred aspect of the fourth embodiment, the environmental tolerant anode catalyst comprises a fuel starvation tolerant catalyst. When the solid oxide fuel cell is operating at steady state, the reactants are independently flow controlled. The cathode airflow is generally controlled to supply sufficient oxygen for the cathode reaction and to remove the waste heat from the fuel cell reaction. Usually airflow 1.5 to 2.5 times the stoichiometric requirements is ample to satisfy the cathode reaction. Heat removal will generally require much more airflow than that required in satisfying the cathode reaction and therefore, there is no reasonable concern that a cell will become oxygen starved.

On the other hand, the fuel is flow controlled only to support the anode reaction. In this case, the fuel flow is generally set at about 1.2 times the stoichiometric requirements of the anode in order to maintain a high level of fuel utilization. This high level of fuel utilization is required to obtain a high overall system efficiency.

In the prior art solid oxide fuel cells, a problem develops when there is an instantaneous requirement for an increased electrical output from the solid oxide fuel cell stack. Under these conditions, the air supply is more than ample to support the increased reaction rates within all the cells. However, one or more cells in the stack can be fuel starved until the fuel control adjusts the fuel flow to the new reaction rates. During the few seconds that it takes to adjust the fuel flow, the anode catalyst can be permanently damaged. Since the cells in a planar solid oxide stack are in electrical series, the entire stack can be rendered useless.

Figure 26:
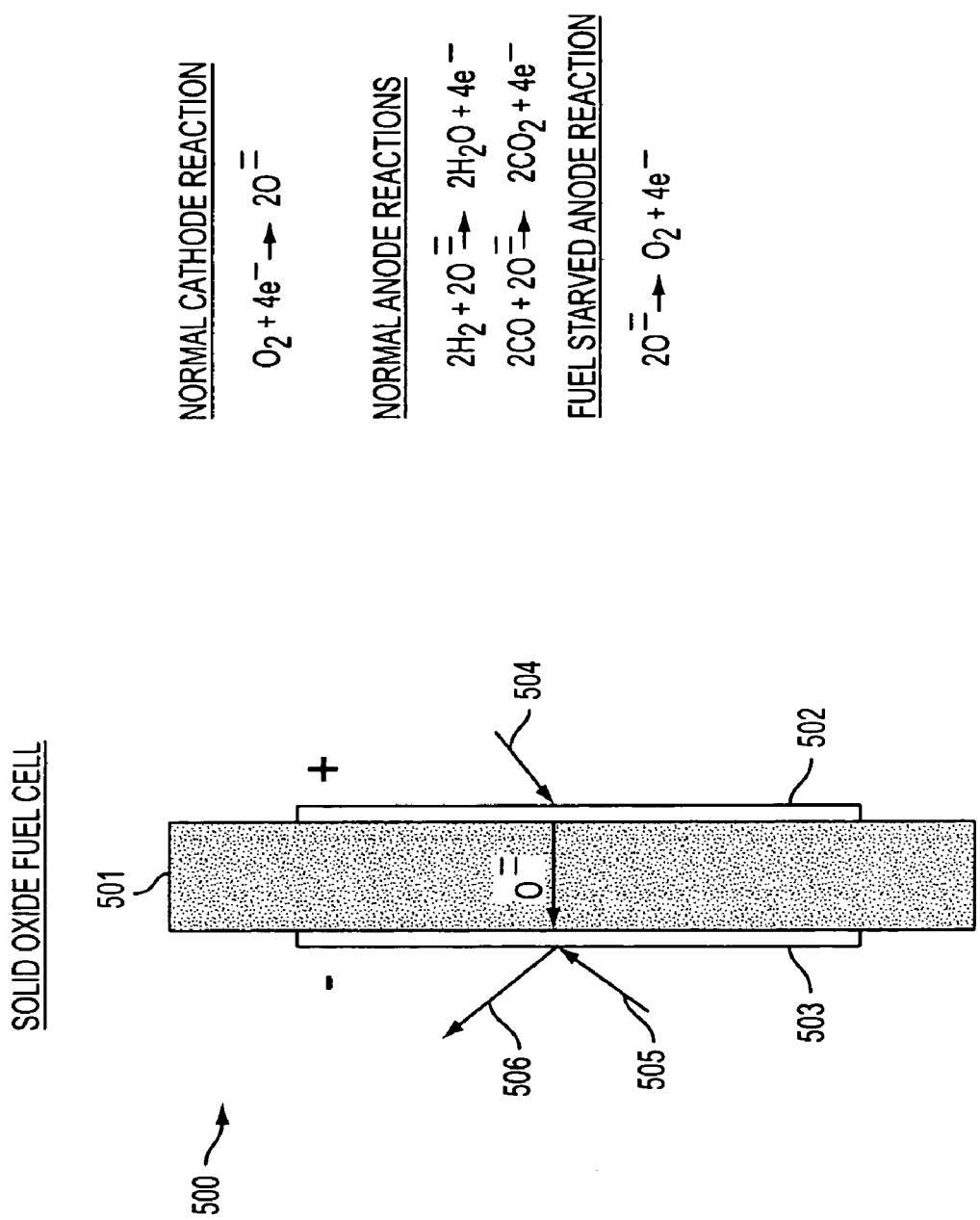

The fundamental reason for cell anode damage is illustrated in FIG. 26. FIG. 26 shows the functionality of the solid oxide fuel cell 500 in the normal anode and normal cathode reaction modes and the anode reaction in the fuel starved mode.

Referring to the solid oxide fuel cell 500 in the normal operating mode, the electrolyte 501 is usually yttria-stabilized zirconia (YSZ), although other ceramic oxides such as ceria are sometimes used. The typical cathode electrode 502 is made from a 50:50 mixture of YSZ and $La_{0.8}Sr_{0.2}MnO_3$ (LSM). Other materials may be used if desired. The cathode electrode 502 is attached to or placed against the electrolyte 501 and ionizes the oxygen in the air oxidant 504. The oxygen anions pass through the electrolyte 501 by the gradient created by the consumption of the anions by combination with fuel ions. A prior art anode electrode 503 is configured with a ceramic-metallic (cermet) of Ni and YSZ. Alternately, Cu is sometimes used as the metal in the cermet for the anode electrode. Hydrogen/CO fuel 505 is ionized at the anode electrode 503 and combines with the oxygen anions to form water and $CO_2$.

When a section of an individual solid oxide fuel cell within a stack becomes fuel starved, the cell becomes an electrical load instead of an electrical power generator. This occurs because other cells in the stack have sufficient fuel to support the reaction and these cells drive the cell(s) that has become a load. Under these conditions, the fuel starved cell polarity reverses and oxygen is evolved from the anode. The cathode electrode and the electrolyte continue to operate as they had when operation in the fuel cell mode.

When the fuel flow rate is restored to normal, the load cell(s) reverts back to the power generating fuel cell mode. Unfortunately, in the process of evolving oxygen, the standard Ni/YSZ anode electrode is oxidized and permanently damaged because Ni is not a fuel starvation tolerant catalyst.

The present inventors have realized that if a metal which forms a reversible oxide without damage to the metal is added to the anode, then the anode is rendered fuel starvation tolerant. Such a metal forms an oxide when oxidized and reverts back to a pure metal without significant damage when the oxide is reduced by the fuel reaction at the anode. Preferably, the fuel starvation tolerant compound include platinum group metals, such as platinum, palladium, rhodium, iridium, osmium and ruthenium. Low temperature water electrolysis shows that platinum metal electrodes can be oxidized and reduced without damage. Other catalytic materials or additives that display this characteristic include ruthenium and tungsten at various oxide levels. The use of these metals/oxides in various ratios provides the tolerance to the oxidative anode conditions during fuel starvation.

Preferably, the anode 503 comprises a cermet which includes the ceramic, such as (YSZ), and a fuel starvation tolerant catalyst. The catalyst preferably comprises 10 to 90 weight % Ni or Cu and 10 to 90 weight percent of the fuel starvation tolerant material. Most preferably, the catalyst comprises 30 to 70 weight % Ni or Cu and 30 to 70 weight percent of the fuel starvation tolerant material. Preferably, the fuel starvation tolerant material oxidizes preferentially to Ni during fuel starvation. However, some fuel starvation tolerant materials, such as Pt, may be used without Ni or Cu and comprise 100% of the catalyst.

In a third preferred aspect of the fourth embodiment, the anode comprises an environmental tolerant catalyst which is both a sulfur tolerant catalyst and a fuel starvation tolerant catalyst. For example, the anode may contain a combination of similarly based fuel starvation and sulfur tolerant materials, such as Pt and $PtS_x$, Ru and $RuO_2$, and W and $WO_x$. Alternatively, the anode may contain a combination of dissimilar catalysts, such as a Pt—$WO_x$ or Pt—$H_xWO_3$ as disclosed in U.S. Pat. No. 5,922,488 incorporated herein by reference in its entirety. Thus, any combination of the sulfur tolerant and fuel starvation tolerant materials described above may be selected for the anode composition.

Preferably, the anode 503 comprises a cermet which includes the ceramic, such as (YSZ), and a environment tolerant catalyst. The catalyst preferably comprises 10 to 90 weight % Ni or Cu, 5 to 45 weight percent of the sulfur tolerant material and 5 to 45 weight percent of the fuel starvation tolerant material. Most preferably, the catalyst comprises 30 to 70 weight % Ni or Cu, 15 to 35 weight percent of the sulfur tolerant material and 15 to 35 weight percent of the fuel starvation tolerant material. However, some sulfur tolerant and fuel starvation tolerant materials, such as Pt, may be used without Ni or Cu and comprise 100% of the catalyst.

The anodes may be formed using any known cermet fabrication methods. The Ni or Cu metals, sulfur tolerant materials and/or the fuel starvation tolerant materials may be incorporated into the cermet by any suitable method. For example, these materials may be deposited by co-deposition, co-electrodepositon, freeze drying or sequential deposition. Thus, the environmental tolerant material may be alloyed or admixed with Ni or Cu and then provided into the YSZ to form the cermet. For example, the environmental tolerant material may be alloyed or admixed with Ni or Cu and then provided into YSZ using a wet (solution), a dry (powder) or a sputtering process. Alternatively, the environmental tolerant material may be alloyed or admixed with Ni or Cu and then placed on a support, such as a foam support or a dry ice support, and then pressed into contact with the YSZ. The catalyst is diffused into the YSZ to form the cermet by sintering and/or pressing. If dry ice is used, then the dry ice is sublimed to diffuse the catalyst into the YSZ.

V. The Fifth Preferred Embodiment

In the fifth embodiment of the present invention, the inventor has realized that the solid oxide fuel cell system can be simplified, when feeding a hydrocarbon fuel directly to the solid oxide fuel cell anode for internal reforming to a hydrogen rich reactant by supplying the reforming process steam from the anode exhaust enthalpy recovery. In other words, only the product water (i.e., water vapor) is added to the fuel provided into the anode.

In the low temperature PEM fuel cells, cathode enthalpy is recovered and returned to the cathode inlet to prevent the dry out of the water saturated membrane. In this case, the incoming oxidant air is humidified and membrane dry out is avoided. Several methods have been developed to accomplish this water and heat transfer including hydrated membranes, water injection, and cycling desiccants. One method includes using a device called an enthalpy wheel. The enthalpy wheel is a porous cylindrical wheel with internal passages that are coated with desiccant. It rotates slowly in one direction, allowing the transfer of sensible and latent heat from the hot saturated air exhaust to the cool dry air inlet.

In the solid oxide fuel cell, there is no need to maintain the saturation of any of the components. In the case of a solid oxide fuel cell operating with pure hydrogen and air reactants, these reactants can be absolutely free of any water vapor. The prior art Ni/YSZ anode electrode performs very well with pure hydrogen fuel. However, when attempting to internally reform a hydrocarbon fuel into a hydrogen rich fuel stream, the Ni/YSZ anode electrode has shortcomings related to carbon formation. To reduce carbon formation in the prior art solid oxide fuel cell, water (i.e., water vapor) is added from an external boiler to the hydrocarbon fuel to prevent carbon formation on the anode. For the purpose of fuel steam reforming within the anode of a solid oxide fuel cell, a high rate of water vapor (i.e., steam), amounting to approximately a 3:1 steam to carbon ratio, must be injected into the fuel before introduction into the fuel cell anode. The use of the extra boiler complicates the electricity generation process and increases its cost.

The present inventors realized that product water vapor emitted from the anode side exhaust of the solid oxide fuel cell may be recirculated into the fuel being provided into the anode input to prevent or reduce the carbon formation on the anode. The enthalpy wheel is a preferred device to control the water and heat transferred from the anode exhaust of a solid oxide fuel cell to the anode inlet. The control of the amount of water introduced with the fuel is used to prevent carbon formation with too little water and to prevent fuel starvation with too much water. The water transfer rate is controlled by the speed of the wheel.

Figure 27A:
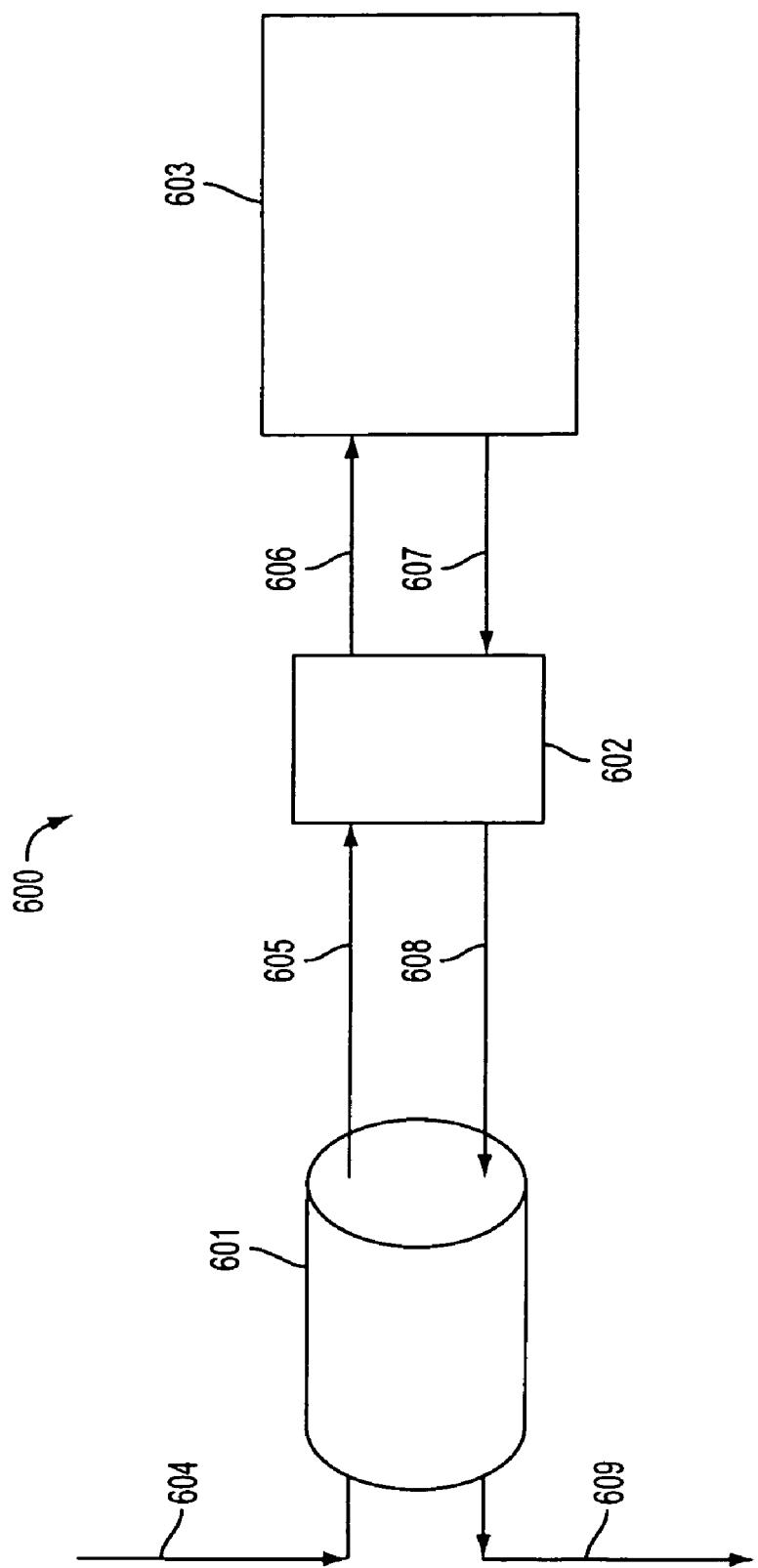
FIG. 27A–B are schematic diagrams of a system according to the fifth preferred embodiment.

The fundamentals of the system 600 employing an enthalpy wheel in the solid oxide fuel cell fuel stream are illustrated in FIG. 27A. The hydrocarbon fuel supply is delivered through conduit 604 to enthalpy wheel 601. Within the enthalpy wheel 601, the fuel supply receives water vapor and heat from the anode side fuel exhaust. The warm wet fuel supply is then delivered to an optional heat exchanger 602 through conduit 605. Within the heat exchanger 602, the fuel exhaust heats the warm wet fuel supply further. The hot wet fuel supply is then delivered to the anode chambers within the solid oxide fuel cell stack 603 through conduit 606. Within the solid oxide fuel cell anode chambers the hot wet hydrocarbon fuel supply is reformed into a mixture of hydrogen, water vapor, and carbon oxides. Nearly simultaneously, most of the hydrogen and carbon monoxide are converted to more water vapor and more carbon dioxide, respectively, from the reaction with the oxygen anions in the anode catalyst.

The fuel exhaust gasses, with significantly more water vapor than was introduced into the solid oxide fuel cell anode chambers, return to heat exchanger 602 through conduit 607. Within heat exchanger 602 some of the heat in the exhaust stream is given up to the inlet fuel supply. The fuel exhaust is then delivered back to the enthalpy wheel 601 through conduit 608. Within the enthalpy wheel 601, much of the water vapor and remaining heat in the fuel exhaust is transferred to the inlet fuel supply.

The rotational speed of the enthalpy wheel is modulated to optimize the water vapor flux. The fuel exhaust then leaves the system through outlet conduit 609. Preferably, 0% to 90%, such as 20 to 70% of the product water vapor is transferred to the fuel supply. Preferably, all heat transferred to the fuel supply is through the enthalpy wheel and heat exchanger.

Figure 27B:
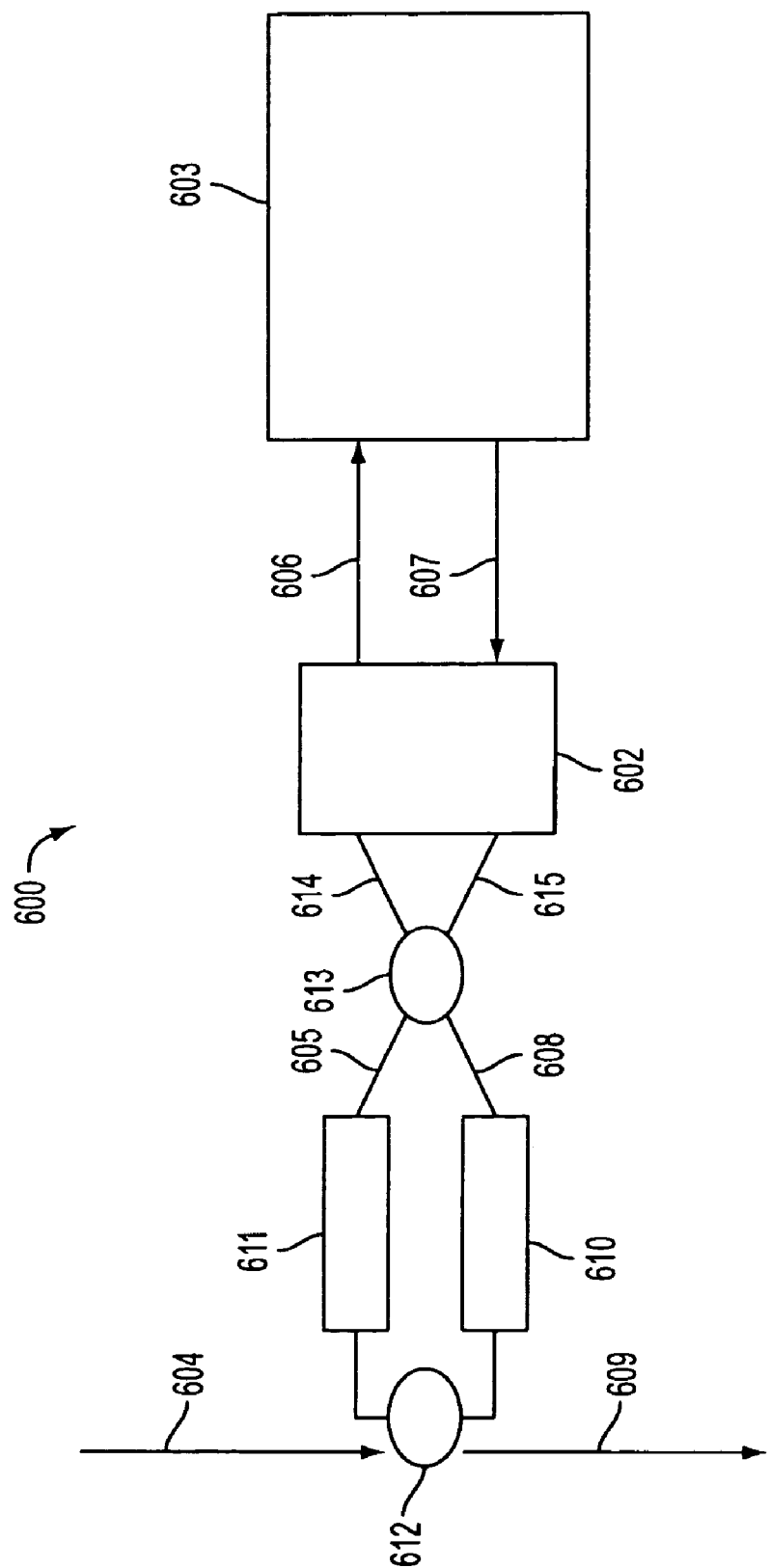

In an alternative embodiment, the enthalpy wheel is replaced with at least two adsorption beds, as illustrated in FIG. 27B. The first adsorption bed 610 is used to adsorb water and water vapor from the anode exhaust, while letting anode exhaust gases, such as CO, $CO_2$, $H_2$ and methane, to pass through to the outlet conduit 609. The second adsorption bed 611 is used to provide water that was previously collected from the anode exhaust. When the supply of water is exhausted in the second bed 611, the anode exhaust is provided into the second bed, while the first bed 610 is used to provide the water or water vapor into the inlet fuel. If desired, a reformer may also be added between the fuel inlet 604 and the fuel cell stack 603, preferably between the heat exchanger 602 and the fuel cell stack 603.

Any suitable method may be used to provide anode exhaust and fuel supply through the adsorbent beds. For example, as shown in FIG. 27B, a first valve 612, such as a four way valve, switches fuel input from fuel inlet 604 between the first 610 and the second 611 adsorbent bed. The valve 612 also switches the exhaust being provided from the first 610 or the second 611 beds to the outlet conduit 609. The conduit 608 connects the first adsorbent bed 610 with a first heat exchanger inlet 614 or a first heat exchanger outlet 615 via a second valve 613, such as a four way valve. The conduit 605 connects the second adsorbent bed 611 with the first heat exchanger inlet 614 or the first heat exchanger outlet 615 via valve 613. When the valve 613 is in a first position, it provides a fluid path between the first adsorbent bed 610 and the first heat exchanger outlet 615 and between the second adsorbent bed 611 and the first heat exchanger inlet 614. When the valve 613 is in a second position, it provides a fluid path between the first adsorbent bed 610 and the first heat exchanger inlet 614 and between the second adsorbent bed 611 and the first heat exchanger outlet 615. If desired, other configurations may be used. For example, four way valve 613 may be replaced with two three way valves, each respective valve being located between the heat exchanger 602 and respective conduits 605, 608.

During operation, the system 600 can be run without using a boiler to provide water vapor into the inlet fuel. However, a small boiler may be added to the system. This boiler may be run during operation start up to provide water into the fuel inlet while the system is warming up and sufficient water vapor is being generated at the anode exhaust.

This system is advantageous because it provides simple transfer of water vapor and heat in a controlled fashion such that the proper conditions at the solid oxide fuel cell anode electrodes for internal steam reforming are met. The enthalpy wheel and heat exchanger may be used to provide the entire supply of water vapor and heat for the fuel supply to operate the solid oxide fuel cell.

VI. The Sixth Preferred Embodiment

The sixth preferred embodiment is directed to a felt seal. Fuel cell stacks, particularly those with planar geometry, often use seals between electrolyte and interconnect surfaces to contain fuel and air (see FIG. 28). These seals must maintain their integrity at high operating temperatures and (on the cathode side) in an oxidizing environment. Furthermore, expansion and contraction of the seal and the components in contact with the seal due to thermal cycling or compression should not result in damage of any of the components during its expected life.

Many compliant seals, such as elastomeric o-rings and gaskets, do not crack and tend to absorb stresses in an assembly that arise from thermal expansion and compression. However, these seals cannot be used at high temperatures because the elastomeric materials used in them decompose, degrade, or oxidize.

Many types of seals used at elevated temperatures, such as brazes and metal gaskets, are not compliant or elastic. Some assemblies are difficult to seal with brazes or gaskets because of operating conditions or material incompatibilities. They may often have a limited life as well, tolerating only a relatively few number of thermal cycles before they fail. Also, when some assemblies are sealed with these materials, differences in the coefficients of thermal expansion result in mechanical stresses that can lead to failure of the seal or the components of the assembly. Also, non-compliant seals often present difficulties and high costs of fabrication and assembly due to the tighter tolerances which are required, in flatness for example.

The sixth preferred embodiment is directed to a sealing arrangement that is both compliant and capable of operating at high temperatures in oxidizing and reducing environments. The sealing member is capable of sealing dissimilar materials, such as a metal and a ceramic, and similar materials that may or may not differ in composition, such as two ceramics or two metals. Since the sealing member is elastic and compliant at device operating temperatures, it may be used to seal two materials with dissimilar coefficients of thermal expansion. This seal may be advantageously used in a solid oxide fuel cell, where the operating temperatures are in the range of 600 to 800° C.

A gas-tight compliant seal between surfaces can be made from a felt. Here, "felt" is used to describe a compliant layer of a material that can endure the elevated operating temperature and atmosphere of the device it is being applied to. In some cases, the felt may be composed of a malleable metal or alloy. However, this definition does not restrict this term to metals. The compliant layer can for example be made from non-metallic fibrous materials, such as silica. This compliant layer can be made up from fibers, as indicated by the word "felt," but also other thick and compliant constructions, for example foams, such as small cell foams. Thus, the seal is preferably made from a compliant metal or a ceramic fibrous or foam material.

The felt is made gas impermeable by one of several means, and is sealed by one of several means to the mating surfaces. The felt gives compliance to the seal, allowing it to absorb stresses caused by compression and thermal expansion and contraction of the assembly of which it is part. The means used to make the felt impermeable and to seal the felt to the mating surfaces are also compliant in nature. Appropriate selection of the composition of the various elements of the seal allows the seal to be made according to various criteria, including operating temperatures, oxidizing or reducing environments, and cost.

Figure 28:
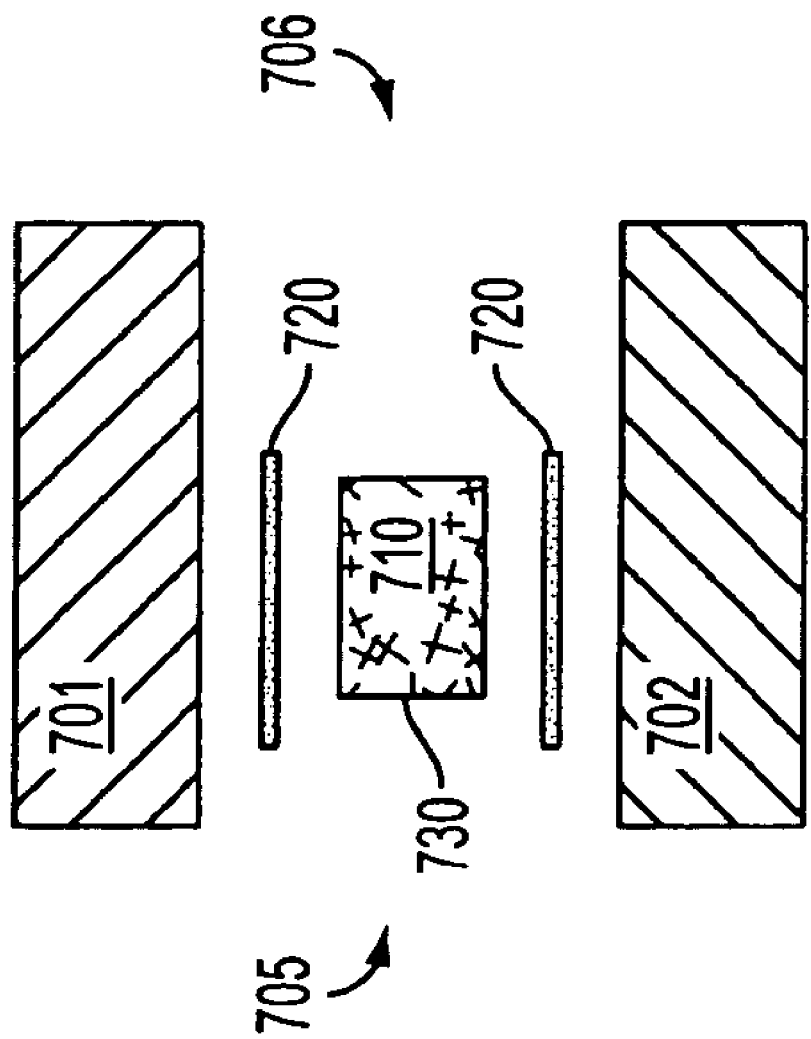
FIGS. 28–35 are schematic representations of seals according to the sixth preferred embodiment.

Two mating surfaces (701 and 702) are shown in FIG. 28. A seal must be made between these two surfaces in order to prevent gas exchange in either direction between sides 705 and 706.

In one case shown in FIG. 28, a felt sealing member 710 is placed between the mating surfaces 701 and 702. The felt sealing member 710 is sealed to the mating surfaces through application of a sealing material 720 that is soft at the device operating temperature but is impermeable to the gases of interest in the application. For example, this may be a glass or glaze compound. One example of a glaze is a Duncan® ceramic glaze GL611. This material can be applied to the felt or to the mating surfaces prior to assembly, for example by dipping the felt sealing member and/or the mating surfaces into the molten glass or glaze. The material softens at elevated temperatures and mates the felt to the surfaces, but remains impermeable to gases. The material 720 is optional if the felt seal contains appropriate means of mating the felt to the surfaces, as is the case in many preferred aspects.

The felt sealing member 710 is made impermeable to gases by one of several ways. In one preferred aspect, the porous felt is filled prior to assembly with a filler material 730 that is soft at the device operating temperature. For example, this may be a glass or glaze mixture. After firing, the glassy residue makes the felt impermeable to gases, but because the material 730 softens at the operating temperature, the felt-glass composite remains compliant. In subsequent paragraphs and figures, it is assumed that same-numbered items carry their previous definitions.

Figure 29:
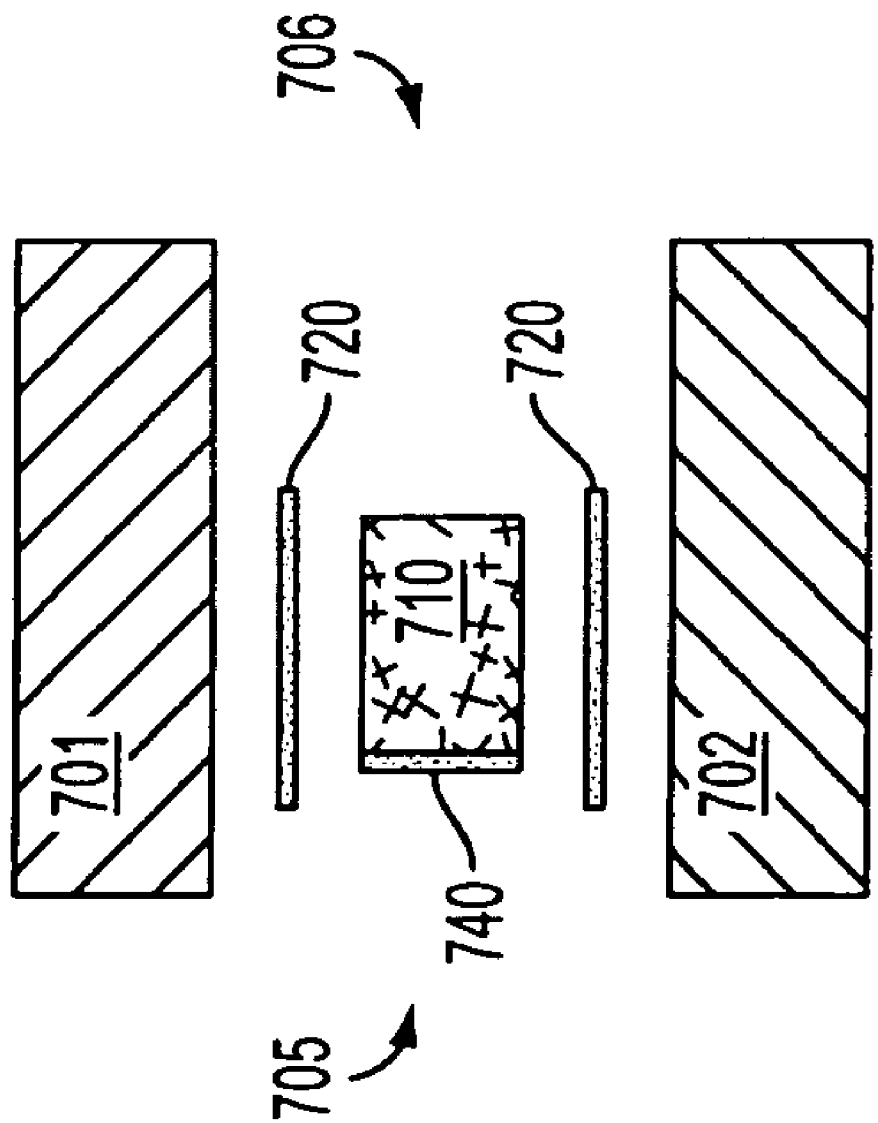

In another preferred aspect (FIG. 29), the felt sealing member 710 is made impermeable to gases by melting a felt surface 740 into a solid layer that is non-parallel, such as perpendicular, to the mating surfaces. The solid layer which is formed to be thin enough to remain flexible. A solid layer means a layer that has a much lower porosity than the felt, such as a porosity of 70% or less than the felt. This solid layer may be formed by selectively heating a portion of the felt sealing member 710 to transform the heated portion to a solid layer, such as a closed cell metal foam layer. For example, a surface 740 of the felt sealing member 710 may be selectively heated by a laser to form the solid layer.

Figure 30:
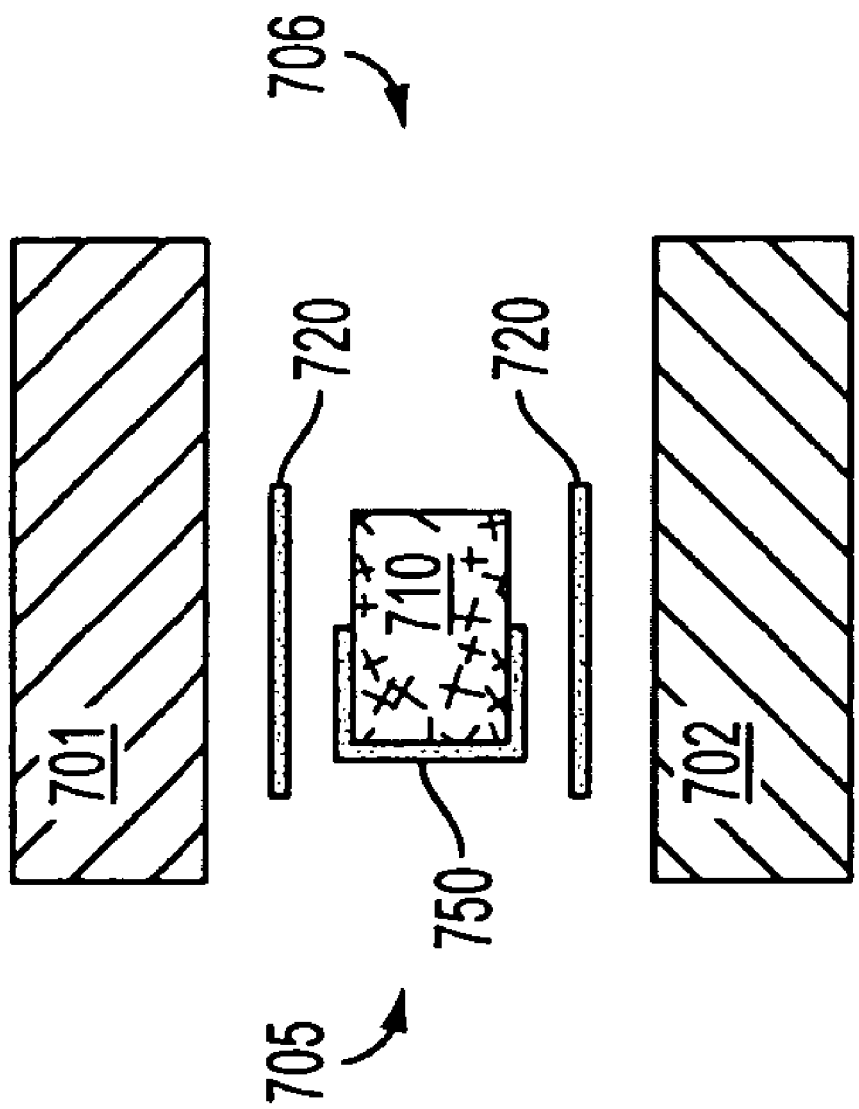

In another preferred aspect (FIG. 30), the felt sealing member 710 is made impermeable to gases by forming a solid layer 750 on felt sealing member 710 that is perpendicular and parallel to the mating surfaces described previously. The parallel solid surfaces provide an improved contact area for the seal.

Figure 31:
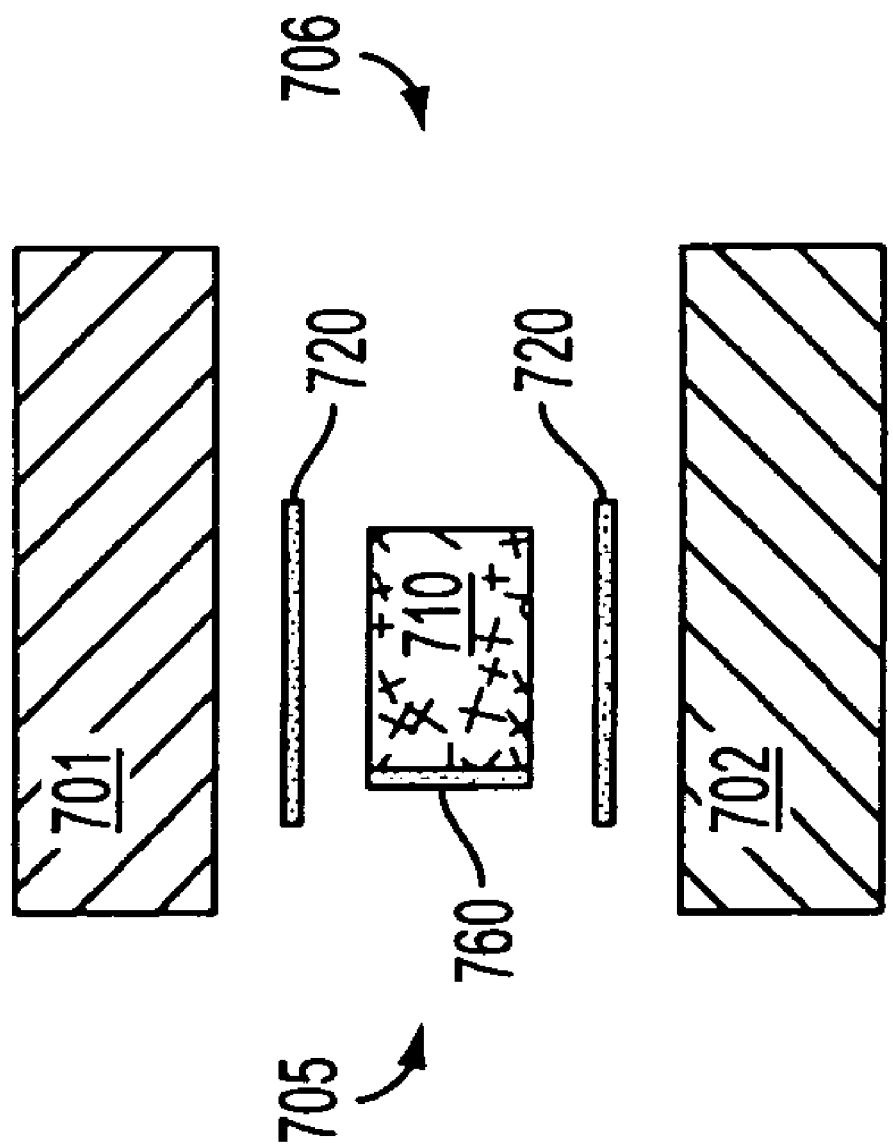

In another preferred aspect (FIG. 31), the felt sealing member 710 is made impermeable to gases through application of a barrier foil layer 760 that is non-parallel, such as perpendicular, to the mating surfaces. The foil adheres to the felt via a material such as that which is used to attach the felt to the mating surfaces. Alternatively, the foil may be pressed into place and held by a second felt sealing member or other component. The foil 760 is compliant because it is thin. Preferably, the foil is a thin metal foil. The foil extends between mating surfaces 701, 702 to block the flow of gas between sides 705 and 706.

Figure 32:
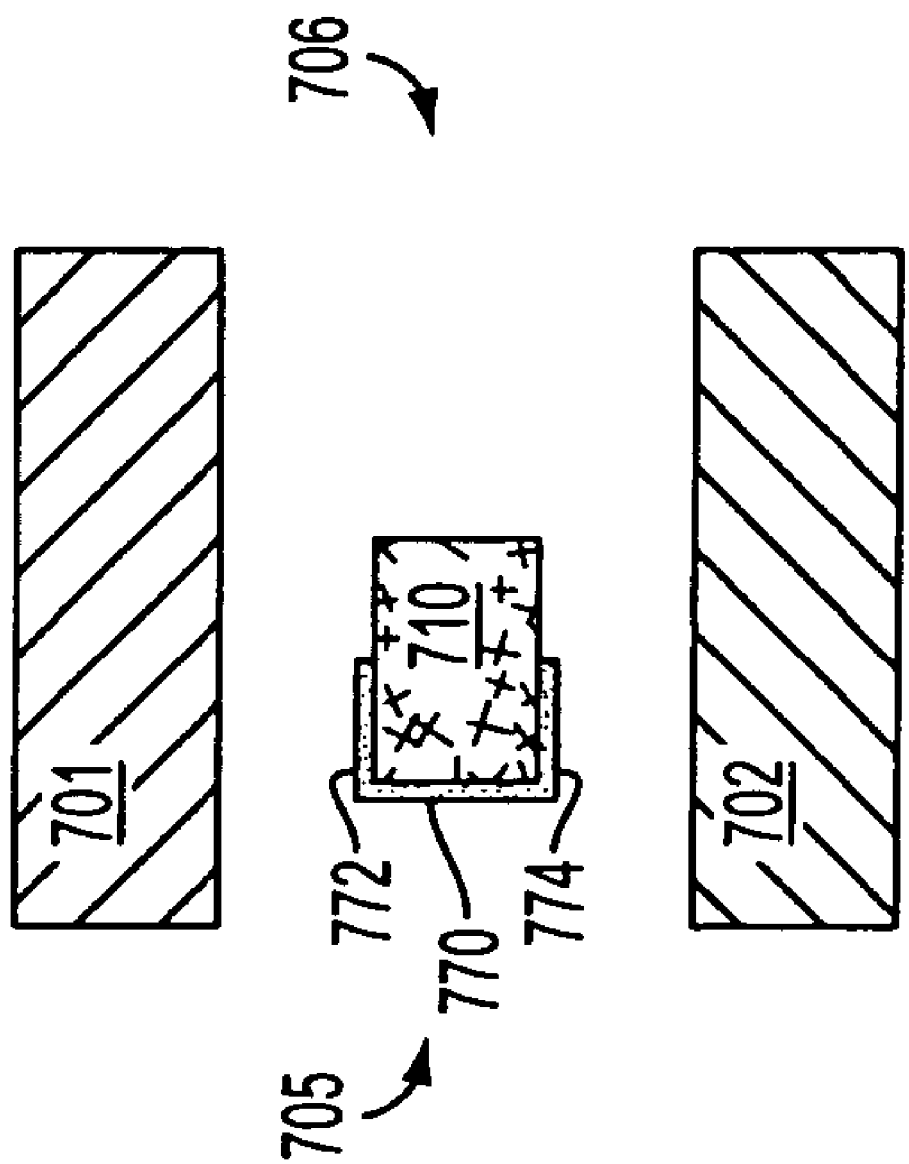

In another preferred aspect (FIG. 32), the felt sealing member 710 is made impermeable to gases through application of several foils. Foil 770 is non-parallel, such as perpendicular, to the mating surfaces as described previously, and foils 772 and 774 extend into the area parallel to the mating surfaces. These foils 772, 774 provide improved contact area for the sealing member. They may also produce adhesion between the sealing member and the mating surfaces. The foils 770, 772, and 774 may be the same or different materials depending on the various compositions of the felt 710 and mating surfaces 701 and 702. They may comprise separate components or one continuous piece of foil.

Figure 33:
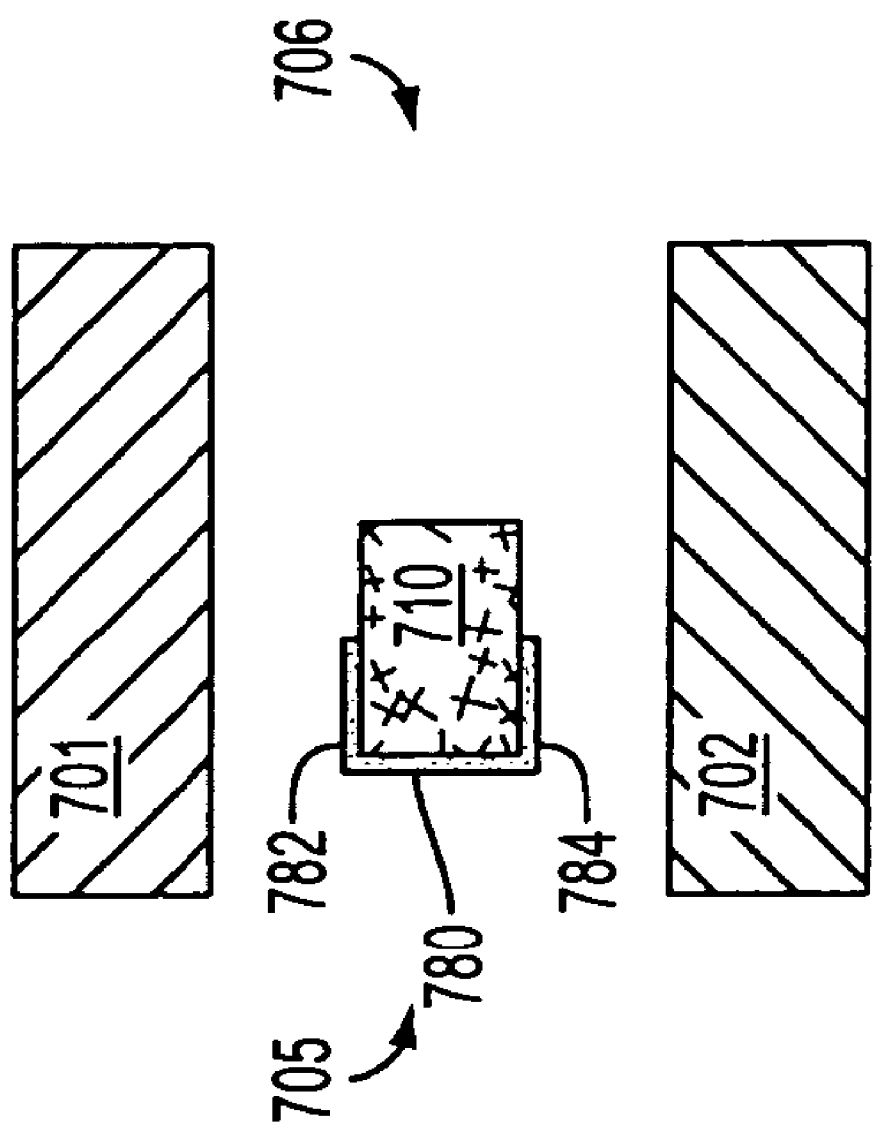

In another preferred aspect (FIG. 33), the felt sealing member 710 is made impermeable to gases through deposition of a gas impermeable material layer on the felt 710. This material may be deposited on the felt by various methods, including but not restricted to, dipping and evaporation, physical vapor deposition, chemical vapor deposition, thermal spray, plasma spray, and precipitation from a liquid. Material portion 780 is non-parallel, such as perpendicular, to the mating surfaces 701, 702. Preferably, portions 782, 784 of the gas impermeable material layer extend into the area parallel to the mating surfaces 701, 702. These portions 782, 784 provide an improved contact area for the sealing member. They may also produce adhesion between the felt sealing member 710 and the mating surfaces. The impermeable material layer portions 780, 782, and 784 may be the same or different materials depending on the various compositions of the felt 710 and mating surfaces 701 and 702.

Figure 34:
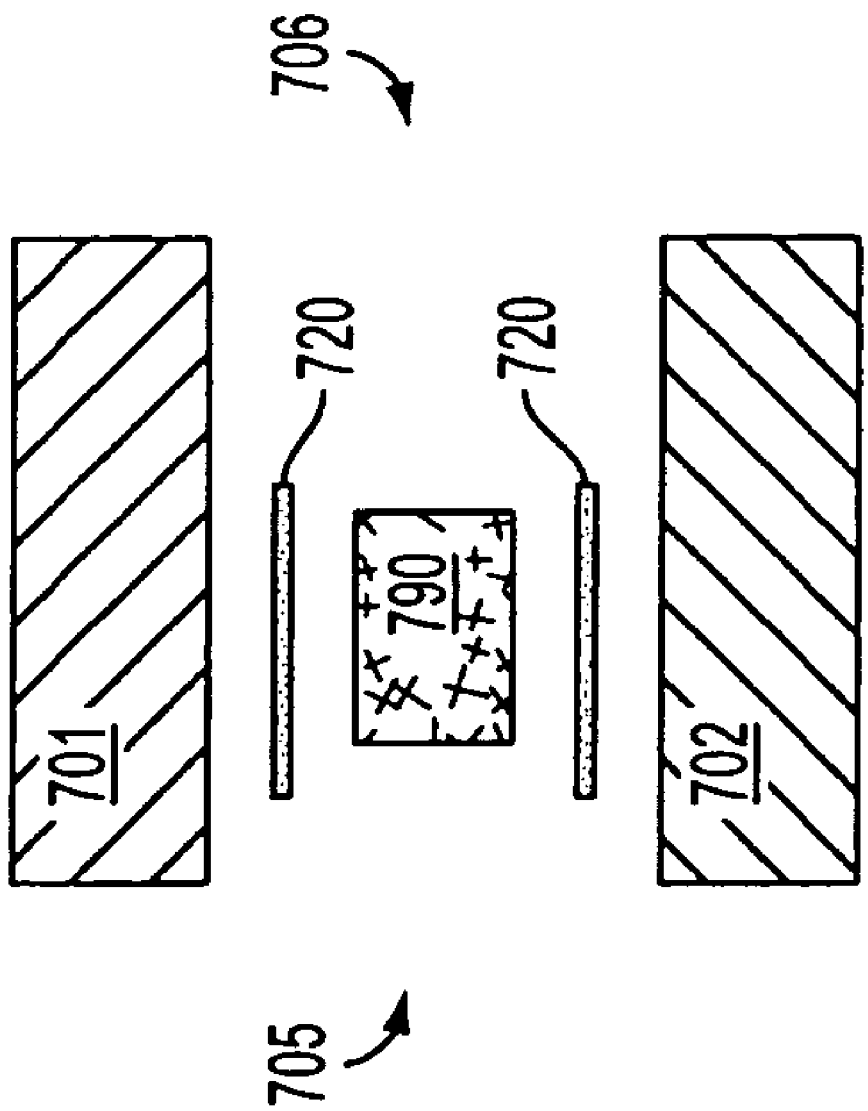

In another preferred aspect (FIG. 34), the felt sealing member 790 is made impermeable to gases in its initial preparation. For example, the felt may be prepared as a closed-cell foam.

The felt composition can be selected so as to operate well in the atmosphere present in the device containing the felt seal. For example, in an oxidizing atmosphere the felt may be composed of a suitable M—Cr—Al—Y material, where M comprises at least one metal selected from Fe, Co, or Ni. In another example, the felt may be composed of Inconel alloy. In another example, in a reducing atmosphere, the felt may be composed of nickel. Other metals, alloys, or indeed other malleable materials or compounds metal may be used depending on the application requirements. One example of forming a felt sealing member 710 (nickel felt) with a gas impermeable material 730 (glass) is as follows. A nickel felt (i.e. foam) with a density of 15% relative to solid nickel is saturated with a molten glass. The felt is fired to remove volatiles, leaving behind a glass residue that renders the felt impermeable to gases. The felt is placed between two mating surfaces, for example a metal sheet and zirconia. To each of the mating surfaces a layer of glass seal is applied where the felt-glass composite will contact the surfaces. The felt is placed between the surfaces, compressed, and fired.

Figure 35:
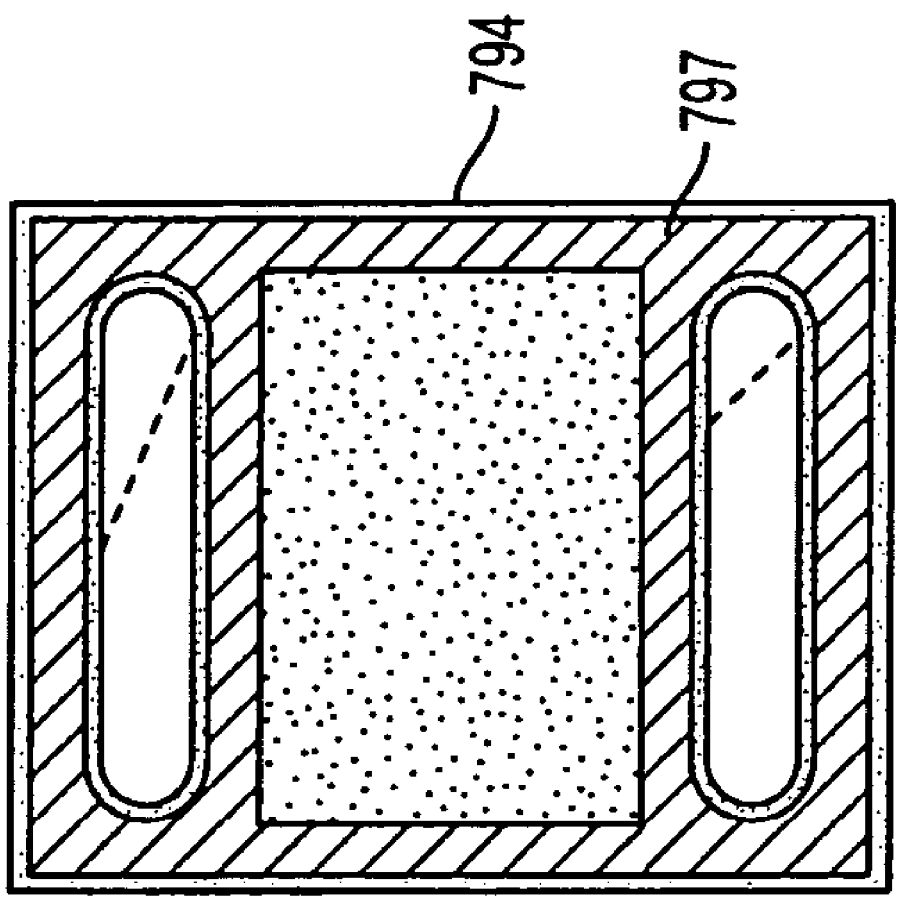

The seal can take the shape of the mating surfaces to be sealed. For example, if the mating surfaces are rectangular, the seal may take the form of a rectangular gasket. If the mating surfaces contain open areas, such as in an assembly with internal gas manifolds or flow ducts, the seal can accommodate and seal such open areas. This is illustrated in FIG. 35, where one of the mating surfaces (794) contains flow channels which are sealed from the center of the surface and from the exterior of the surface by the felt gasket 797.

All embodiments of the felt seal can be placed in a structure in one or both mating surfaces, for example in a groove in a mating surface, that provides containment and additional compression and adhesion surfaces.

The felt part of the seal may also serve other roles, such as current collector/distributor, flow distributor, etc. in a fuel cell stack, such as a solid oxide fuel stack.

VII. The Seventh Preferred Embodiment

The seventh preferred embodiment is directed to felt current conductors/gas flow distributors for fuel cell stacks. Fuel cell stacks, particularly those with planar geometry, often use utilize some material to conduct electrons from the anode to the separator plate and from the separator plate to the cathode. This material typically has a better electrical conductivity than the porous electrode (i.e., anode and/or cathode) material. Usually this material is distinguished from the electrodes in that it also must provide flow distribution of oxygen- or fuel-bearing gases. This material is often called a current conductor/gas flow distributor ("conductor/distributor" herein after). In some cases, these conductor/distributors may provide structural support to the fuel cell stack. Some examples of prior art conductor/distributors include metal wire coils, wire grids, and metal ribs. These may be used independently or in some combination.

The prior art conductor/distributors sometimes exhibit less-than-optimal current conduction or gas flow distribution properties. They are also costly to implement. Also, many of the prior art conductor/distributors are not compliant (i.e., not elastic at the fuel cell operating temperatures). Non-compliant components often present difficulties and high costs in fabrication and assembly of the fuel cells due to the tighter fuel cell tolerances which are required.

The present inventors realized that a porous conductive felt can serve as a current conductor and gas flow distributor with better properties than the prior art conductor/distributors and may be less costly to implement. In some preferred aspects, the felt conductor/distributor can also serve as a seal or as a support for other fuel cell stack components. The use of a compliant, conductive felt reduces the probability of component and assembly failure during thermal cycling and compression of a fuel cell stack, preferably a high temperature fuel cell stack, such as a solid oxide or molten carbonate fuel cell stack.

Here, "conductive felt" is used to describe a compliant layer of electrically conductive material that can endure the operating temperature and atmosphere of the device (i.e., fuel cell stack) in which it is located. In some cases, the felt may be composed of a malleable metal or alloy. However, this definition does not restrict the term "felt" to metals. The felt conductor/distributor can for example be made from other porous, conductive materials, such as a silica-metal composite. The felt conductor/distributor should be made conductive and gas permeable and can be made up from fibers, foams and other relatively thick, compliant, conductive and gas permeable structures.

A conductor/distributor comprising a gas permeable (i.e., porous) conductive felt with composition chosen to be appropriate for the conditions specified by the application. For example, the felt material is chosen such that it remains conductive and gas permeable at the fuel cell operating temperature. The felt conductor/distributor is located in contact with the active area of the fuel electrode (i.e., anode or cathode). The fuel cell separator plate is placed in contact with the conductor/distributor. Various ways may be used to ensure electrical contact between electrode, conductor/distributor, and separator plate.

Figure 36:
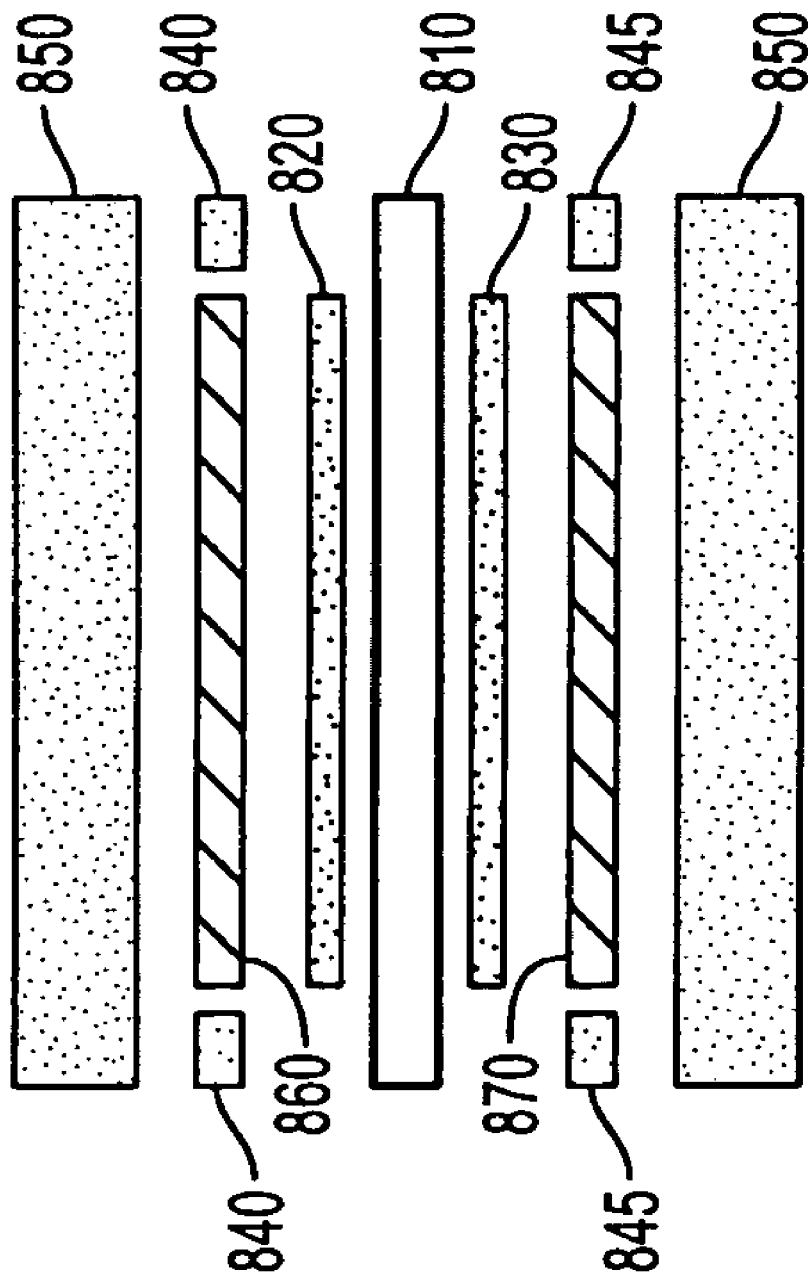
FIGS. 36–48 are schematic representations of the repeating elements of a fuel cell stack, including the felt current conductor/flow distributor elements, according to the seventh preferred embodiment.

FIG. 36 shows repeating elements of a fuel cell stack containing an electrolyte 810, an anode 820, a cathode 830, anode seal 840, cathode seal 845, and a separator plate 850, such as metal plates. A second separator plate 850 is also shown in the diagram to illustrate the connection to the next cell of the stack. The stack may be internally or externally manifolded, as will be described in more detail below.

The anode 820 and cathode 830 are often optimized for the electrochemical reactions they are catalyzing. Often, they are not optimized for electrical conductivity or for distribution of fuel- and oxygen-bearing gases. Therefore, anode conductor/distributors 860 and cathode conductor/distributors 870 are provided to fill these roles. The separator plates 850 may be omitted if the felt conductor/distributors are constructed to also perform the function of the separator plates.

In one preferred aspect of the seventh preferred embodiment, the anode conductor/distributor 860 is composed of a conductive felt. The felt conducts electrons from the anode to the separator plate. Since the felt is gas permeable, it also allows fuel to reach the anode surface, and the reaction byproducts to leave the surface and exhaust from the cell. The electrical contact between anode and felt, and between separator plate and felt, may be enhanced by adding a layer of an optional adhesive or contact material. The composition of the felt is chosen as appropriate for the fuel cell operating conditions. For example, a nickel felt with a density of 15 to 35%, preferably about 25% relative to the density of solid nickel and a thickness of 0.5 to 4 mm, preferably about 2 mm may be used in a high temperature fuel cell, such as a solid oxide fuel cell, with a reducing atmosphere and a temperature of 600 to 850° C., such as 800° C. The felt may be potted in a nickel-YSZ cermet on either the anode or separator plate sides of the connection, or on both sides.

In another preferred aspect of the seventh preferred embodiment, the cathode conductor/distributor 870 is composed of a conductive felt. The felt conducts electrons from the separator plate to the cathode. It also allows oxygen to reach the cathode surface, and the oxygen depleted air to leave the surface and exhaust from the cell. The electrical contact between cathode and felt, and between separator plate and felt, may be enhanced by adding a layer of an optional adhesive or contact material. The composition of the felt is chosen as appropriate for the fuel cell operating conditions. For example, a Fe—Cr—Al—Y felt with a density of 5 to 30%, preferably about 15% relative to the density of the solid metal alloy and a thickness of 0.5 to 4 mm, preferably 2 mm, may be used in a high temperature fuel cell, such as a solid oxide fuel cell, in an oxidizing atmosphere at 650 to 850° C., such as about 800° C. If desired, some or all of Fe may be substituted by Co and/or Ni in the Fe—Cr—Al—Y felt. The felt may be potted in a lanthanum-strontium manganite (LSM) perovskite on either the cathode or separator plate sides of the connection, or on both sides.

Preferably, both the anode 860 and cathode 870 conductor/distributors are made from a felt. In subsequent paragraphs and figures, it is assumed that same-numbered items carry their previous definitions.

In another preferred aspect of the seventh preferred embodiment, the anode and/or cathode conductor/distributors contain a non-uniform surface. Preferably, the conductor/distributor(s) contain ribs which provide a desired pressure drop or flow distribution pattern. Other surface features, such as dimples, lines, or a particular pore geometry may be used to exercise control over pressure drop or flow distribution.

Figure 37:
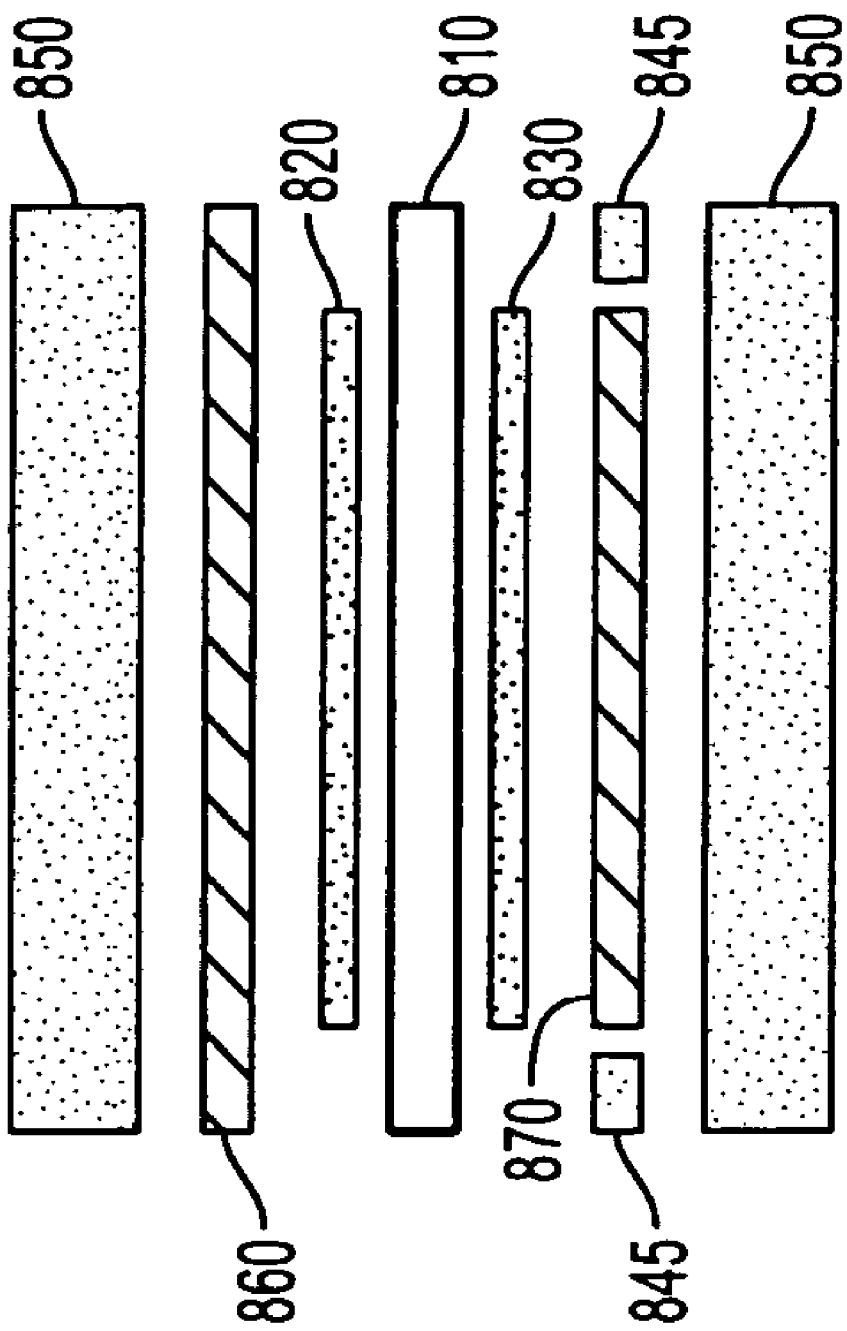

In another preferred aspect of the seventh embodiment (FIG. 37), the anode conductor/distributor 860 is combined with the anode-side felt seal of the sixth preferred embodiment. The anode conductor/distributor and seal is made of one continuous piece of material. The anode conductor/distributor 860 can be used in conjunction with any of the various preferred aspects of the sixth embodiment describing the felt seal.

Figure 38:
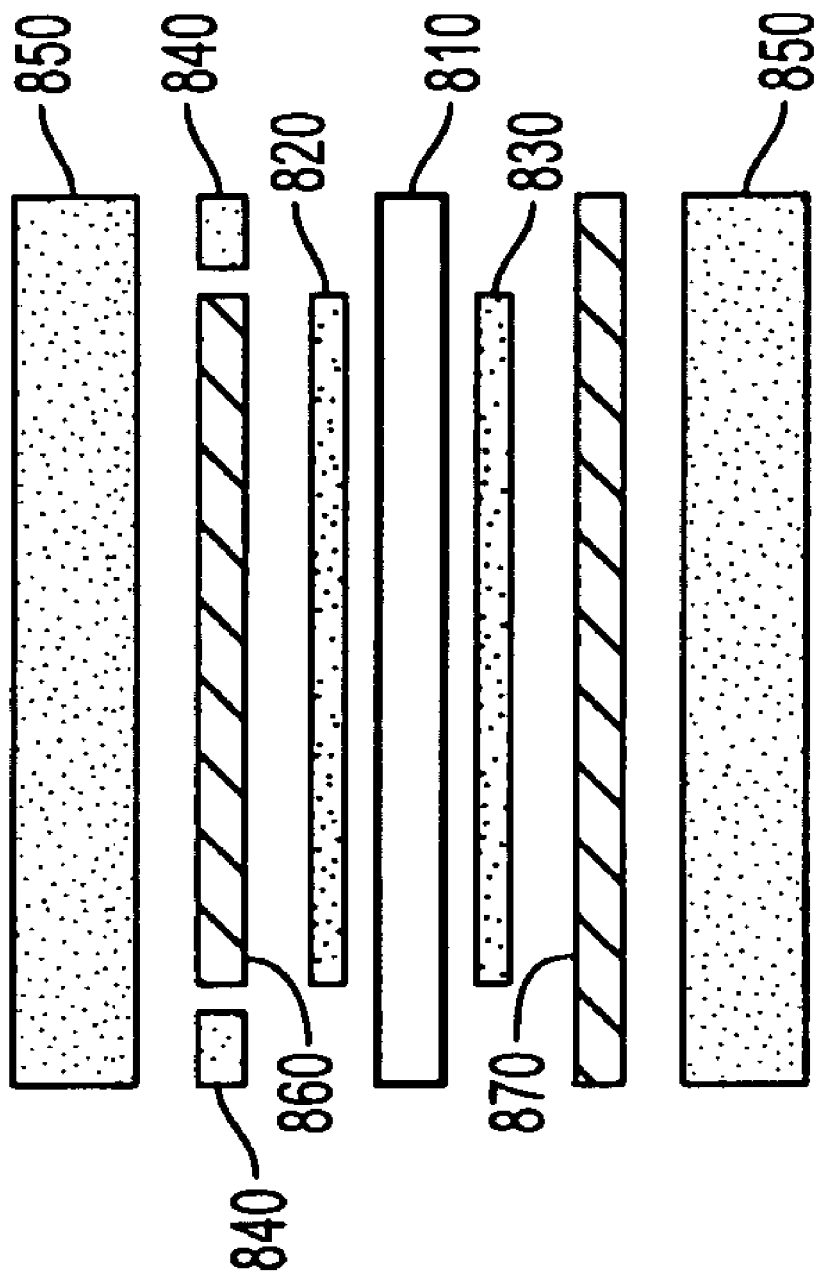

In another preferred aspect of the seventh embodiment (FIG. 38), the cathode conductor/distributor 870 is combined with the cathode-side felt seal of the sixth preferred embodiment. The cathode conductor/distributor and seal is made of one continuous piece of material. The cathode conductor/distributor 870 can be used in conjunction with any of the various preferred aspects of the sixth embodiment describing the felt seal. Most preferably, both the anode and cathode conductor/distributors are combined with the felt seal.

Figure 39:
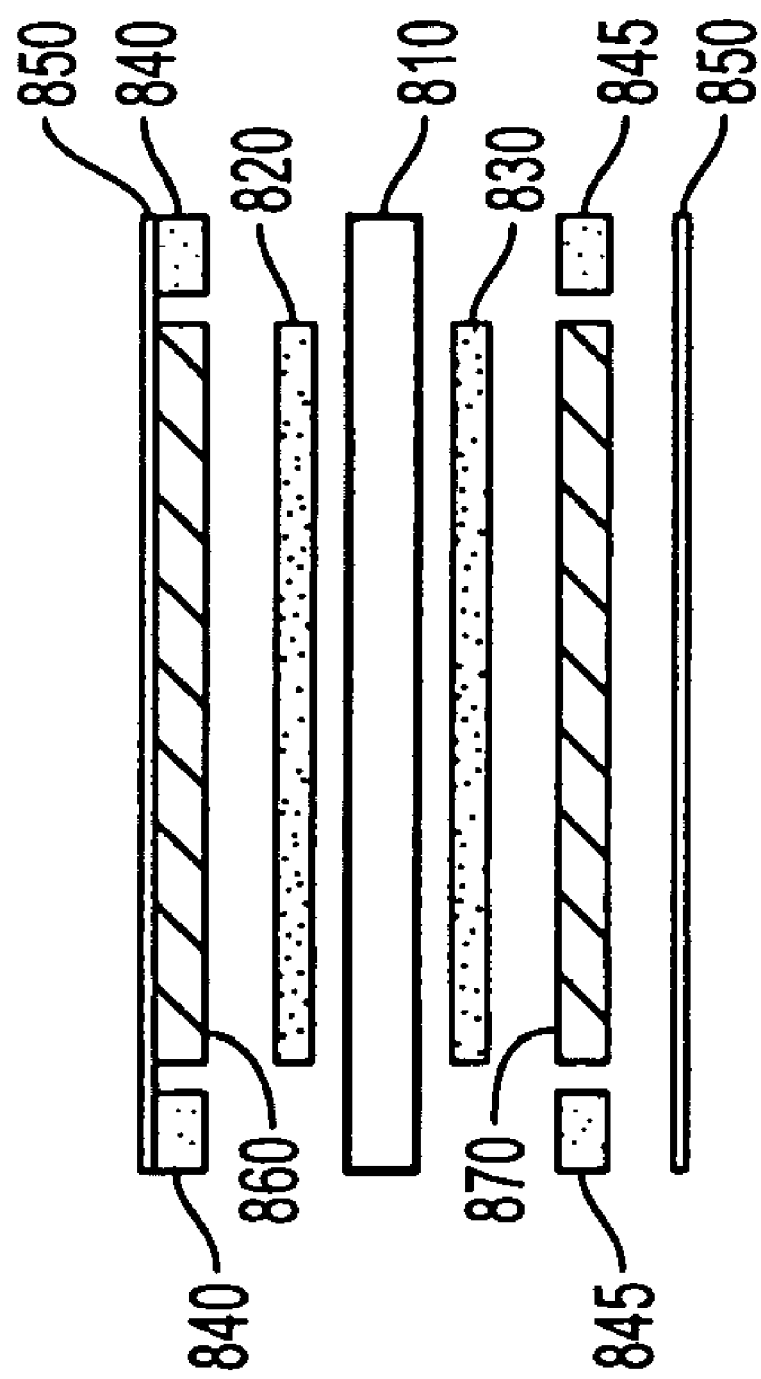

In another preferred aspect of the seventh preferred embodiment (FIG. 39), the anode conductor/distributor 860 provides the structural support for the separator plate 850. In this aspect, the separator plate material may be made as thin as practicality and serviceability allows. Preferably, the separator plate comprises a thin film deposited onto the anode conductor/distributor 860 by various thin film deposition techniques, including but not limited to thermal or plasma spray, chemical or physical vapor deposition (i.e., CVD or sputtering), precipitation, and dipping. Alternatively, the thin separator plate 850 may comprise an integral component that is placed in contact with the conductor/distributor. Preferably, a "thin film" is less than 500 microns thick, more preferably, less than 100 microns thick, most preferably 10 to 30 microns thick. In this case, the felt conductor/distributor thickness is sufficient to act as a substrate for the thin film, such as a thickness of greater than 30 microns, preferably greater than 100 microns.

Figure 40:
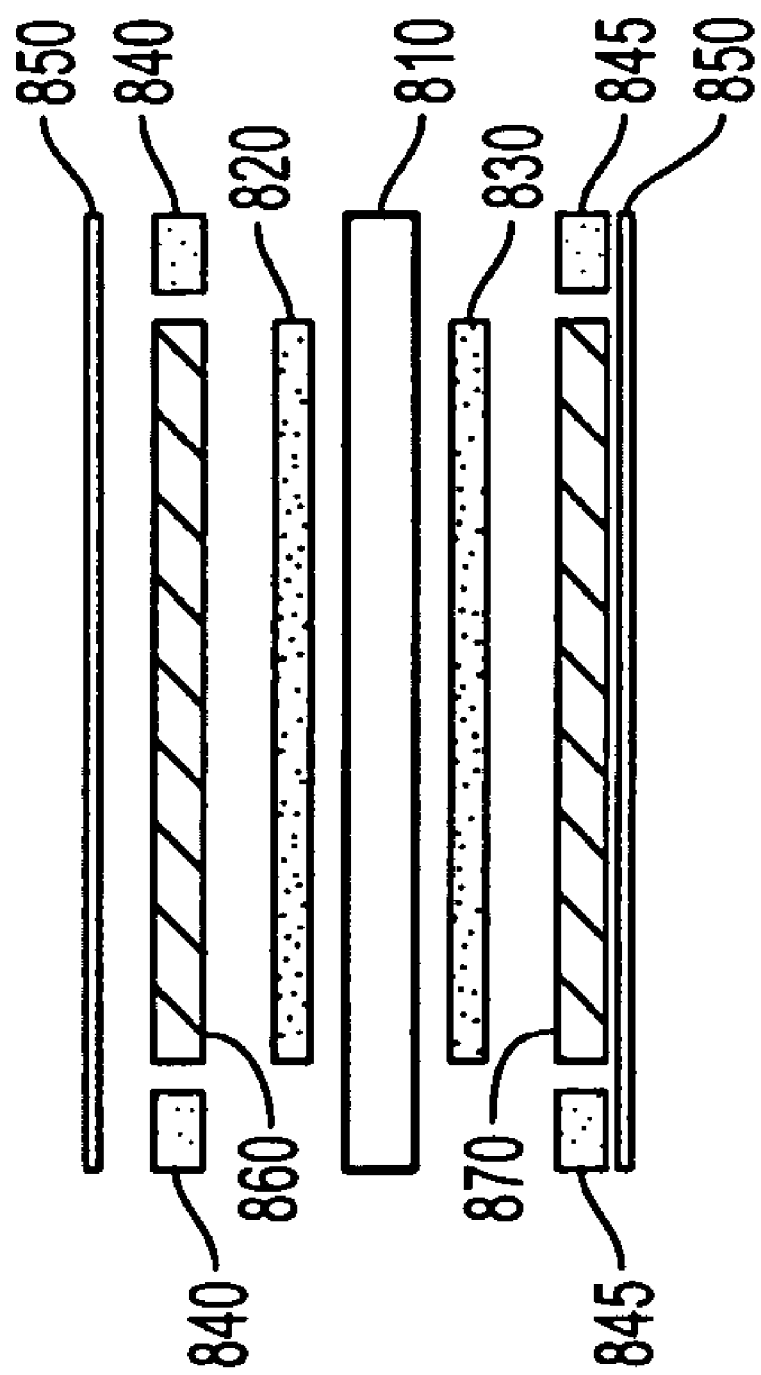

In another preferred aspect of the seventh preferred embodiment (FIG. 40), the cathode conductor/distributor 870 provides the structural support for the separator plate 850. In this aspect, the separator plate material may be made as thin as practicality and serviceability allows. Preferably, the separator plate comprises a thin film deposited onto the cathode conductor/distributor 870 by various thin film deposition techniques, including but not limited to thermal or plasma spray, chemical or physical vapor deposition (i.e., CVD or sputtering), precipitation, and dipping. Alternatively, the thin separator plate 850 may comprise an integral component that is placed in contact with the conductor/distributor. Preferably both the anode and cathode conductor/distributors serve as a support for their respective separator plates.

Figure 41:
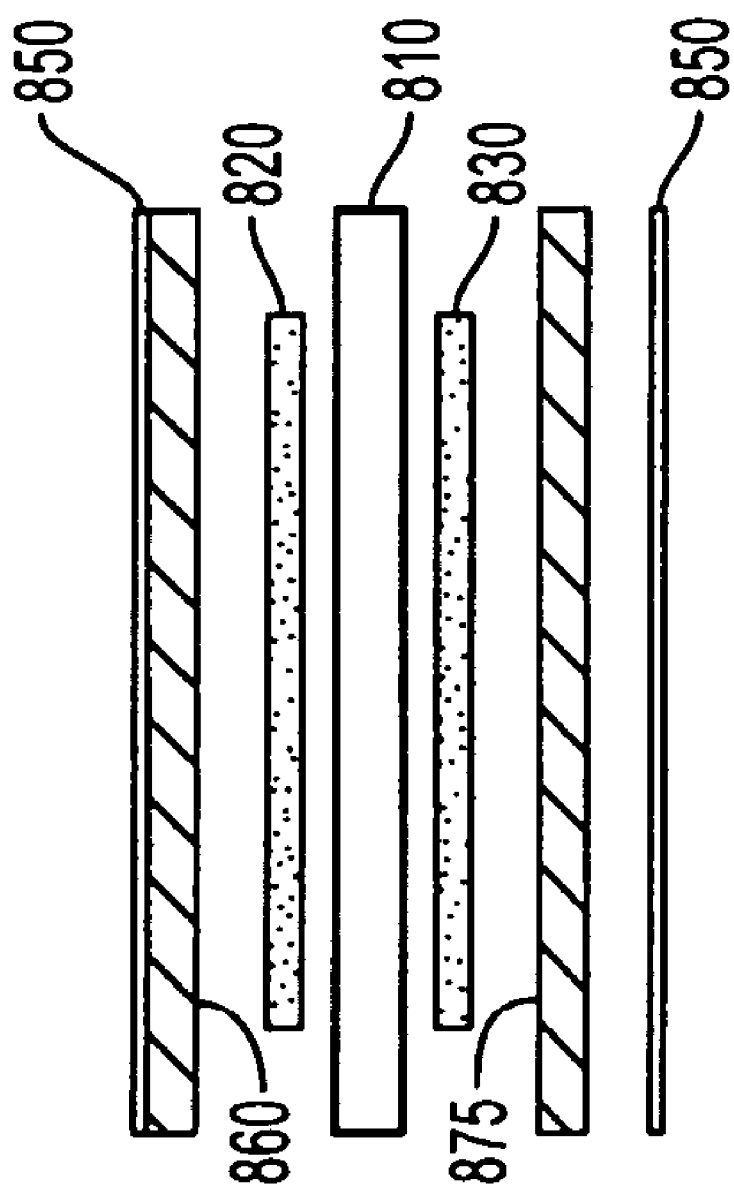

In another preferred aspect shown in FIG. 41, the anode conductor/distributor 860 serves as a seal and as separator plate support. In the figure, the anode conductor/distributor renumbered 865 is shown in one of its various preferred configurations.

Figure 42:
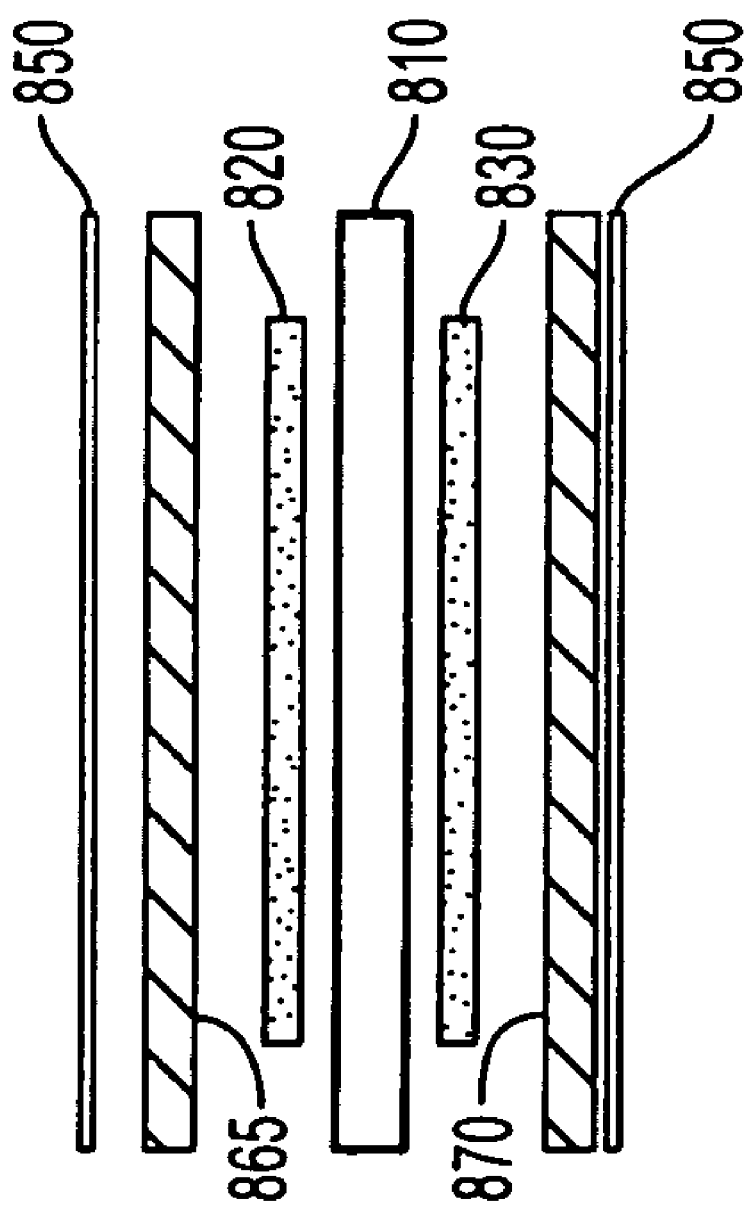

In another preferred aspect shown in FIG. 42, the cathode conductor/distributor 870 serves also as seal and as separator plate support. In the figure, the cathode conductor/distributor renumbered 875 is shown in one of its various preferred configurations.

In subsequent paragraphs and figures, the conductor/distributors are described in their roles as support structures for other elements of the fuel cell stack. In these paragraphs and figures, item 865 refers to the anode conductor/distributor in one of its various previously described configurations, and item 875 refers to the cathode conductor/distributor in one of its various previously described configurations.

Figure 43:
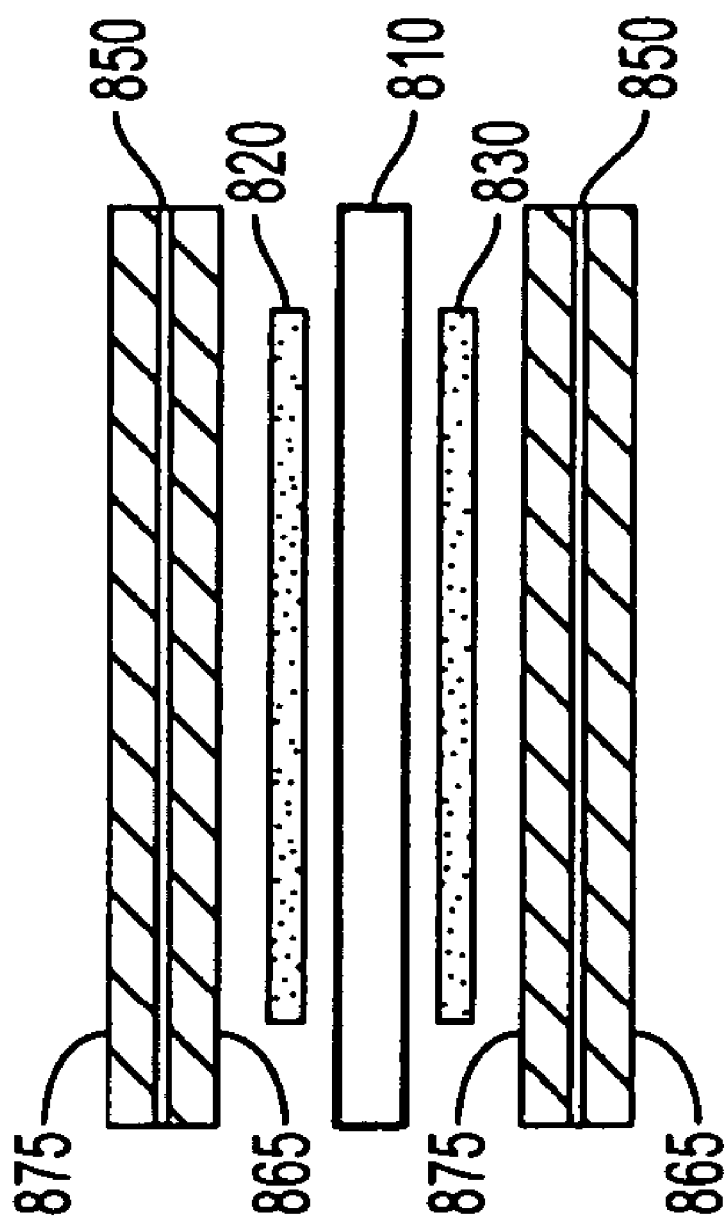

In another preferred aspect shown in FIG. 43, the anode conductor/distributor 865 and the cathode conductor/distributor 875 together support a common separator plate 850 that is located between them. The separator plate 850 may be placed or deposited in any way so as to reduce the materials and assembly costs and increase the performance and quality of the assembly. Typically the separator plate 850 would be made as thin as practicality and serviceability allows, such as a thin film plate.

Figure 44:
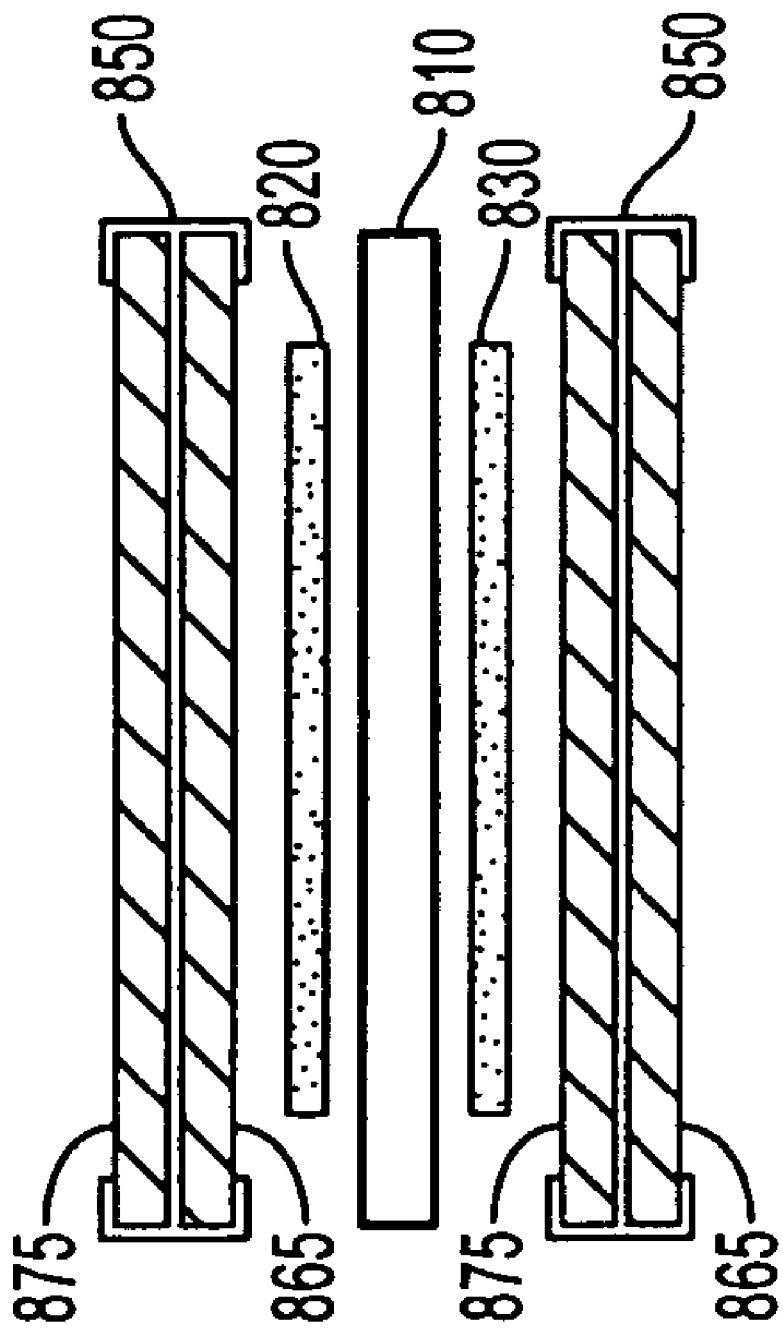

If the felt conductor/distributors 865 and 875 are combined with the seals, then the seal portions of the conductor/distributors can be made gas impermeable by any of the methods described in the sixth preferred embodiment. Alternatively, portions of the separator plate 850 may be used to form a seal. For example, thin separator plate material or foil can be extended around the edges of either or both conductor/distributors as shown in FIG. 44. These separator plate extension act as a gas impermeable seal.

Figure 45:
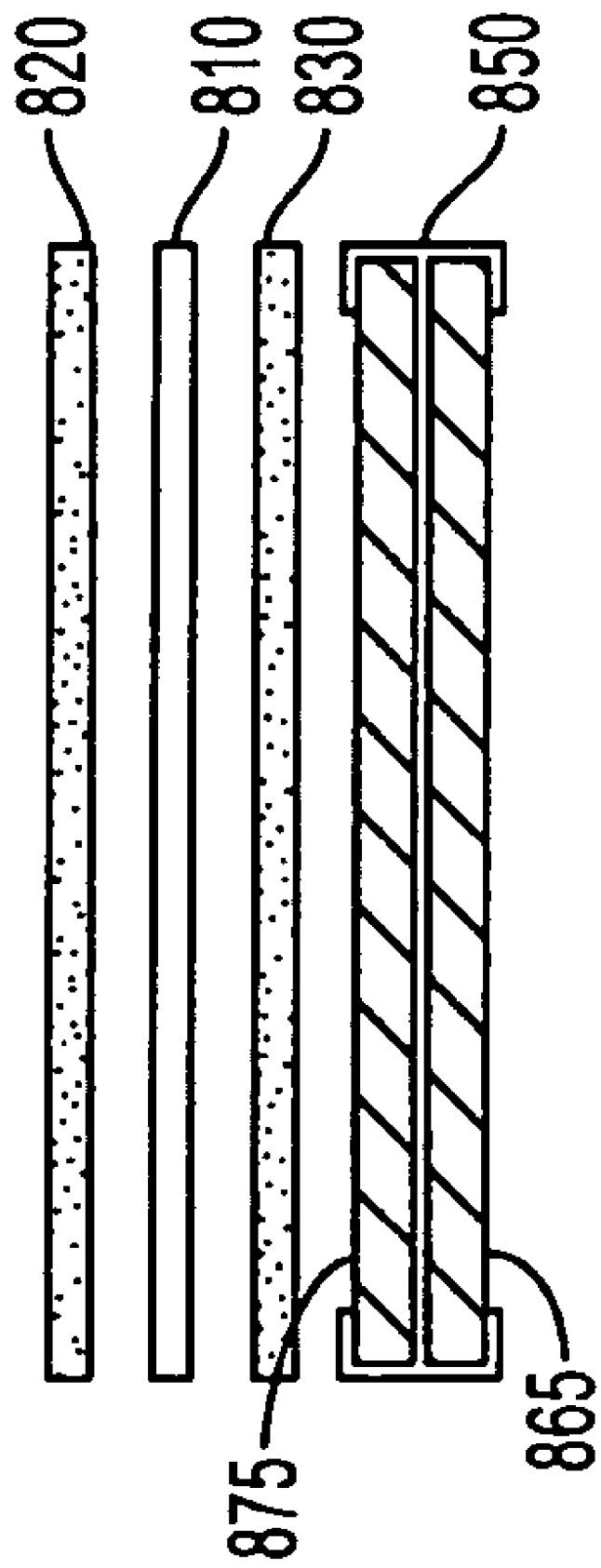

In another preferred aspect of the seventh embodiment shown in FIG. 45, the anode conductor/distributor 865 and the cathode conductor/distributor 875 together support not only the separator plate 850, but they also support the cathode 830, electrolyte 810, and anode 820. The separator plate 850, cathode 830, electrolyte 810, and anode 820 may be placed or deposited in any way so as to reduce the materials and assembly costs and increase the performance and quality of the assembly. Typically these components would be made as thin as practicality and serviceability allows. These components preferably comprise thin films (as defined above) that are preferably deposited on the conductor/distributor 865/875 "substrate" by various thin film deposition techniques described above.

Figure 46:
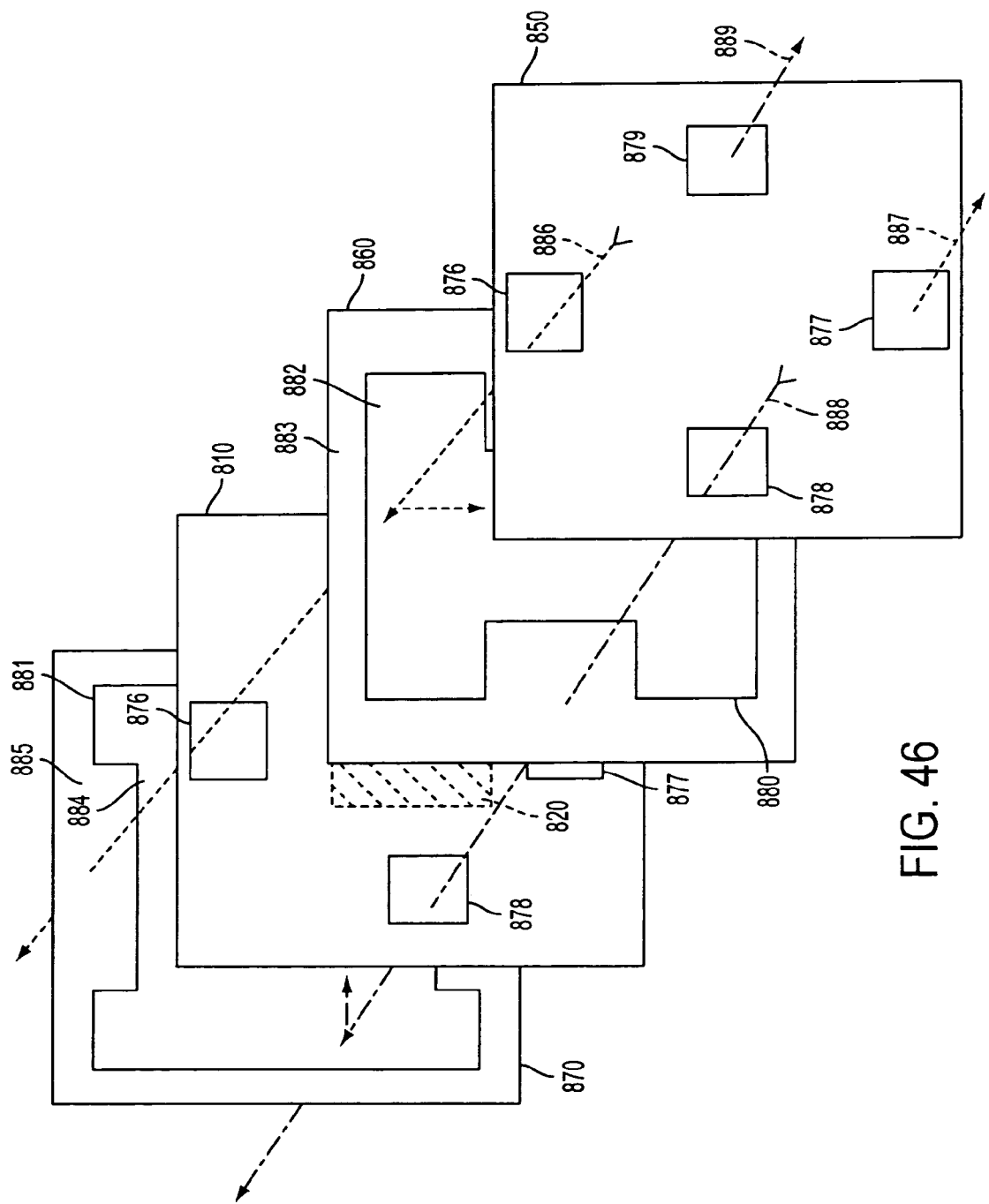

FIG. 46 illustrates a three dimensional view of an internally manifolded fuel cell stack containing a common felt conductor/distributor and seal. In FIG. 46, the fuel cell stack contains a separator plate 850, an anode felt conductor/distributor/seal 860, an electrolyte 810, and anode 820 and a cathode felt conductor/distributor/seal 870. The cathode is not visible in FIG. 46 because it is located "behind" the electrolyte 820. The separator plate 850 and electrolyte 810 contain gas passages or openings 876, 877, 878 and 879. Specifically, passages 876 are fuel inlet passages, passages 877 are fuel outlet passages, passages 878 are oxidizer inlet passages and passages 879 are oxidizer outlet passages.

The anode felt conductor/distributor/seal 860 is made of a conductive felt. The entire anode felt conductor/distributor/seal 860 is gas permeable, except for gas impermeable seal region or strip 880. The cathode felt conductor/distributor/seal 870 is made of a conductive felt. The entire cathode felt conductor/distributor/seal 870 is gas permeable, except for gas impermeable seal region or strip 881.

In the anode felt conductor/distributor/seal 860, the gas impermeable strip 880 circumscribes a gas permeable region 882 and seals it from a gas permeable region 883. In the cathode felt conductor/distributor/seal 870, the gas impermeable strip 881 circumscribes a gas permeable region 884 and seals it from a gas permeable region 885.

Region 882 lines up with the anode 820 and with the fuel passages 876 and 877 when the stack is assembled. Region 883 lines up with the oxidizer passages 878 and 879. Region 884 lines up with the cathode (not shown) and with the oxidizer passages 878 and 879. Region 885 lines up with fuel passages 876 and 877.

The fuel cell stack operates as follows. The input or inlet fuel 886 (dashed lines in FIG. 46) is provided into fuel inlet passage 876 in separator plate 850. The fuel reaches the gas permeable region 882 in the anode conductor/distributor/seal 860. From here, the input fuel splits into two directions. One part of the fuel travels "down" through gas permeable felt region 882 and reacts at the anode 820. The fuel reaction products 887 then exit from region 882 through fuel outlet passage 877 in the separator plate 850. Another part of the fuel travels through passage 876 in the electrolyte and passes through the gas permeable region 885 in the cathode conductor/distributor/seal 870. The gas impermeable strip or seal 880 prevents the fuel from entering region 883 and reacting with the oxidizer. The gas impermeable strip or seal 881 prevents the fuel from entering region 884 and contacting the cathode.

The input or inlet oxidizer 888 (dotted-dashed lines in FIG. 46) is provided into oxidizer inlet passage 878 in separator plate 850. The oxidizer passes through the gas permeable region 883 in the anode conductor/distributor/seal 860. The oxidizer then travels through passage 878 in the electrolyte and reaches the gas permeable region 884 in the cathode conductor/distributor/seal 870. From here, the input oxidizer splits into two directions. One part of the oxidizer travels "right" through gas permeable felt region 884 and reacts at the cathode. The reacted oxidizer 889 then travels back and exits from region 884 through oxidizer outlet passage 879 in the separator plate 850. The gas impermeable strip or seal 880 prevents the oxidizer from entering region 882 and contacting the anode. The gas impermeable strip or seal 881 prevents the oxidizer from entering region 885 and reacting with the fuel.

The gas impermeable regions 880, 881 may be formed by any method described in the sixth embodiment, such as by selective heating or laser irradiation or selective addition of a gas impermeable material to the felt. Thus, the gas impermeable regions 880, 881 act as felt seals in the felt conductor/distributors 860, 870. They separate and prevent the fuel and oxidizer from contacting each other in the fuel cell stack. The fuel stacks and the seals 880, 881 may have any suitable shape and should not be considered limited to the shape illustrated in FIG. 46. Furthermore, "down" and "right" are relative directions depending on the orientation of the fuel cell stack. It should be noted that the fuel and oxidizer cross the fuel stack in different, preferably perpendicular directions.

The felt conductor/distributor/seals are not limited to unitary conductive felt sheets 860, 870 containing both the gas impermeable seals 880, 881 and the gas permeable conductor/distributors 882, 884. The gas impermeable seals may be formed in separate felt gaskets that are placed adjacent to the gas permeable felt conductor/distributors, as shown in FIG. 47.

Figure 47:
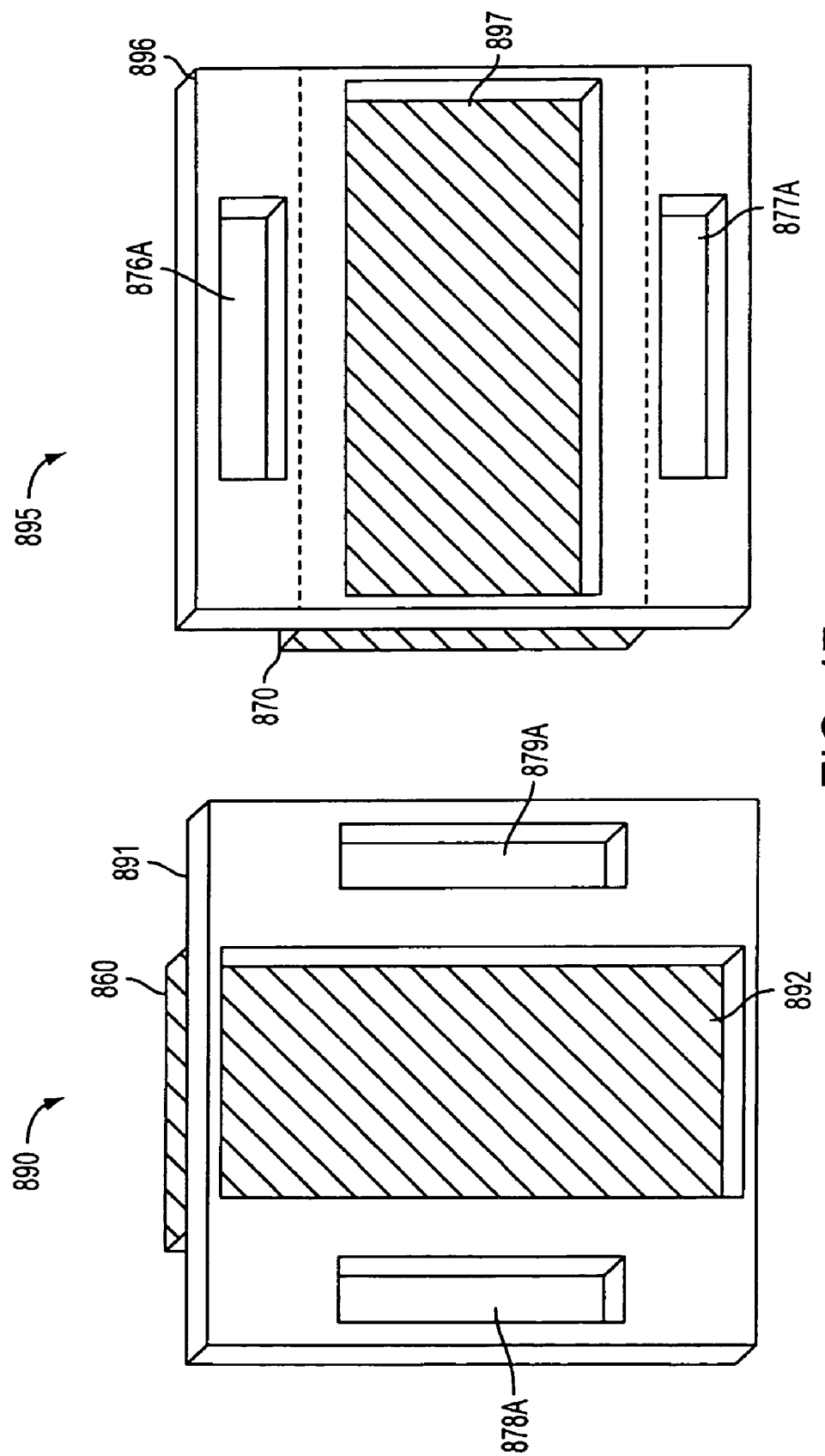

In FIG. 47, the conductive felt anode conductor/distributor/seal 890 comprises a gas impermeable felt gasket 891 and a gas permeable felt conductor/distributor 860. The gasket 891 contains a large opening 892, which lines up with the conductor/distributor 860 and with the fuel inlet and outlet passages 876, 877 in the separator plate 850 and the electrolyte 810 (shown in FIG. 46). The inlet fuel enters the conductor/distributor through opening 892 and travels to the anode 820. Alternatively, the one large opening 892 may be replaced with two smaller openings which line up with the conductor/distributor and the fuel passages 876, 877 in the separator plate 850 and electrolyte 810. The gasket 891 also contains the oxidizer inlet and outlet passages 878A, 879A, which do not line up with the anode conductor/distributor 860. Thus, the oxidizer travelling through these passages does not enter the conductor/distributor 860 and does not reach the anode.

In FIG. 47, the conductive felt cathode conductor/distributor/seal 895 comprises a gas impermeable felt gasket 896 and a gas permeable felt conductor/distributor 870. The gasket 896 contains a large opening 897, which lines up with the conductor/distributor 870 and with the oxidizer inlet and outlet passages 878, 879 in the separator plate 850 and the electrolyte 810 (shown in FIG. 46). The inlet oxidizer enters the conductor/distributor through opening 897 and travels to the cathode 830. Alternatively, the one large opening 897 may be replaced with two smaller openings which line up with the conductor/distributor and the oxidizer passages 878, 879 in the separator plate 850 and electrolyte 810. The gasket 896 also contains the fuel inlet and outlet passages 876A, 877A, which do not line up with the cathode conductor/distributor 870. Thus, the fuel travelling through these passages does not enter the conductor/distributor 870 and does not reach the cathode.

Figure 48:
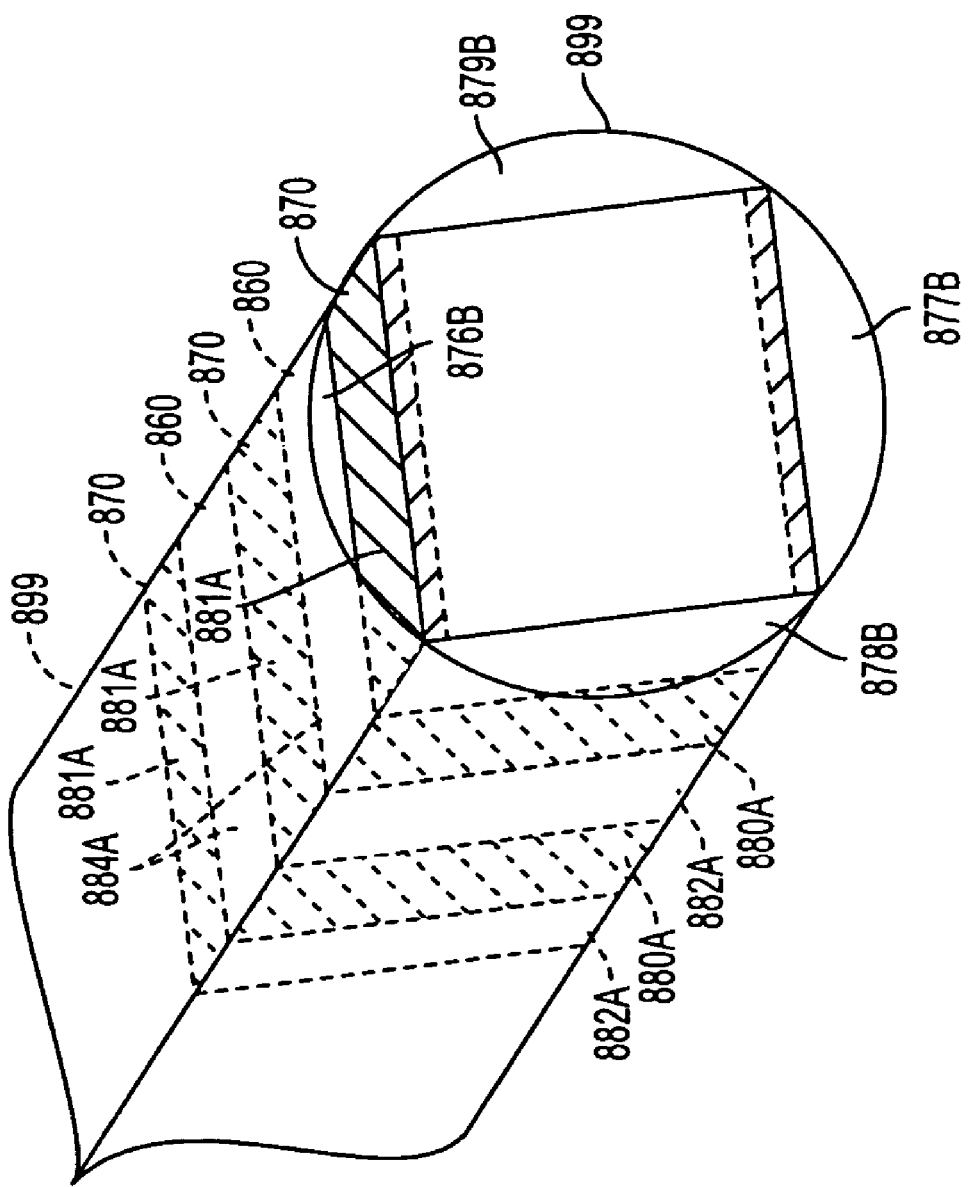

The conductor/distributor/seals may also be used in externally manifolded fuel cells, as shown in FIG. 48. In FIG. 48, the alternating conductive felt anode and cathode conductor/distributor/seals 860, 870 are shown as being located in a fuel cell stack housing 899. The housing may have a cylindrical or any other suitable shape. The thin electrolyte, separator plates and electrodes are located between the conductor/distributor/seals 860, 870, but are not shown in FIG. 48 for clarity.

The fuel and oxidizer passages are located between the fuel cell stack and the housing 899. Specifically, passage 876B is a fuel inlet passage, passage 877B is a fuel outlet passage, passage 878B is an oxidizer inlet passage and passage 879B is an oxidizer outlet passage. The "vertical" (i.e., "left" and "right") surfaces 880A of anode conductor/distributor/seals 860 are rendered gas impermeable. The "horizontal" (i.e., top" and "bottom") surfaces 881A of cathode conductor/distributor/seals 870 are also rendered gas impermeable. The remainder of the conductor/distributor/seals 860, 870 remains gas permeable. The sealing may be accomplished by any method described in the sixth embodiment, such as by selective heating or laser irradiation, selective impregnation of the surfaces with a gas impermeable material (i.e., such as by dipping into such material), by selective deposition of foils or thin films on the desired surfaces, or by bending portions of the separator plates around the desired surface edges.

The fuel from passage 876B travels through gas permeable surfaces 882A of sheets 860 to reach the anode. The oxidizer from passage 878B travels through gas permeable surfaces 884A of sheets 870 to reach the cathode. The fuel in passages 876B and 877B does not permeate through surfaces 881A, and does not react with the oxidizer or reach the cathode. The oxidizer in passages 878B and 879B does not permeate through surfaces 880,A and does not react with the fuel or reach the anode.

The fuel stacks and the conductor/distributors 860, 870 may have any suitable shape and should not be considered limited to the shape illustrated in FIG. 48. Furthermore, "vertical" and "horizontal" are relative directions depending on the orientation of the fuel cell stack. It should be noted that the fuel and oxidizer cross the fuel stack in different, preferably perpendicular directions.

VII. Conclusion

The various components of the systems and fuel cells and steps of the methods described in the first through the seventh embodiments may be used together in any combination. Preferably, the components and systems of all seven embodiments are used together. Thus, the preferred method and system include a temperature sensitive adsorption oxygen enrichment method and system of the first embodiment, a load matched power generation system including a solid oxide fuel cell and a heat pump and an optional turbine, and method of using the system of the second embodiment, a textured fuel cell ceramic electrolyte of the third embodiment, an environment tolerant fuel cell anode catalyst of the fourth embodiment, a water vapor replenishment system including the preferred enthalpy wheel of the fifth embodiment, a felt seal in the fuel cell of the sixth embodiment and a felt collector of the seventh embodiment. However, any one, two, three, four or five of the above features may be omitted from the preferred system, fuel cell and method.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings are not necessarily to scale and illustrate the device in schematic block format. The drawings and description of the preferred embodiments were chosen in order to explain the principles of the invention and its practical application, and are not meant to be limiting on the scope of the claims. It is intended that the scope of the invention be defined by the claims appended hereto, and their equivalents.

What is claimed is:

1. A ceramic electrolyte for a solid oxide fuel cell, comprising at least one non-uniform surface portion, wherein:
   the electrolyte is substantially flat; and
   the at least one non-uniform surface portion of the electrolyte comprises a textured surface which is located only in an active portion of the electrolyte, while a peripheral portion of the electrolyte does not contain the textured surface.

2. The electrolyte of claim 1, wherein the peripheral portion of the electrolyte contains at least one of oxygen or fuel passages.

3. The electrolyte of claim 2, wherein the electrolyte comprises two opposing non-uniform textured surface portions.

4. The electrolyte of claim 1, wherein an imaginary center line running along a length of the electrolyte does not significantly deviate from an imaginary straight line.

5. The electrolyte of claim 1, wherein the at least one non-uniform surface portion of the electrolyte comprises two opposing major textured surfaces which are located only in the active portion of the electrolyte, while a peripheral portion of the electrolyte does not contain the textured surfaces.

6. The electrolyte of claim 1, wherein the textured surface comprises protrusions having a height that is 5% or less of an average electrolyte thickness.

7. The electrolyte of claim 1, wherein the textured surface has a roughness of 0.5 to 2.5 microns.

8. The electrolyte of claim 1, wherein:
   the electrolyte comprises a composite electrolyte having a first layer and a second layer; and
   the textured surface comprises an interface surface between the first and the second layers.

9. The electrolyte of claim 8, further comprising an outer textured surface of the composite electrolyte, wherein the composite electrolyte comprises at least three layers and at least two textured interfaces.

10. The electrolyte of claim 8, wherein the first layer comprises a doped ceria and the second layer comprises YSZ.

11. The electrolyte of claim 1, wherein the electrolyte comprises YSZ.

12. A solid oxide fuel cell, comprising:
   the electrolyte of claim 3;
   an anode contacting a first non-uniform surface of the electrolyte; and
   a cathode contacting a second non-uniform surface of the electrolyte.

13. The fuel cell of claim 12, wherein:
   the anode comprises a nickel-YSZ cermet; and
   the cathode comprises LSM.

14. A solid oxide fuel cell stack, comprising a plurality of solid oxide fuel cells of claim 12.

15. A method of making a ceramic electrolyte for a solid oxide fuel cell, comprising:
   providing a substantially flat ceramic electrolyte; and
   texturing at least a portion of one surface of the ceramic electrolyte by lapping, grinding or polishing at least one surface of the electrolyte.

16. The method of claim 15, wherein the step of texturing comprises texturing both opposing surfaces of the ceramic electrolyte after sintering the electrolyte.

17. The method of claim 15, wherein:
- the textured surface portion is located only in an active portion of the electrolyte, while a peripheral portion of the electrolyte does not contain the textured surface; and
- an imaginary center line running along a length of the electrolyte does not significantly deviate from an imaginary straight line.

18. The method of claim 15, wherein the step of texturing comprises lapping, grinding or polishing both opposing surfaces of the ceramic electrolyte.

19. The method of claim 18, wherein the textured surface has a roughness of 0.5 to 2.5 microns.

20. A method of making a solid oxide fuel cell, comprising:
- providing the electrolyte made by the method of claim 15;
- forming an anode on a first non-uniform surface of the electrolyte; and
- forming a cathode on a second non-uniform surface of the electrolyte.

21. A method of making a ceramic electrolyte for a solid oxide fuel cell by tape casting, comprising:
- providing a slurry containing a ceramic powder onto a textured material;
- spreading the slurry using a blade to form a green tape; and
- sintering the green tape to form a substantially flat ceramic electrolyte containing at least a textured surface portion.

22. The method of claim 21, wherein the step of providing a slurry comprises providing the slurry onto a moving carrier tape.

23. The method of claim 21, wherein the textured surface portion is located only in an active portion of the electrolyte, while a peripheral portion of the electrolyte does not contain the textured surface.

24. The method of claim 23, wherein:
- the peripheral portion of the electrolyte contains at least one of oxygen or fuel passages; and
- an imaginary center line running along a length of the electrolyte does not significantly deviate from an imaginary straight line.

25. The method of claim 21, wherein the textured surface portion comprises an entire major surface of the electrolyte.

26. The method of claim 21, further comprising placing the electrolyte which comprises YSZ into a solid oxide fuel cell.

27. A method of making a ceramic electrolyte for a solid oxide fuel cell, comprising:
- providing an electrolyte precursor material;
- texturing at least a portion of one surface of the electrolyte precursor material by embossing at least a portion of one surface of the electrolyte precursor material, wherein the step of embossing comprises rolling a body having a textured surface against the electrolyte precursor material; and
- sintering the electrolyte precursor material to form a substantially flat ceramic electrolyte containing at least a textured surface portion.

28. The method of claim 27, wherein the electrolyte precursor material comprises a green sheet.

29. The method of claim 27, wherein the textured surface portion comprises an entire major surface of the electrolyte.

30. The method of claim 27, wherein the textured surface portion is located only in an active portion of the electrolyte, while a peripheral portion of the electrolyte does not contain the textured surface.

31. The method of claim 30, wherein:
- the peripheral portion of the electrolyte contains at least one of oxygen or fuel passages; and
- an imaginary center line running along a length of the electrolyte does not significantly deviate from an imaginary straight line.

32. The method of claim 27, further comprising placing the electrolyte which comprises YSZ into a solid oxide fuel cell.

33. The method of claim 27, wherein the step of embossing comprises rolling a first body having a textured surface against a first surface of the electrolyte precursor material and rolling a second body having a textured surface against a second surface of the electrolyte precursor material to form an electrolyte comprising two opposing textured surface portions.

* * * * *